United States Patent [19]
Koh et al.

[11] Patent Number: 4,998,121
[45] Date of Patent: Mar. 5, 1991

[54] IMAGE FORMING APPARATUS

[75] Inventors: Shokyo Koh, Yokohama; Yoshihiko Suzuki, Tokyo; Yoshio Mizuno, Ichikawa, all of Japan

[73] Assignee: Canon Kabushiki Kaisha, Tokyo, Japan

[21] Appl. No.: 416,539

[22] Filed: Oct. 3, 1989

[30] Foreign Application Priority Data

| | | | |
|---|---|---|---|
| Oct. 3, 1988 | [JP] | Japan | 63-249602 |
| Dec. 15, 1988 | [JP] | Japan | 63-317246 |
| Dec. 15, 1988 | [JP] | Japan | 63-317248 |
| Dec. 15, 1988 | [JP] | Japan | 63-317250 |
| Dec. 20, 1988 | [JP] | Japan | 63-322582 |

[51] Int. Cl.[5] .......... G01D 15/14
[52] U.S. Cl. .......... 346/160
[58] Field of Search .......... 346/153.1, 160, 160.1; 355/285; 263/3

[56] References Cited

U.S. PATENT DOCUMENTS

| | | | |
|---|---|---|---|
| 3,578,797 | 5/1971 | Hodges | 263/3 |
| 4,348,102 | 9/1982 | Sessink | 355/285 |
| 4,349,269 | 9/1982 | Okada | 355/285 |

FOREIGN PATENT DOCUMENTS

| | | | |
|---|---|---|---|
| 4894438 | 12/1973 | Japan . | |
| 139542 | 12/1978 | Japan | 355/285 |
| 18747 | 2/1979 | Japan | 355/285 |
| 17473 | 1/1985 | Japan | 355/285 |
| 1034005 | 8/1983 | U.S.S.R. | 355/285 |

*Primary Examiner*—Donald A. Griffin
*Attorney, Agent, or Firm*—Fitzpatrick, Cella, Harper & Scinto

[57] ABSTRACT

An image forming apparatus includes an image fixing device for fixing a toner image supported on an image supporting material, the fixing device including a heating source for heating the toner image; detecting device for detecting passage of the supporting material; and a control device for controlling power supply to the heating source on the basis of an output of the detecting device.

32 Claims, 39 Drawing Sheets

IMAGE FORMING APPARATUS

FIELD OF THE INVENTION AND RELATED ART

The present invention relates to an image forming machine comprising an image fixing apparatus for heating and fixing a toner image formed on a recording material.

Most of the conventional fixing devices are of roller fixing type which includes a heating roller maintained at a predetermined temperature and a pressing or back-up roller having an elastic layer and press-contacted to the heating roller to form a nip therebetween, through which a transfer material having an unfixed toner image is passed and is heated. In this type of image fixing apparatus, the temperature of the heating roller has to be maintained at an optimum level in order to prevent a so-called toner offset phenomena, that is, toner undesirably transferring to the heating roller. This requires a large thermal capacity of the heating roller or a heading member. In addition, use of the rotatable heating roller itself makes it difficult to reduce the thermal capacity to a large extent. The large thermal capacity necessitates a longer period of time to increase the temperature of the heating roller to the predetermined level, with the result of the additional problem of a longer waiting time upon start of apparatus. U.S. Pat. No. 3,578,797 and Japanese Laid-Open Patent Application No. 94438/1973 propose a fixing process not producing the toner offset, which comprises the steps of:

(1) heating the toner image by a heating member up to a fusing point to fuse it;

(2) cooling the toner, after the fusing thereof, to increase the viscosity thereof; and (3) separating the toner image from a heating web when the toner attaching tendency becomes weak.

In this process, the heating member is constituted by a heating roller, a web moved thereby and a heating source within the heating roller, wherein the toner image is heated through the web. The heating roller also functions as a roller for moving the web.

This process, however, requires a heating member having a relatively large thermal capacity, and therefore, a longer warming period is still required, and the heat radiation inside the image forming apparatus is relatively large with the result of temperature rise within the apparatus.

U.S. application Ser. No. 206,707 which has been assigned to the assignee of this application has proposed a new fixing apparatus wherein the warming up period is short, and the heat fixing operation can be performed with a smaller energy consumption. This fixing apparatus provides very good advantages, but is still not sufficient in the reduction of the energy consumption.

SUMMARY OF THE INVENTION

Accordingly, it is a principal object of the present invention to provide an image forming apparatus using a heating member having a low thermal capacity, wherein the toner image can be heated and fixed with very low energy consumption.

It is another object of the present invention to provide an image forming apparatus, wherein the energy supply to the heating source for heating the toner image is on-off-controlled in accordance with an output of a recording material detector.

It is a further object of the present invention to provide an image forming apparatus wherein the power supply to the heating source can be switched off during the intervals between adjacent recording materials in a continuous image formation mode.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
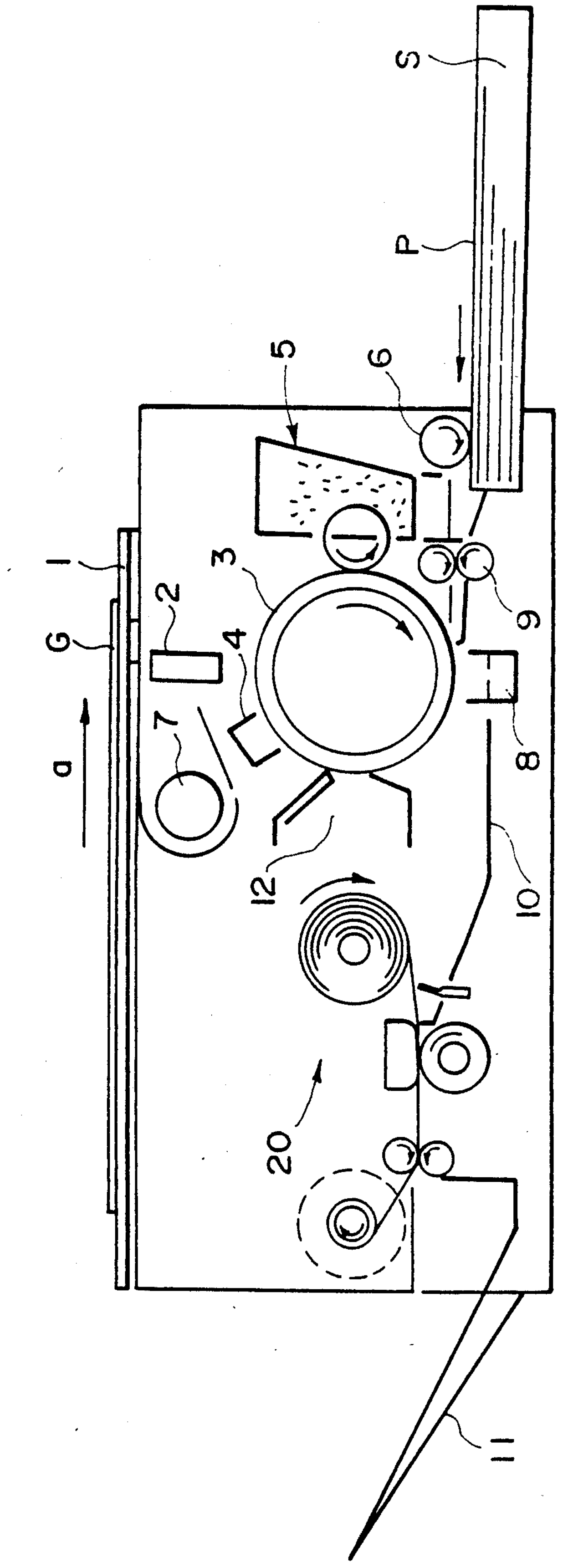
FIG. 1 is a sectional view of an image forming apparatus according to an embodiment of the present invention.

Preferred embodiments of the present invention will be described in conjunction with the accompanying drawings wherein like reference numerals are assigned to the elements having the corresponding functions.

Referring to FIG. 1, there is shown an image forming apparatus according to an embodiment of the present invention. The apparatus comprises an original supporting platen made of a transparent material such as glass, and reciprocates in the direction indicated by an arrow a. Below the original supporting platen, there is an array 2 of imaging elements each having a short focus and a small diameter. An original G placed on the original supporting platen 1 is illuminated by an illumination lamp 7, and the light reflected thereby is projected through a slit on a photosensitive drum 3 through the array 2. The photosensitive drum 3 rotates in the direction indicated by an arrow b. A charger 4 is effective to uniformly charge the photosensitive drum 3 which is coated with a zinc oxide photosensitive layer, organic photoconductive photosensitive layer or the like. The drum 3 having been uniformly charged by the charger 4 is exposed to the light image through the imaging element array 2, so that an electrostatic latent image is formed. The electrostatic latent image is visualized by a developing device 5 with toner made of heat-softening or heat-fusible resin and others. The transfer material P (recording material) accommodated in a cassette S is fed to the photosensitive drum 3 by a pick-up roller 6 and a couple of conveying rollers 9 press-contacted vertically to each other, at such timing as to be synchronized with the image on the photosensitive drum. The toner image formed on the photosensitive drum 3 is transferred onto the transfer material P by the transfer discharger 8. Thereafter, the transfer material P now bearing the toner image is separated from the drum 3 by a known separating means and is introduced into an image fixing apparatus 20 along a conveyance guide 10, where the transfer material P is subjected to a heating and fixing operation. Subsequently, the transfer material is discharged to a tray 11.

After the image transfer, the residual toner remaining on the photosensitive drum 3 is removed by a cleaner 12.

Figure 2:
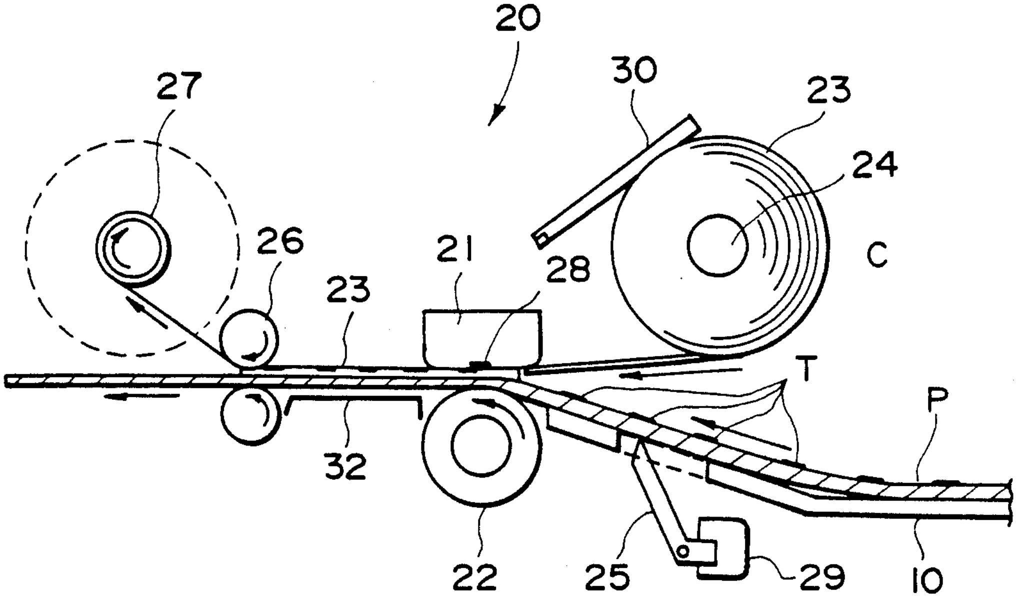
FIG. 2 is an enlarged sectional view of an image fixing apparatus used in the image forming apparatus of FIG. 1.

FIG. 2 is an enlarged view of the fixing apparatus 20 of FIG. 1. The fixing apparatus comprises a heater 21 which includes a base having heat resistive and electrically insulative properties and made of alumina or the like or a base made of a compound material including it, and a heat generating element 28 made of $Ta_2N$ or the like. The heat generating element 28 is in the form of a line or a stripe extended in a direction crossing a direction of the transfer material conveyance. The surface of the heat generating element 28 is protected against sliding by a protection layer, which is made of $Ta_2O_5$. The bottom surface of the heater 21 is smooth, and the front and rear ends are rounded to provide a heating portion (heating surface) to permit smooth sliding relative to a fixing film 23. The base material of the fixing film 23 is PET (polyester). The film 23 has been treated for heat-resistance, and is formed into a thickness of 6 microns approximately, for example. It is wound on a feeding shaft 24 for feeding in the direction indicated by an arrow C. The film 23 is brought into contacted with to the surface of the heater 21, and it is wound up on a film take-up shaft 27 by way of a separating roller 26 having a large curvature.

The heat generating element 28 of the heater 21 has a small thermal capacity. It is pulsewisely energized and is instantaneously heated up to approximately 300° C. each time it is energized by one pulse. A leading edge and a trailing edge of a transfer material P moving on the conveyance guide 10 are detected by a combination of a transfer sheet detecting lever 25 and a transfer sheet detecting sensor 29. In response to the detections, the heat generating element 28 is energized. The control of the energy supply to the heat generating element 28 may be in response to a position detection of a transfer sheet using a sheet feeding sensor or the like of the image forming apparatus.

On the other hand, the pressing roller 22 includes a core made of metal or the like and an elastic layer made of silicone rubber or the like. It is rotate by a driving source (not shown), and the roller 22 urges the transfer material P having the unfixed toner image T and introduced along the conveying guide 10, toward the heater through the fixing film 23 moving at the same speed as the transfer material P. The conveying speed by the pressing roller 22 is preferably substantially the same as the conveying speed of the sheet during the image formation. The moving speed of the fixing film 23 is determined following the speed.

In this embodiment, the heat generating element 28 is instantaneously heated, and therefore, heating during stand-by state is not required. The heat transfer to the pressing roller is small when the fixing operation is not performed. During the fixing operation, the fixing film 23, the toner image and the transfer material are positioned between the heat generating element 28 and the pressing roller 22, and the heating period is short so that the temperature gradient is steep, whereby the pressing roller 22 is not easily heated. Even when the image forming operations are continued at a practical temperature, the temperature of the pressing roller 22 is maintained below the toner fusing point.

In the image fixing apparatus of this structure, the toner image made of a heat-fusible toner on the transfer material P is heated and fused by the heater 21 through the fixing film, and particularly, the surface portion thereof is heated greatly beyond the fusing point and is completely softened and fused. At this time, the pressing roller 22 presses the fixing film, the toner image and the transfer material against the heat generating element, so that heat is efficiently transferred.

Thereafter, heat generation by the heat generating element 28 is stopped. The transfer material continues to be conveyed, and the heat of the toner image is radiated, and the toner image is cooled and solidified, as the transfer material is moved away from the heat generating element position. Then, the fixing film 23 is separated from the transfer material P after passing by the separating roller 26 having a large curvature. At this time, the temperature of the heating roller 22 is maintained below the toner fusing point in this embodiment, and therefore, it is possible to promote the heat radiation of the toner image. Thus, the time required for the cooling may be short, permitting reduction of the size of the apparatus.

As described in the foregoing, the toner image T is once completely softened and fused, and then is solidified, and therefore the coagulation force of the toner is very strong, and the toner behaves as a mass. In addition, since the toner is pressed by the back-up or pressing roller 22 when it is softened and fused by heat, at least a part of the toner image T soaks into the surface layer of the recording sheet P before it is cooled and solidified. This permits the toner image T to be fixed on the recording sheet P without off-set to the fixing film 23.

Here, the state of the toner referred to in this specification will be described. The toner fusing point as used here means the minimum temperature required for fixing the toner and covers the case wherein the viscosity thereof decreases to such an extent as can be said to be fused, at minimum fixable temperature and the case wherein the viscosity decreases to such an extent as can be said to be softened, at minimum fixable temperature. Therefore, even when it is said that the toner is fused for convenience, it actually may mean the viscosity decreased such an extent that it is actually softened. Similarly, when it is said that the toner is cooled and solidified for convenience, it actually may not be solidified depending on the materials of the toner, but can be said that the viscosity is sufficiently increased.

Figure 3:
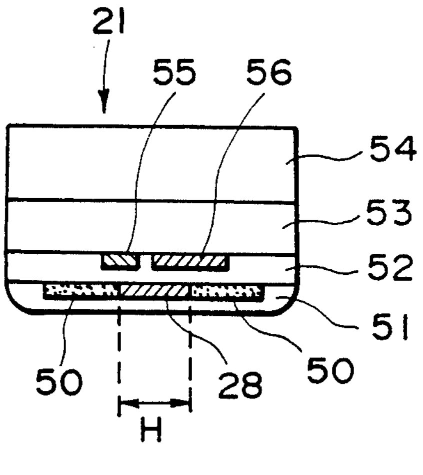
FIG. 3 is an enlarged view of a heater used in the image fixing apparatus of FIG. 2.

FIG. 3 shows the structure of the heater 21 of the fixing apparatus.

The heater 21 includes a base layer 54, an insulating layer 53 on the bottom of the base layer 54, made of a low thermal conductivity and heat resistive material such as bakelite, a thermister 55 of low thermal capacity functioning as a temperature detecting means on the bottom of the insulative layer 53, an auxiliary heat generating element 56 also on the bottom of the heat insulating layer 53, and electrodes 50 and 50 therebelow through a thin insulative layer 52. Between the electrodes 50 and 50, the heat generating element 28 having a width l functioning as a heat generating layer is provided close to the thermister 55. The surface of the heat generating element 28 is coated with a protection layer 51. The heat generating portion H is established on the surface of the protection layer 51 adjacent to the heat generating element 28.

Figure 4:
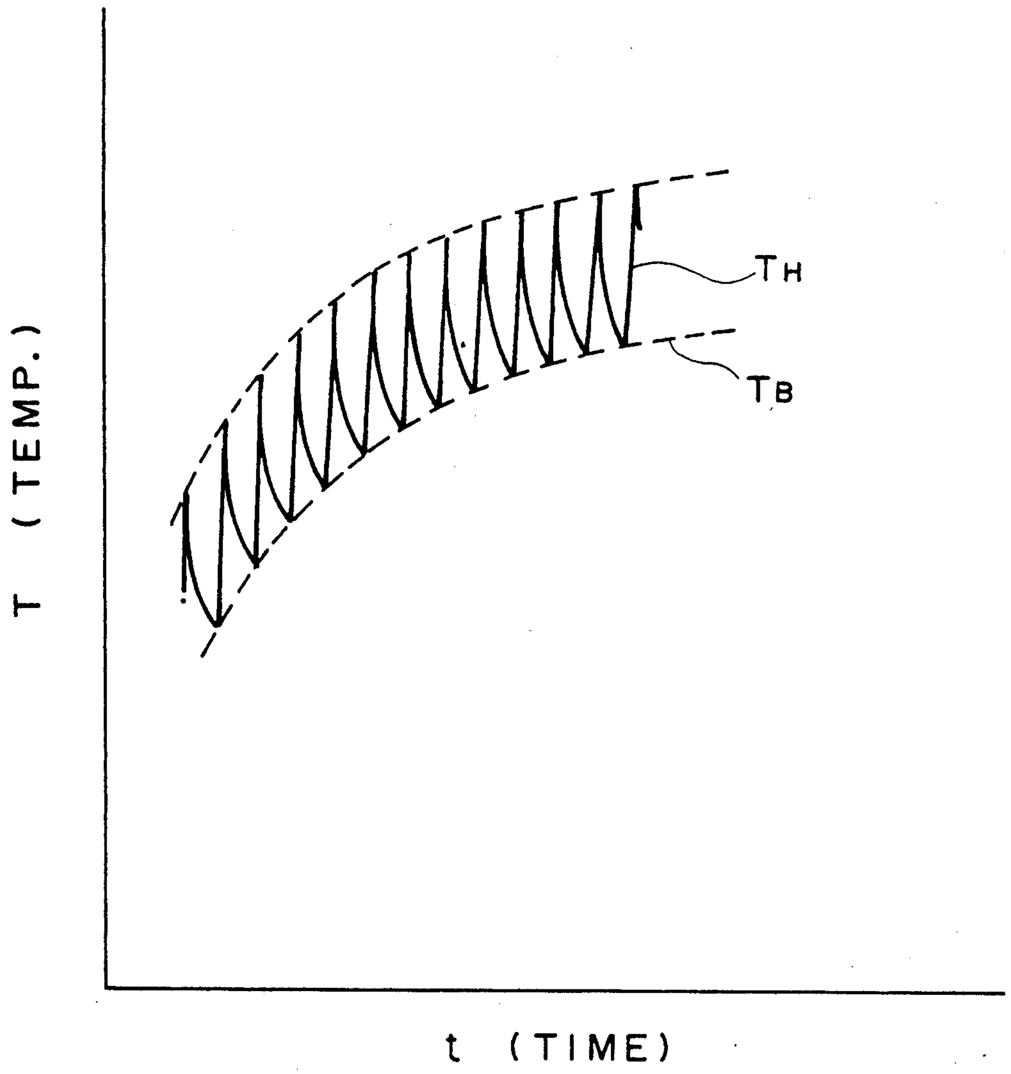
FIG. 4 is a graph explaining a heating principle of a pulsewise energization.

FIG. 4 shows a relationship between a temperature detected by the thermister 55 and the temperature of heating portion H when the heat generating element 28 is energized pulsewisely through the electrodes 50 and 50 in the heater 21 described above. The latter mentioned temperature is detected in a non-contact manner using an infrared radiation temperature detector, and the former temperature is obtained by converting the output of the thermister to the temperature. The period of the pulse application was approximately 10 msec, and the energization duration is approximately 2 msec. The temperature of the heating portion H steeply rises upon energization, and decreases also steeply when the energization is stopped. Since the non-energization period is sufficiently longer than the energization period, and since the insulative layer 53 is provided, the temperature of the heating portion H when the pulse wave takes the minimum level is substantially the same as the temperatures of the heat generating layer 28, the insulator 52 and the thermister 55. The thermister 55 used in this embodiment does not have such a high speed of response as to follow the pulsewise temperature change of such a short width as 10 msec, and therefore, it provides substantially the minimum levels of the pulses. Therefore, the envelope line of the minimum temperature of the surface of the heating portion H is substantially equal to the temperature detected by the thermister 55.

Figure 8:
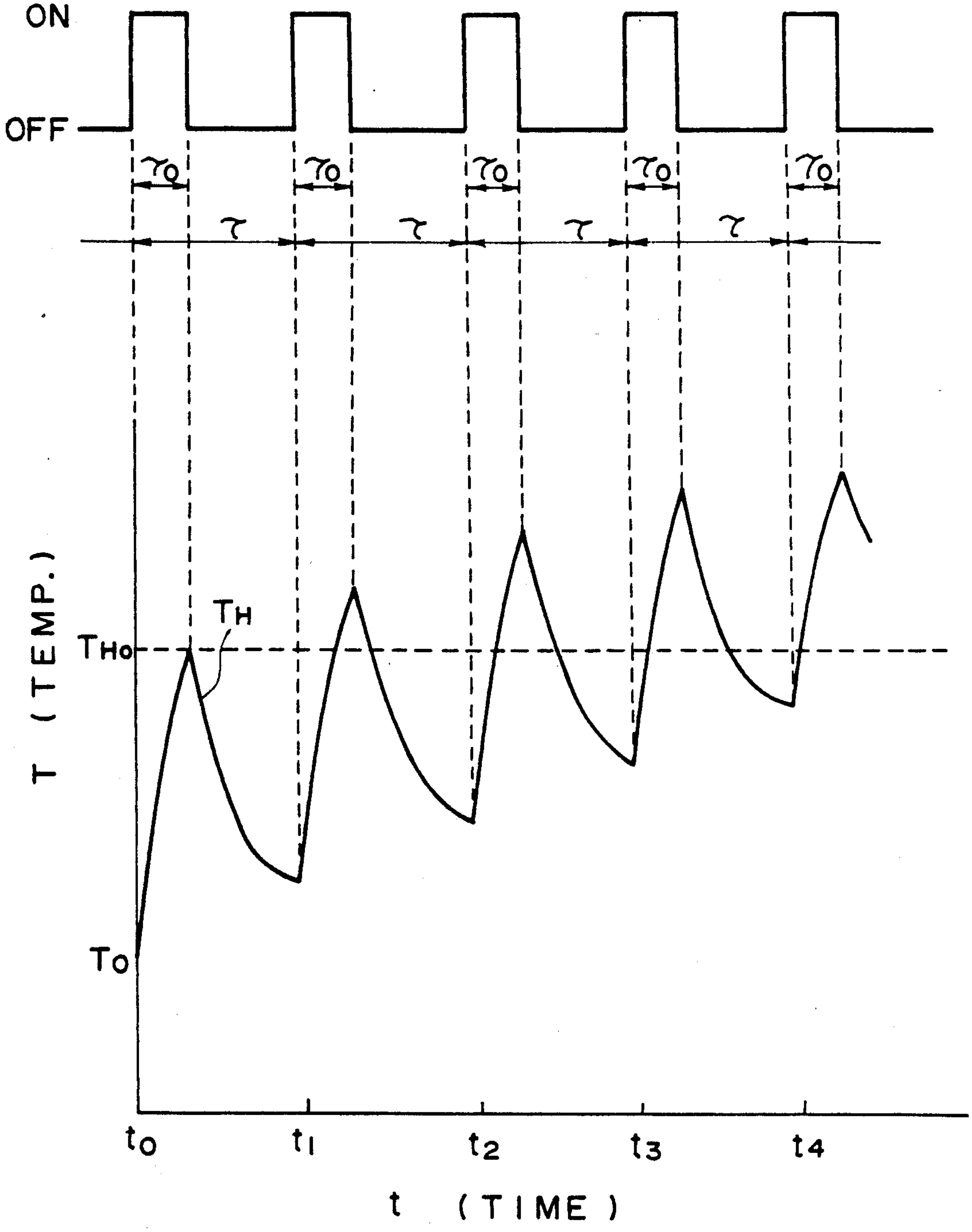
FIG. 8 is a graph showing a temperature change in a comparison example.

FIG. 8 shows the surface temperature change with time, of the heating portion H when the fixing operation is performed with the energization pulse width which is constant ($\tau 0$). As will be understood from this Figure, although the temperature of the heating portion H is initially close to the fixing temperature $T_{H0}$, the temperature of the heating portion H increases far beyond the fixing temperature $T_{H0}$as the fixing operation continues, since the amount of generated heat is constant despite the parts around the heat generating element 28 is heated with the result of increase of the minimum temperature, as the fixing operation continues. This means that the electric power is wastefully consumed, and in addition, that the problem of increase of the inside temperature of the apparatus will become significant. If the number of continued fixing operations is very large, the heat generating element is extremely heated to such an extent that it is damaged. Furthermore, the fixing film press-contacted to the heating portion H is liable to be thermally deformed.

In order to solve the problems, the power supply pulse width to the heat generating element 28 is changed to maintain a constant fixing temperature $T_{H0}$ in this embodiment.

Figure 5:
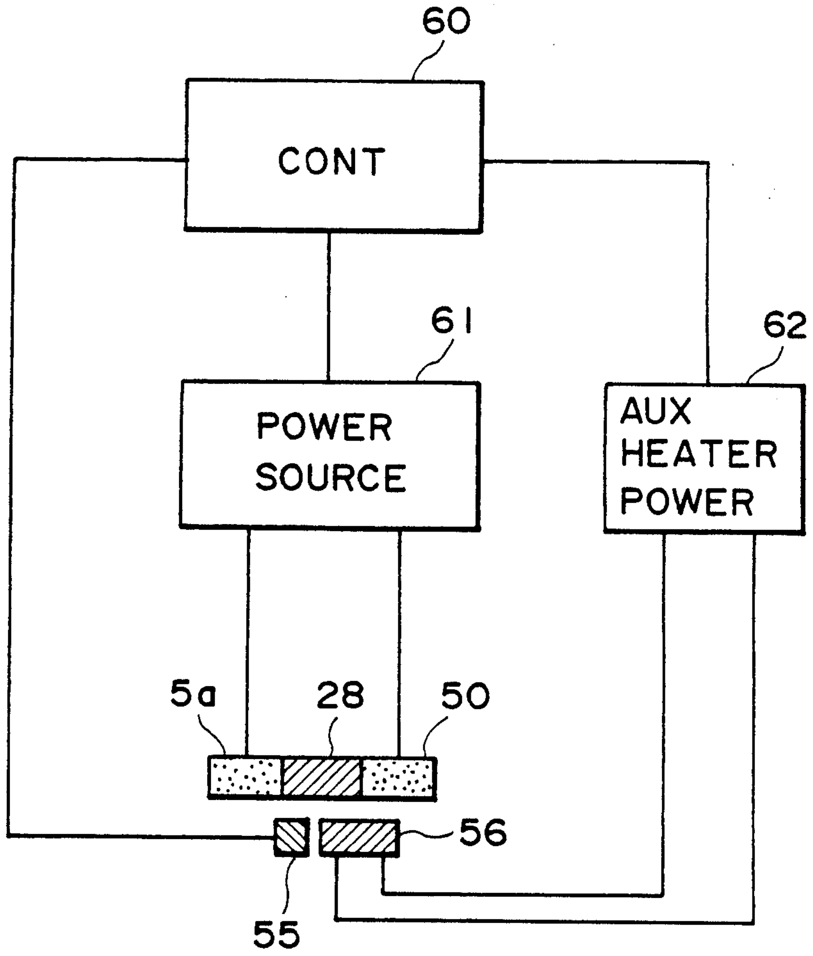
FIG. 5 shows a fundamental structure of a power supply circuit.

FIG. 5 shows a fundamental structure of the power supply circuit for supplying power to the heat generating element 28 and the auxiliary heat generating element 56. The control system includes a control circuit 60 containing a microcomputer, which is responsive to the temperature detection of the thermister 55 to control switching means (not shown) such as a power FET, so that the pulse width of the power supply from the power source circuit 61 to the heat generating element 28 is changed to control the power supply to the heat generating element 28. The auxiliary heat generating element 56 is energized by an auxiliary heat generating element power source 62 which is an alternating power source, in response to instructions of the control circuit 60.

The reasons why the power supply to the heat generating element 28 is controlled in this embodiment will be described. In order to prevent heat radiation from the heat generating element 28 to the base 54 in the heater 21 in this embodiment, the heat insulative layer 53 is provided. The purposes thereof are (1) to reduce the energy consumption by eliminating wasteful heat radiation and thus increasing the energy use efficiency and (2) to reduce the inside temperature rise of the apparatus attributable to the heat radiation from the base 54.

If the heat insulating function is simply employed without control of the power supply to the heat generating element 28, the quantity of heat generation is significantly larger than the amount of heat radiation, with the result of extremely high temperature rise of the heat generating element 28 and the heating portion H. Then, there occurs a liability that the heat generating element 28 and the fixing film 23 is thermally damaged. Therefore, when the insulative layer 53 is employed, the control of the power supply to the heat generating element is sufficient to prevent the overheating of the heating portion H.

The description will be made as to the power supply control to the heat generating element 28 in this embodiment. In the pulse heating fixing system of this embodiment, the toner is heated only in a short period to the order of msec as described hereinbefore, and therefore, the temperature of the heating portion H rather than the toner heating period is ruling in the fixing performance, and the temperature of the toner layer is increased in accordance with the maximum temperature which is reached by the heating portion H. In consideration of this, the sufficient fixing performance can be obtained without wasteful power consumption, if the power supply to the heat generating element 28 is so controlled that the maximum temperature of the heating portion H is maintained during the fixing process at a temperature $T_{H0}$, where $T_{H0}$ is a temperature of the heating portion H when the toner is softened to such an extent that it is sufficient for the fixing.

Figure 6:
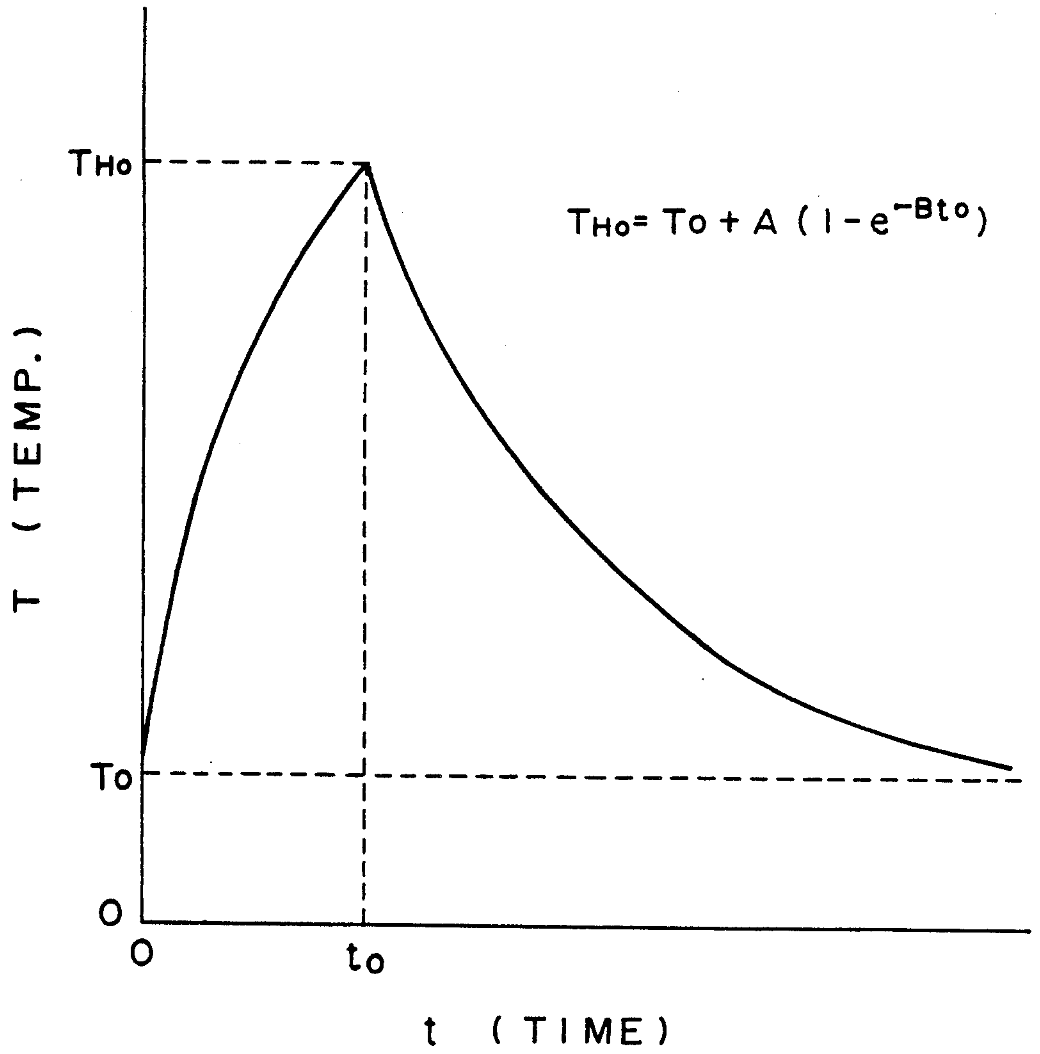
FIG. 6 is a graph showing the temperature change in the heating portion during one pulse power supply to an electrode.

Referring to FIG. 6, it is assumed that the temperature of the heating portion H is a reference temperature $T_0$, and that the temperature of the heating portion H reaches the fixing temperature $T_{H0}$ when a constant voltage V is supplied to the electrode 50 during a period of $t_0$. The experiments by the inventors have revealed that the following relation is satisfied:

$$T_{H0}=T_0+A(1-e^{Bt_0}) \quad \ldots (1)$$

where A is a coefficient determined by the power supply to the heat generating element 28, and B is a coefficient determined on the heat radiation paths from the heating portion H.

Further, the inventors' experiments have revealed that the following relation is satisfied:

$$A=k(V^2/R) \quad \ldots (2)$$

where V is a voltage of the power supply to the heat generating element 28, R is a resistance of the heating generating element 28, and k is a constant.

Where the temperature of the heating portion H is $T_B$, the pulse width $\tau_B$ the power supply required for raising the temperature to $T_{H0}$, satisfies:

$$T_{H0}-T_B=A'(1-e^{-B'\tau_B}) \quad \ldots (3)$$

where B' is constant if the room temperature and the heating generating element temperature are within predetermined ranges. Therefore, it can be determined by experiments, using the equation (1).

Then, B=B'

In addition, A' is substantially constant if the power supply voltage V to the heat generating element 28 and, the resistance R of the heat generating element 28 are constant. Therefore, if A is empirically determined under the condition of a standard voltage $V_0$ and a standard resistance $R_0$, and if V is nearly equal to $V_0$, and R is nearly equal to $R_0$, the equation, A'=A results.

If A'=A, and B'=B, the equation (3) is $$T_{H0}-T_B=A(1-e^{-B'\tau_B}) \quad \ldots (3')$$

$$\tau_B=(1/B)ln[1/(1-(t_{HO}-T_B)/A)] \quad \ldots (4)$$

Since A and B can be determined empirically, if the fixing temperature $T_{H0}$ is determined to be a certain level, and if the temperature $T_B$ is detected by the thermister 55, the maximum temperature of the heat generating element can be controlled to be the fixing temperature $T_{H0}$ by the heat generating element is energized during the pulse width $\tau_B$ determined by the above equation (4).

Where the heat generating element 28 is energized pulsewisely with a sufficiently small duty ratio in this embodiment, the temperature of the heating portion H is substantially equal to the detected temperature of the thermister 55 when the heating portion H has the minimum temperature of the pulsewisely changing temperature, that is, immediately before the next pulse energization start, as described hereinbefore. Therefore, the use is made of the temperature detected by the thermister 55 at this time, and the next energization duration is determined in accordance with the equation (4), and then, the power is supplied from the power source 61 to the heat generating element 28 during the period $\tau_B$ in the control circuits of FIG. 5.

Figure 7:
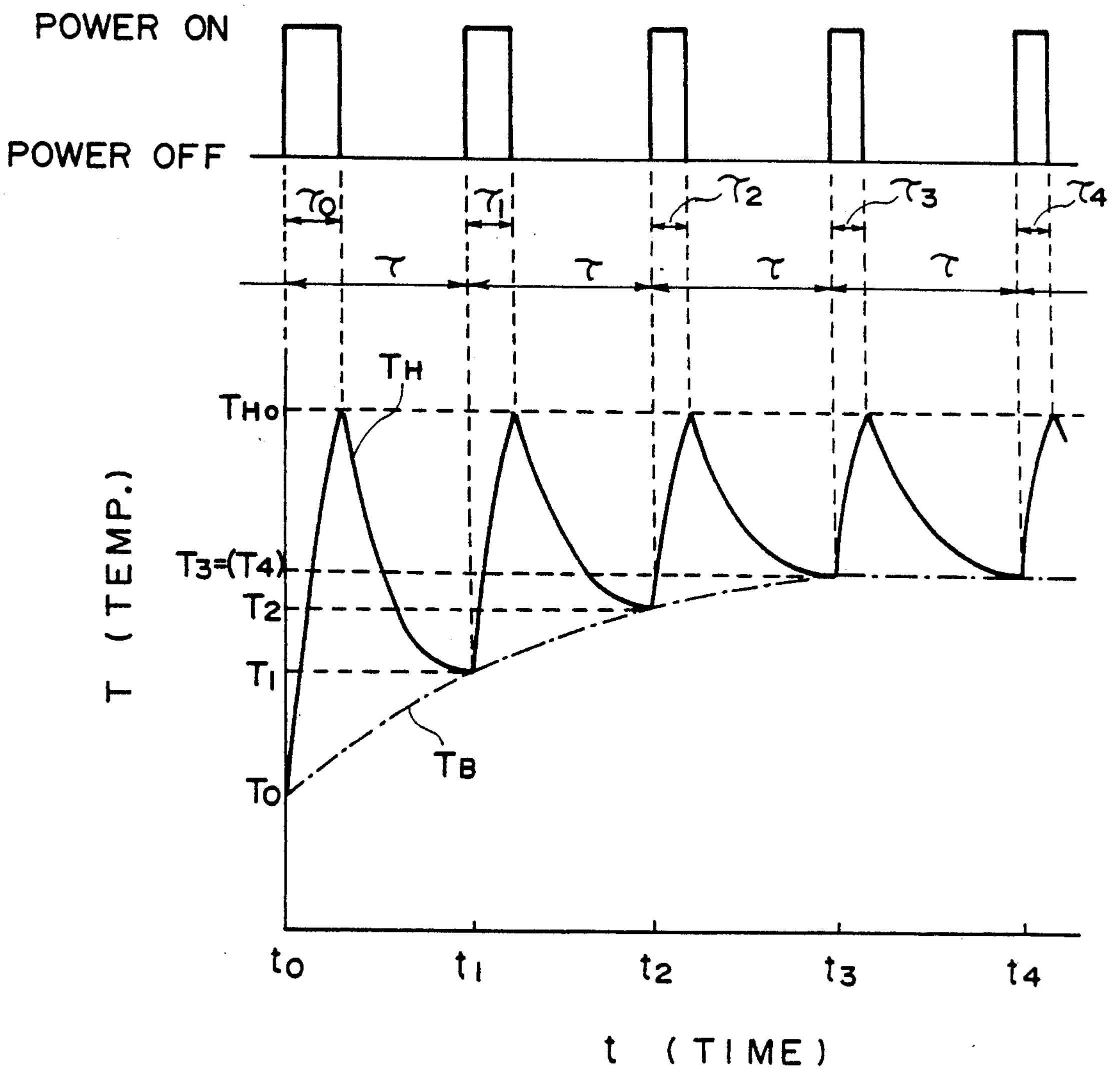
FIG. 7 shows a temperature change in the heating portion when the pulse width is changed.

FIG. 7 shows the temperature change with time, of the heating portion H during the fixing operation together with the power supply timing to the heat generating element 28. In this embodiment, the voltage of the power supply to the heat generating element 28 and the period of the energization pulses are both constant. At the point of time $t_0$ when the temperature of the heating portion H is $T_0$ the fixing operation starts. The temperature of the heating portion H reaches the fixing temperature $T_0$ by the pulse energization having a pulse width $\tau$ determined only from the temperature $T_0$. It then decreases to a temperature $T_1$ which is higher than the temperature $T_0$ during the rest period $(\tau-\tau_0)$ which is sufficiently longer than $\tau_0$. Next, at a time $t_1$ which is $\tau$ (pulse interval) after the time $t_0$, the second energy supply is effected to the heat generating element 28 during a pulse width $\tau_1$ which is determined only on the basis of the temperature $T_1$ and which is shorter than $\tau_0$, by which the temperature of the heating portion H also increases to $T_{H0}$, and it decreases upon the power supply stop. In a similar manner, the temperature detected by the thermister 55 is read at pulse intervals $\tau$ after the start of the power supply; a pulse width $\tau_B$ is determined by the equation (4) on the basis of the detected temperature; and the power is supplied to the heat generating element 28 during the pulse width $\tau_B$. By doing so, the local maximum temperature of the heating portion H can be maintained at the fixing temperature $T_{H0}$.

If $A < T_{H0} - T_0$, the fixing temperature $T_{H0}$ is not reached by the power supply for the period of the pulse width $\tau_B$, but it is reached by several pulses, that is, several tends msec.

If $A > T_{H0} - T_0$, and if a maximum rated pulse width provided by the performance of the power source is smaller than the pulse width required to increase the temperature of the heating portion H to the fixing temperature $T_{H0}$, the temperature of the heating portion H can be increased to the fixing temperature $T_{H0}$ in a very small period of time.

The description will be made as to the power supplying timing to the heat generating element 28.

Figure 9:
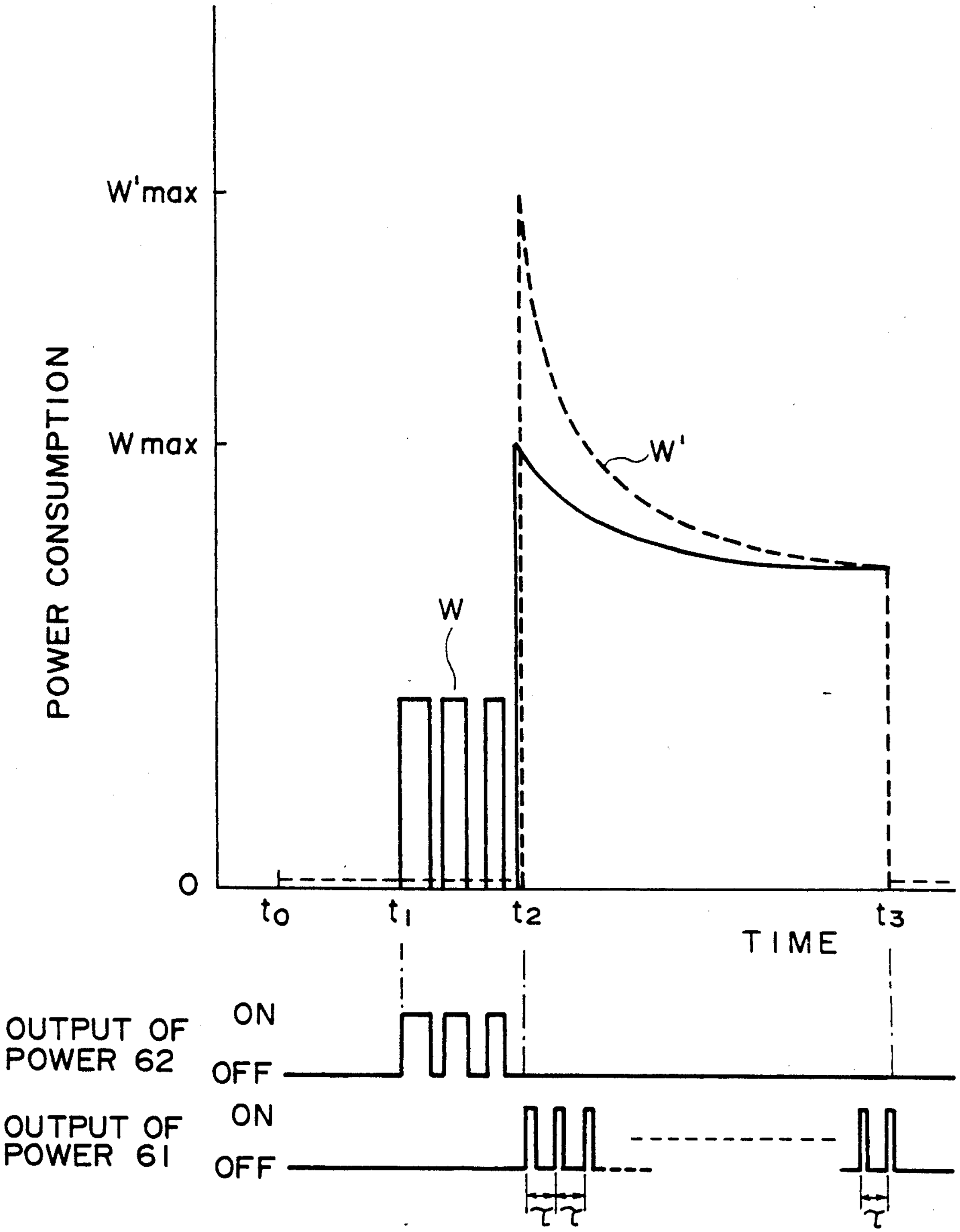
FIG. 9 is a graph of a power consumption vs. power supply timing to the heater.

FIG. 9 shows the times of pulse supply to the heat generating element 28 and the auxiliary heat generating element 56, together with a sum of the power consumptions of the power sources 61 and 62 with time. The power consumption of the power source 61 is deemed as an average power consumption per one period $\tau$. The reason for this is as follows. In ordinary pulse power sources including that used in this embodiment, the pulsewise voltage output are obtained by charging and discharging of a capacitor, in which the power required by one discharging action is proportional to the capacity of the capacitance which is practically required. The capacity of the capacitance is substantially proportional to the volume thereof, and therefore, the size of the pulse power source 61 increases with the capacity of the capacitor, and the size of the power source 61 increases with an average power per one period $\tau$.

The copying operation is started at time $t_0$. The leading end of the transfer sheet onto which the toner image formed on the photosensitive drum is transferred is detected at time $T_1$ by the transfer sheet detecting arm 25 and the transfer sheet detecting sensor 29. The detection output is supplied to the control circuit 60. Then, the power supply to the auxiliary heat generating element 56 from the auxiliary heat generating element power source 62 by the control circuit 60. The control circuit 60 on-off-controls the output of the power source 62 so that the temperature detected by the thermister 55 is maintained at a temperature $T_0$ which is sufficiently lower than the toner softening temperature $T_M$. Since the thermister 55 is disposed closely to the heating portion H, the temperature of the heating portion H is maintained at the temperature $T_0$. The output of the auxiliary heat generating element power source 62 is stopped at time $t_2$ which is a predetermined period after the time $t_1$, after simultaneously the pulsewise power supply from the power source 61 is started. The control circuit 60 controls the output pulse widths of the power source 61 in response to the detected temperature by the thermister 55 so that the local maximum temperatures at the heating portion H is substantially maintained at the temperature $T_{H0}$ which is far higher than the toner softening temperature $T_M$, in the controlling manner described above. By detecting the trailing edge of the transfer sheet by the transfer sheet detecting arm 25 and the transfer sheet detecting sensor 29, time $t_3$ at which the trailing edge of the transfer sheet passes by the heating portion H can be determined in consideration of the time when the leading edge is detected. At the time $t_3$ thus determined, the power supply from the power source 61 is stopped, and thereafter, the image forming operation is completed.

During the period between the time $t_2$ and the time $t_3$ (image fixing operation period), the output pulse width of the power source 61 is maximum at the time $t_2$, and it decreases with progress of the fixing process by broken lines. Therefore, the power consumption W is maximum, Wmax, at the time $t_2$.

The change of the power consumption W' with time when the auxiliary heat generating element power source 62 is not energized at all is shown by broken line. The power consumption W' also takes the maximum Wmax' at time $t_2$ similar to the power consumption W.

As compared with the power consumption Wmax', the power consumption Wmax is far smaller. The reason for this is that since the temperature of the heating portion H is maintained beforehand at the temperature $T_0$ which is sufficiently higher than the room temperature, the pulse energization by the power source at the initial stage is far smaller.

Figure 10:
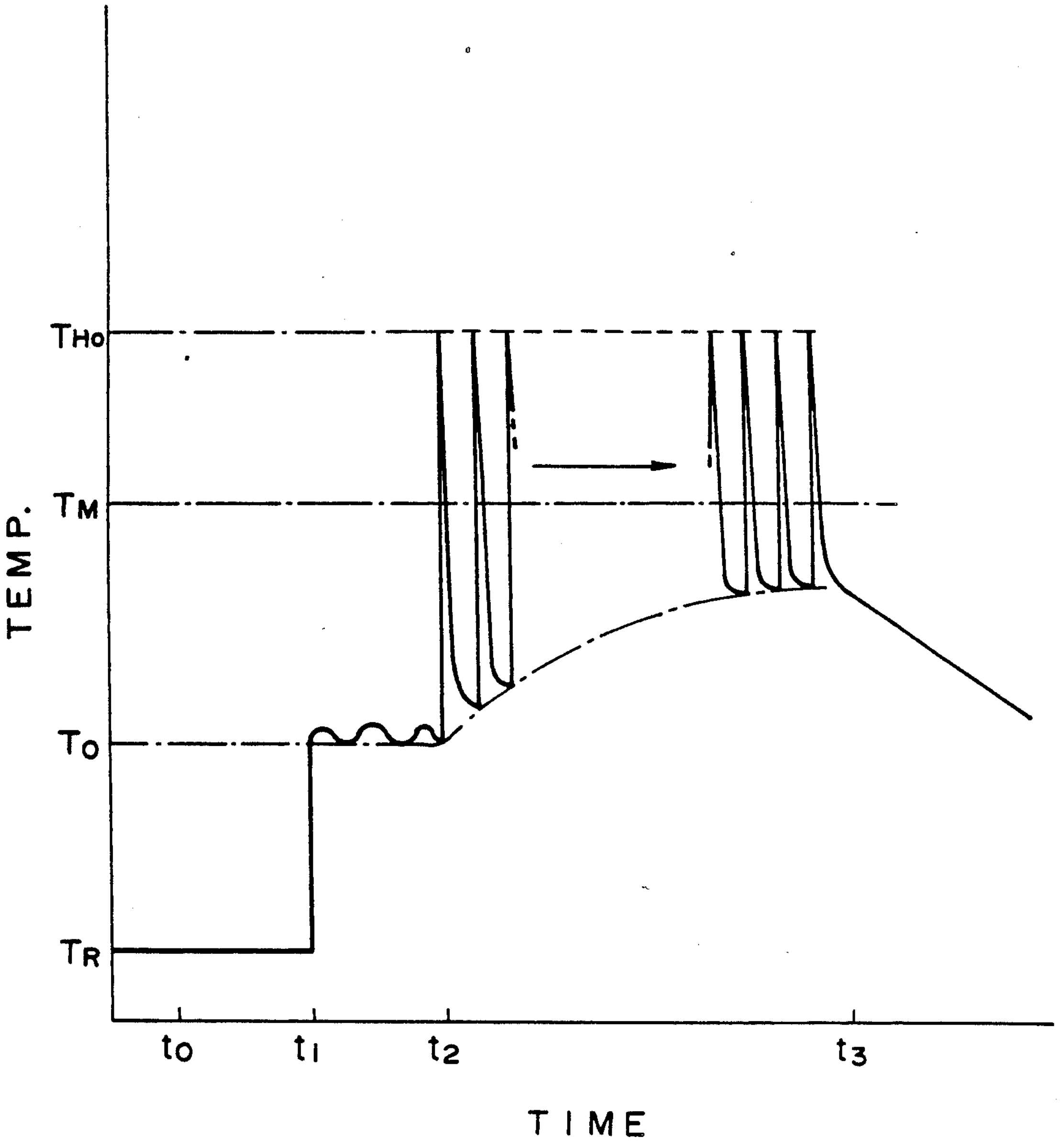
FIG. 10 is a graph showing a temperature change in a heating step.

FIG. 10 shows the temperature change of the heating portion H with time when the image forming apparatus is controlled in the manner described in conjunction with FIG. 9, is shown by solid lines. From the point of time $t_0$ to the time $t_2$, the temperature of the heating portion H is maintained below the toner fusing point $T_M$. Continuous image forming operations have been performed with the temperature which is practically required in the image forming apparatus, the temperature of the heating portion when the fixing operation is not carried out, has been always maintained below the temperature $T_M$. Therefore, the temperature of the pressing roller urged to the heating portion H through the fixing film is at all times below the temperature $T_M$ when the fixing operation is not performed. During the fixing operation, the fixing film, the toner image and the transfer sheet are between the heating portion H and the heating roller 22, and there is a steep temperature gradient from the heating portion H to the pressing roller due to the short heating period, and for these reasons, the temperature of the pressing roller hardly increases. Thus, the temperature of the pressing roller is maintained at or below the toner fusing temperature $T_M$ even if the normal continuous image forming operation is carried out.

In the apparatus of this embodiment described above, the toner image on the transfer sheet P which is made of heat fusible toner is first heated and fused by the heating portion H through the fixing film 23. Particularly, the surface portion of the toner image is heated up to highly above the fusing point and is completely softened and fused. At this time, the pressing roller 22 presses the fixing film, the toner image and the transfer material to the heating member, so that the heat transfer is efficient.

Thereafter, the heat generation of the heater 21 is stopped, and the transfer material is conveyed, and further, it is separated from the heater, by which the heat of the toner image is radiated, so that the toner image is cooled and solidified. After passing by the separating roller pair 26 having a large curvature, the fixing film 23 is separated from the transfer sheet P.

Since in this embodiment, the temperature of the pressing roller 22 is maintained below the toner fusing point, it is possible that the heat radiation of the toner image is promoted. This reduces the time period required for the cooling, and makes it possible to reduce the size of the apparatus.

In addition, the preliminary heating by the auxiliary heater 56 in the heating portion H from the time $t_1$ to the time $t_2$ is performed only during the image forming operation and prior to the fixing operation. This makes it possible to reduce the power consumption when the image forming operation does not carry out the image forming operation, and in addition, the temperature rise in the apparatus can be prevented.

Since preliminary heating is started after the start of the image forming operation, the waiting period for the preliminary heating is not required. In other words, the preliminary heating is carried out after the image forming operation is started and before the transfer material reaches the heating portion of the fixing apparatus.

An experiment by the inventors will be described. The toner had the softening or fixing temperature of approximately 125° C. A toner image T was formed on a transfer sheet having a thickness of 100 microns with the toner at a room temperature 20° C. The fixing operation was carried out by the pulse energization having a period of 10 msec at a process speed of 50 mm/sec, during which the pulse width was controlled using a temperature detected by the thermister 55 so that the local maximum temperatures of the heating portion H was 300° C. Images without any practical problem were produced. The transfer sheet detecting arm and the transfer sheet detecting sensor were disposed 150 mm upstream of the heating portion H, and the preliminary heating was started when the leading edge of the transfer sheet reached the sensing system, that is, 3 sec before the start of the fixing operation of the transfer sheet, so that the temperature of the heating portion H by the pre-heating was 80° C.

Figure 11:
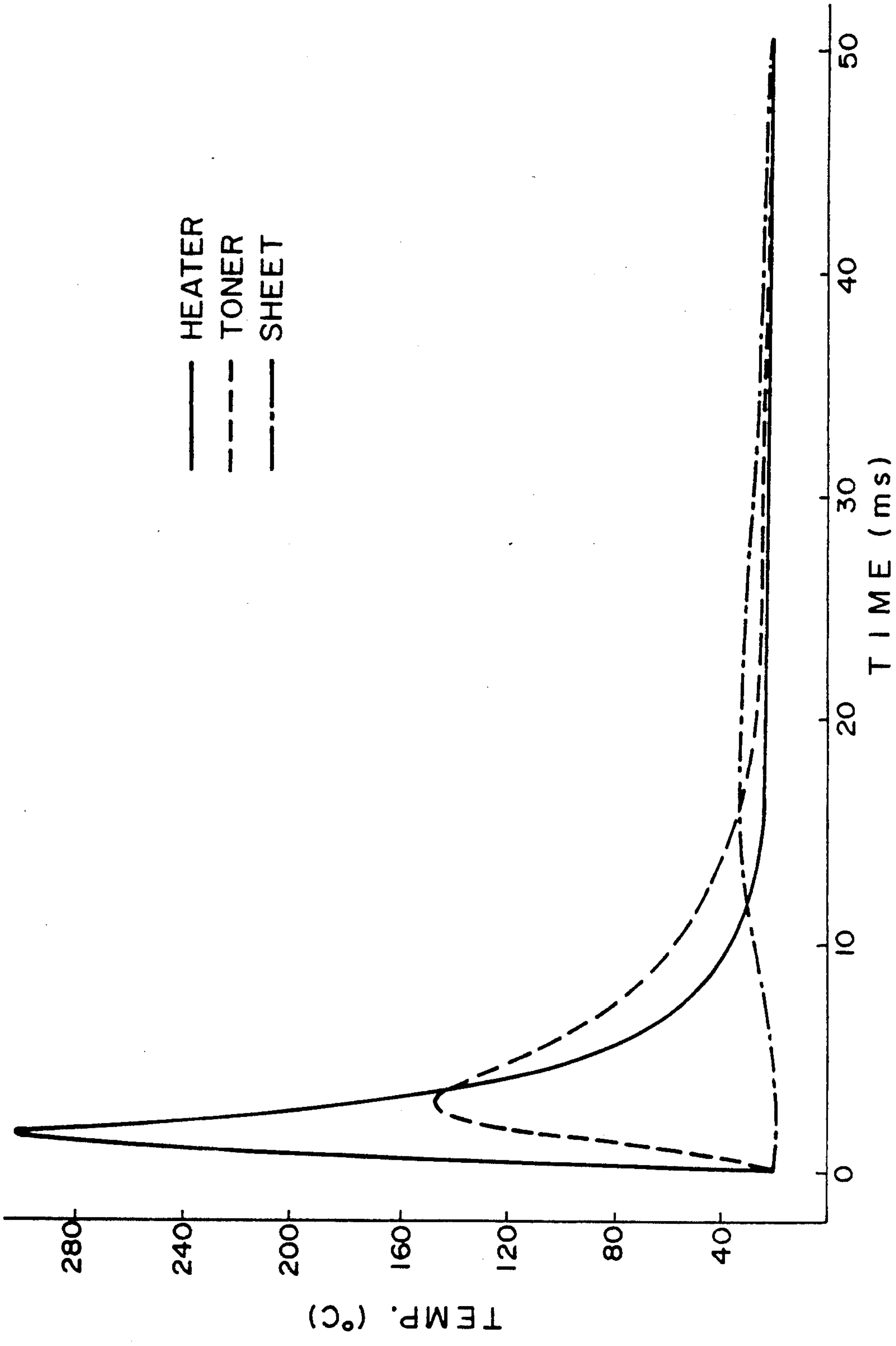
FIG. 11 is a graph showing temperature changes in various parts during the heating step under a predetermined condition.

FIG. 11 is a graph showing changes, with time, of a temperature of the toner layer at a center of its cross-section and the temperature of the transfer sheet at the center thereof in its cross-section, when a transfer sheet having a toner layer on its surface is subjected to an image fixing operation using the fixing apparatus of this embodiment. The conditions are:

Heating conditions: 2 ms heating at energy density of 25 w/mm$^2$

Toner fixing temperature: 125° C.

Fixing film: PET having a thickness of 6 microns

Toner layer thickness: 20 microns

Thickness of the transfer sheet: 100 microns

Room temperature: 20° C.

In the apparatus, the temperature of the heating portion H is increased approximately 300° C. which is far higher than the toner fixing temperature 125° C., and therefore, the toner is sufficiently heated beyond the fixing temperature, and therefore, the good fixing can be effected.

On the other hand, the temperature rise of the transfer sheet is extremely small, and therefore, the wasteful energy consumption is much smaller than in the conventional heating roller fixing system.

It is understood that even if the heating period and the heating energy density vary with the result of application of excessive energy, the high temperature toner offset is not produced, and therefore, the tolerable range of the heat control is wide.

If the preliminary heating wherein the power is supplied to the auxiliary heat generating element 56 during the image forming operation is effected while the heater 21 and the pressing roller 22 are urged to each other through the fixing film 23, there occurs a liability that the pressing roller 22 is overheated so that the cooling effect during the cooling step decreases with the possible result of the high temperature offset. In addition, the heat of the heater 21 is transferred to the pressing roller, thus decreasing the efficiency of the preliminary heating.

In consideration of this, in this embodiment, the urging action between the heat generating element 21 and the pressing roller 22 is released during the preliminary heating step, by which the heater 21 and the pressing roller 22 are spaced apart, and the heat is not transferred from the heat generating element 21 to the pressing roller 22.

Figure 15:
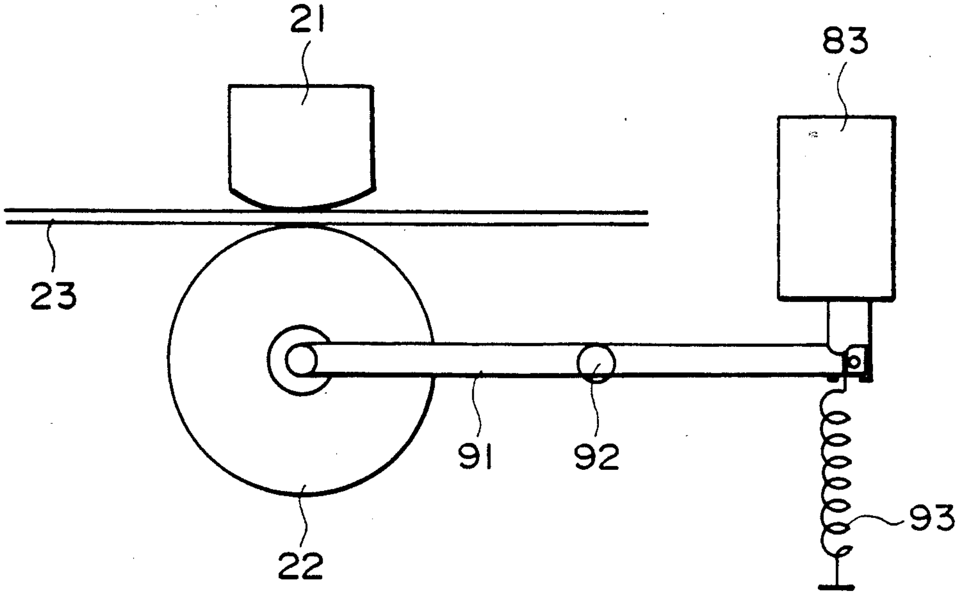
FIG. 15 shows a structure of the pressure releasing mechanism.

FIG. 15 shows an example of the pressure releasing mechanism. In this Figure, the pressing roller 22 is mounted adjacent an end of a pressing arm 91 which is rotatable about a pivot 92. The pressing arm 91 normally urges the pressing roller 22 toward the heater 21 by a compression spring 93 mounted thereto adjacent the other end. A pressure releasing solenoid 83 is mounted adjacent to the other end of the pressing arm 91. When it is energized, the pressing arm 91 is rotated in the counterclockwise direction against the spring force of the pressure spring 93 to release the pressure between the pressing roller 22 and the heater 21.

Figure 12:
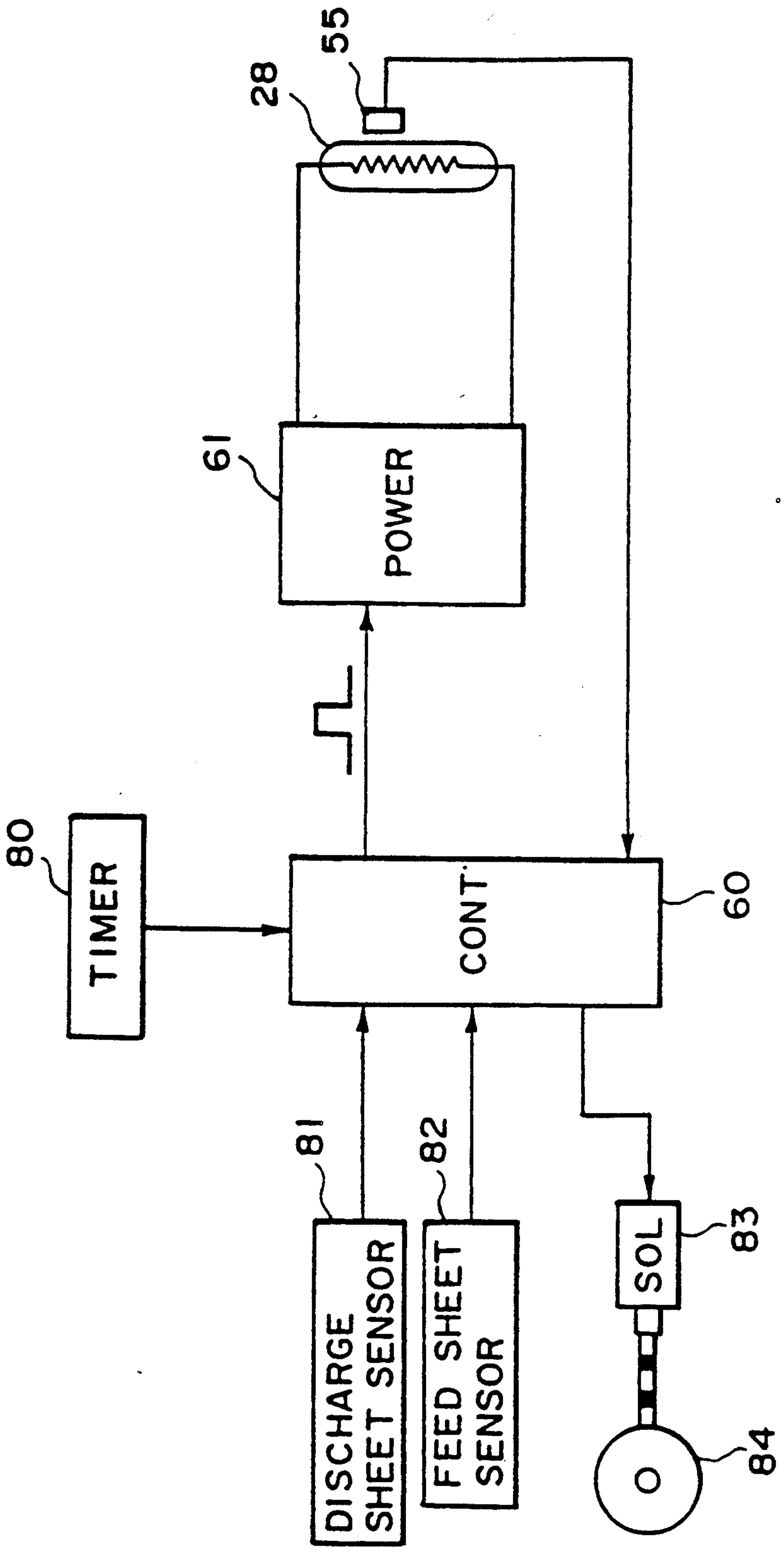
FIG. 12 shows a control circuit for controlling a pressure releasing mechanism.

FIG. 12 is a block diagram of a circuit for controlling the pressure releasing solenoid of the pressure releasing mechanism. A sheet discharge sensor 81, a sheet feed sensor 82 are connected to the control circuit 60, so that the times of the transfer material feeding and the transfer material discharging are detected. The solenoid 83 functions to release the pressure of the pressing roller 84. The control circuit 60 controls the timing using a timer 80, and controls the temperature in response to the temperature detecting element 55. The control circuit 60 detects output of the sheet feed sensor 82 and the sheet discharge sensor 81, and controls the energization for the preliminary heating, the energization for the fixing process and the pressing action of the pressing roller in a timed relation predetermined.

Figure 13:
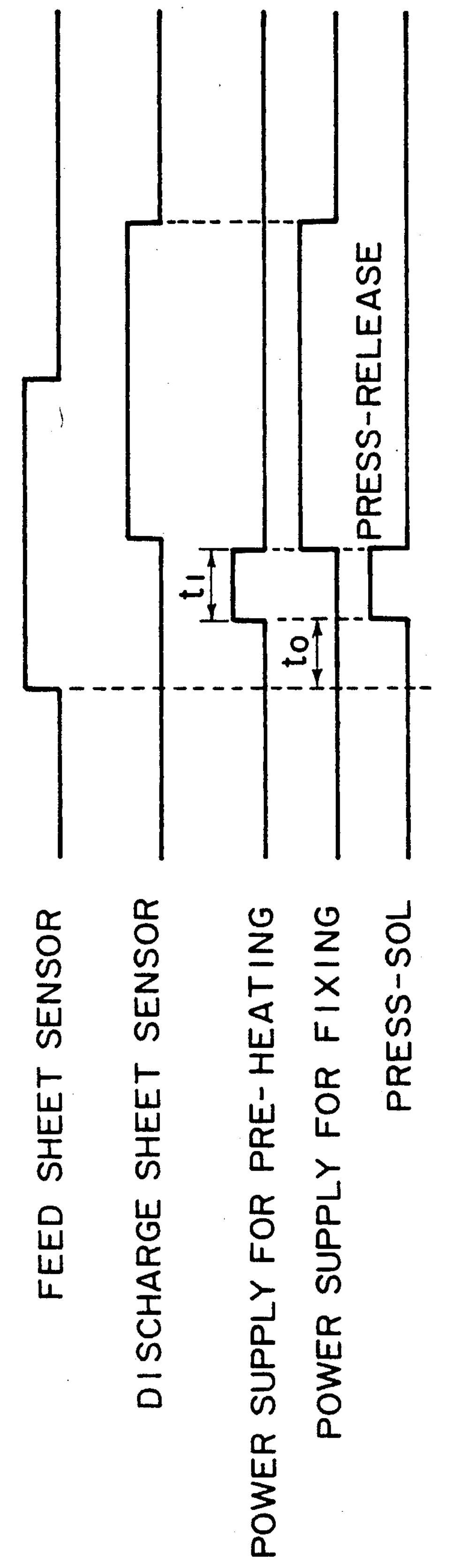
FIG. 13 is a timing chart.
Figure 14:
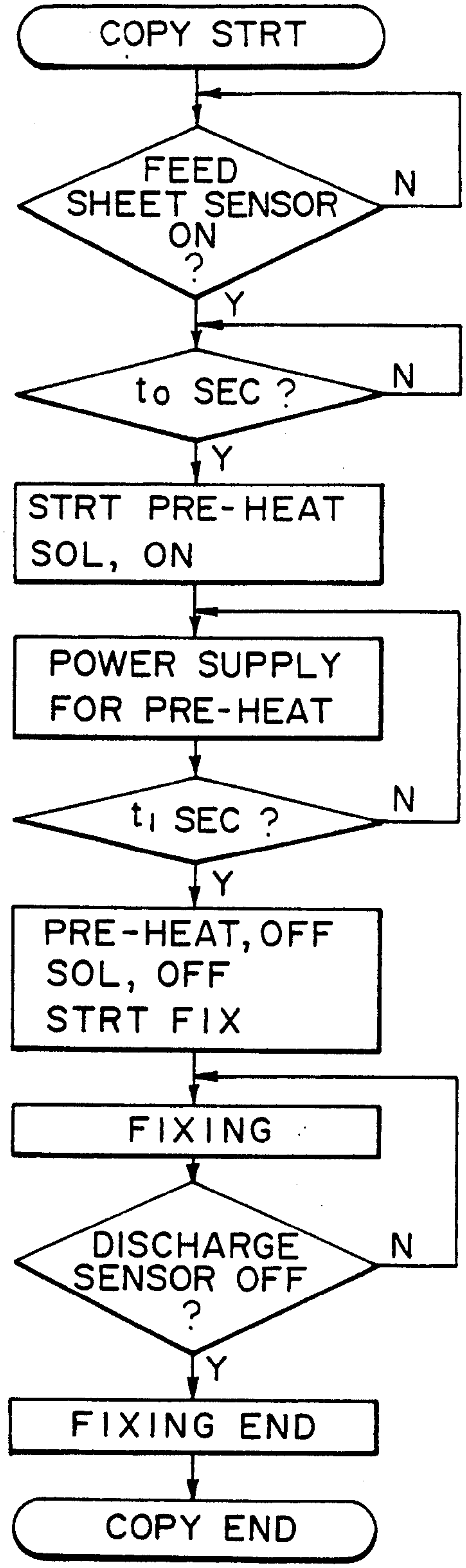
FIG. 14 is a flow chart.

Referring to FIGS. 13 and 14, the operation of the control circuit 60 will be described. The control circuit 60 starts the preliminary heating, $t_0$ after the sheet feed sensor is actuated after the start of the sheet feed. At this time, the pressure releasing solenoid is energized to disengage the fixing film 23 from the pressing roller 84. When time $t_1$ elapses (the time determined by the sheet feed sensor position, the position of the fixing nip and the speed of the transfer material conveyance), the pressure releasing solenoid is deenergized to press-contact the pressing roller to the fixing film, and the preliminary heating is stopped, whereas the heat generating element 28 is energized. In FIG. 13, the processing period of the preliminary heating and fixing heating are only shown. However, the actual energization signals are produced by pulse energizations at a constant period. When the transfer sheet passes by the sheet discharge sensor 81 so that the output of the sheet discharge sensor 81 is deactivated, the power supply to the heat generating element 28 is stopped.

This procedure may be modified as follows. The passage of the trailing edge of the transfer sheet through the fixing device is detected as a predetermined period of time $t_3$ from the time when it passes by the sheet feed sensor 82 (switching-off the feeding sensor 82), wherein the time period $t_3$ is predetermined on the basis of the speed of the transfer material conveyance and a distance from the sheet feed sensor to the outlet of the fixing nip.

The power supply to the heat generating element 28 is stopped after the time $t_3$ elapses.

Another alternative will be explained. This alternative uses the fact that the pressing roller 22 lowers by the amount of the thickness of the transfer material when the transfer material is in the nip. Therefore, by detecting the position of the shaft of the pressing roller 22, the fact that the transfer material has passed through the fixing device can be detected. In response to it, the power supply to the heat generating element 28 is stopped.

According to this embodiment described above, the power supply and stop thereof to the heater can be controlled on the basis of the detection of the transfer material, and particularly, the power supply to the heater can be stopped while the transfer material is at least partly within the image forming apparatus after passage through the heating portion. Therefore, the energy consumption can be saved.

Figure 16:
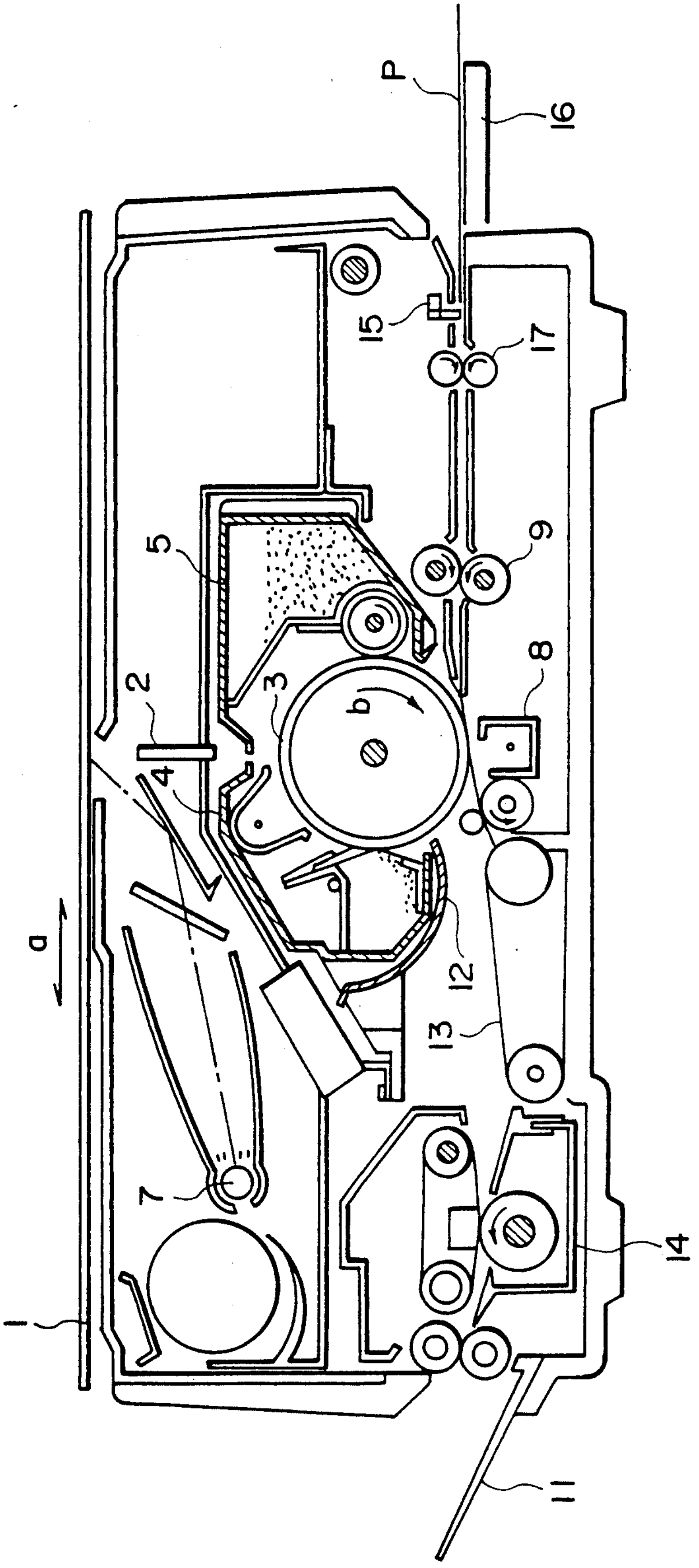
FIG. 16 is a sectional view of an image forming apparatus according to another embodiment of the present invention.

Referring to FIG. 16, an image forming apparatus according to another embodiment will be described. The description of the portions which are similar to the FIG. 1 embodiment will be omitted for simplicity. A sheet P is inserted along a manual sheet feed guide 16, and is conveyed by a feeding roller 17 to a registration roller 9. The sheet manually fed is detected by a sheet feed sensor 7. Then, the sheet P is fed to between the photosensitive drum 3 and the transfer charger 8 by a pair of the registration rollers 9 which are press-contacted vertically, at the timing in synchronization with the image on the photosensitive drum 5. The sheet P is separated from the photosensitive drum 3 by a known separating means and is introduced into a fixing apparatus 14 by a conveying belt 13. The sheet P is discharged to the tray 11 after having been subjected to the heating and fixing operation.

Figure 17:
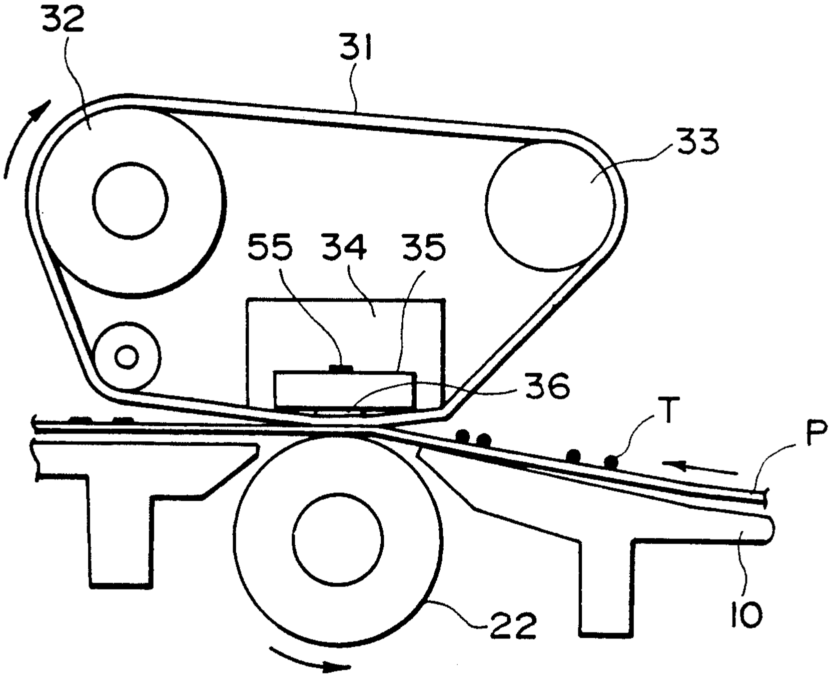
FIG. 17 is a sectional view of an image fixing apparatus employing an endless film.

FIG. 17 shows an enlarged view of the fixing apparatus 14 of this embodiment. Designated by a reference numeral 34 is a fixed linear heating element having a low thermal capacity and includes an alumina base 35 having a thickness of 1.0 mm, a width of 6 mm and a length of 240 mm and electric resistance material 36 applied in a width of 1.5 mm thereon, for example. Power supply wiring is connected to the opposite longitudinal ends. The power supply is in the form of a pulse wave having a period of 20 msec and an amplitude of 100 V (DC). The pulse width is changed in accordance with energy radiation so that the temperature detected by the temperature detecting element 55 is at a desired level. Generally, the pulse width ranges from 0.5 msec–5 msec. The fixing film 31 moves in contact with the heater 34 which is controlled in the energy application and the temperature. An example of the fixing film is in the form of an endless film including a heat resistive film having a thickness of 20 microns made of polyimide, polyetherimide, PES, PFA or the like, for example and a releasing layer having a thickness of 10 microns made of fluorinated resin such as PTFE or PFA added by conductive material, coated at least on the side of the heat resistive film contactable to the image. Generally speaking, the total thickness thereof is smaller than 100 microns, and preferably smaller than 40 microns. The film is driven by a driving roller 32 and a follower roller 33 between which the endless film is tensioned, so that it moves in the direction of an arrow without crease. A pressing roller 22 has a rubber elasticity layer having a good releasing property, made of silicone rubber or the like. It urges the film to the heating member under a total pressure of 4–7 kg and rolls on the film.

Figure 18:
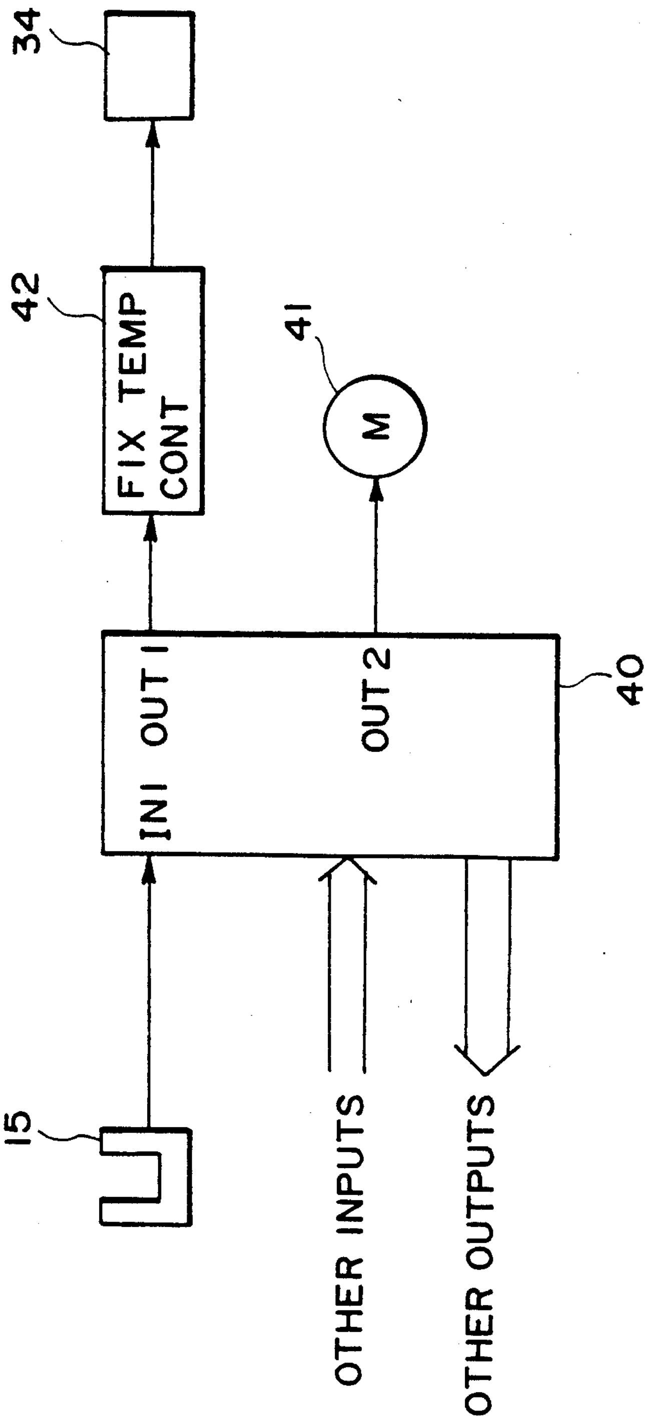
FIG. 18 is a block diagram of a control system for the image forming apparatus of FIG. 16.

FIG. 18 shows an electric circuit for the control system includes a microcomputer 40 and has an input port IN1 connected with the sheet feed sensor 15. It also has an output port OUT1 producing a fixing temperature controlling signal, and connected to a fixing temperature controlling circuit 42 to control the temperature of the heating member 34. The microcomputer is further provided with an output port OUT2 producing a motor controlling signal for on-off-controlling a main motor 41 for driving the fixing apparatus and the main image forming apparatus. The microcomputer 40 is further provided with input and output ports for the other input and output signals necessary for the operation of the image forming operation, although they are not shown for the sake of simplicity. The microcomputer 40 includes ROM and RAM for the program of the operational sequence of the image forming apparatus.

Figure 19:
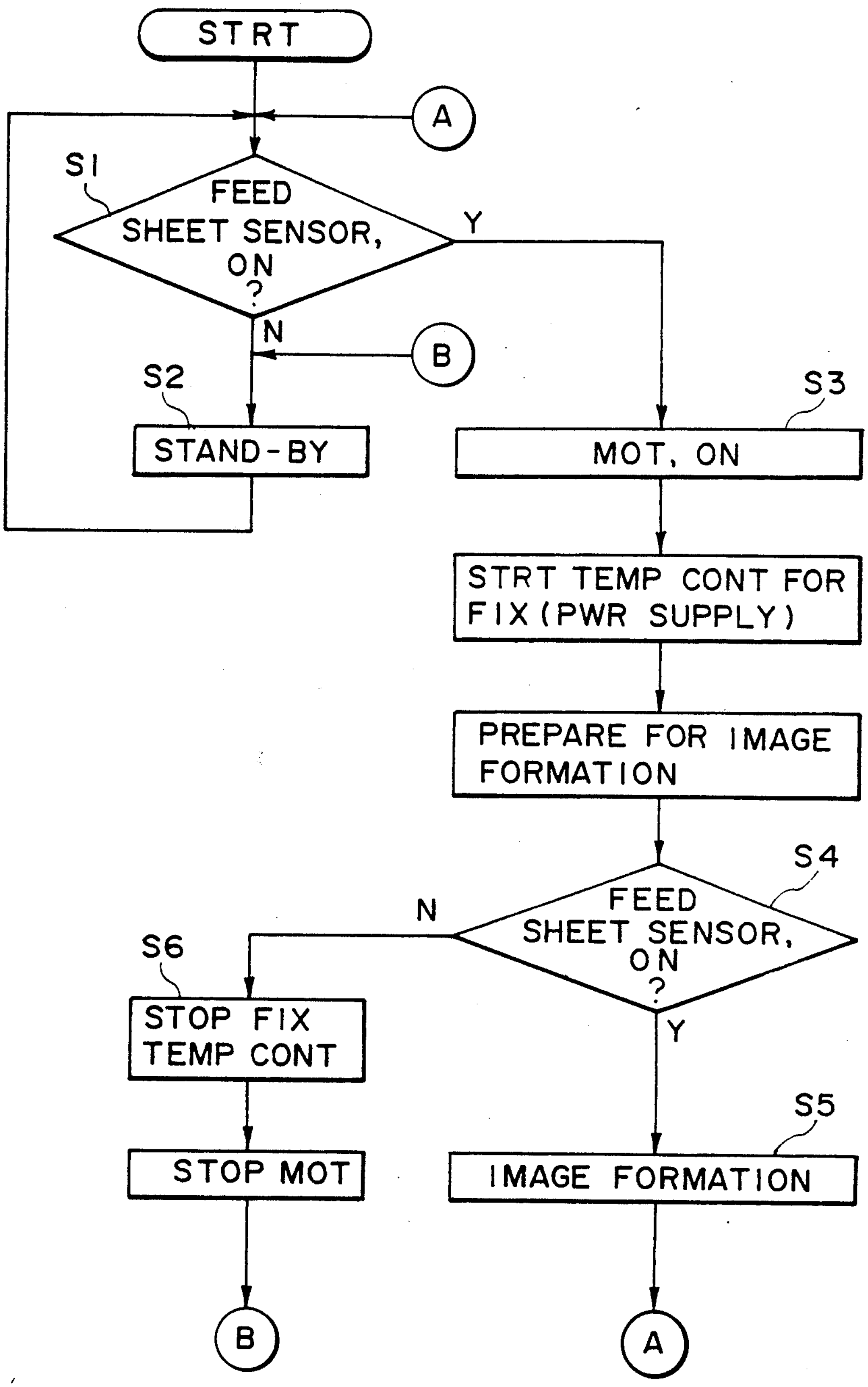
FIG. 19 is a flow chart illustrating a control of the apparatus shown in FIG. 18.
Figure 20:
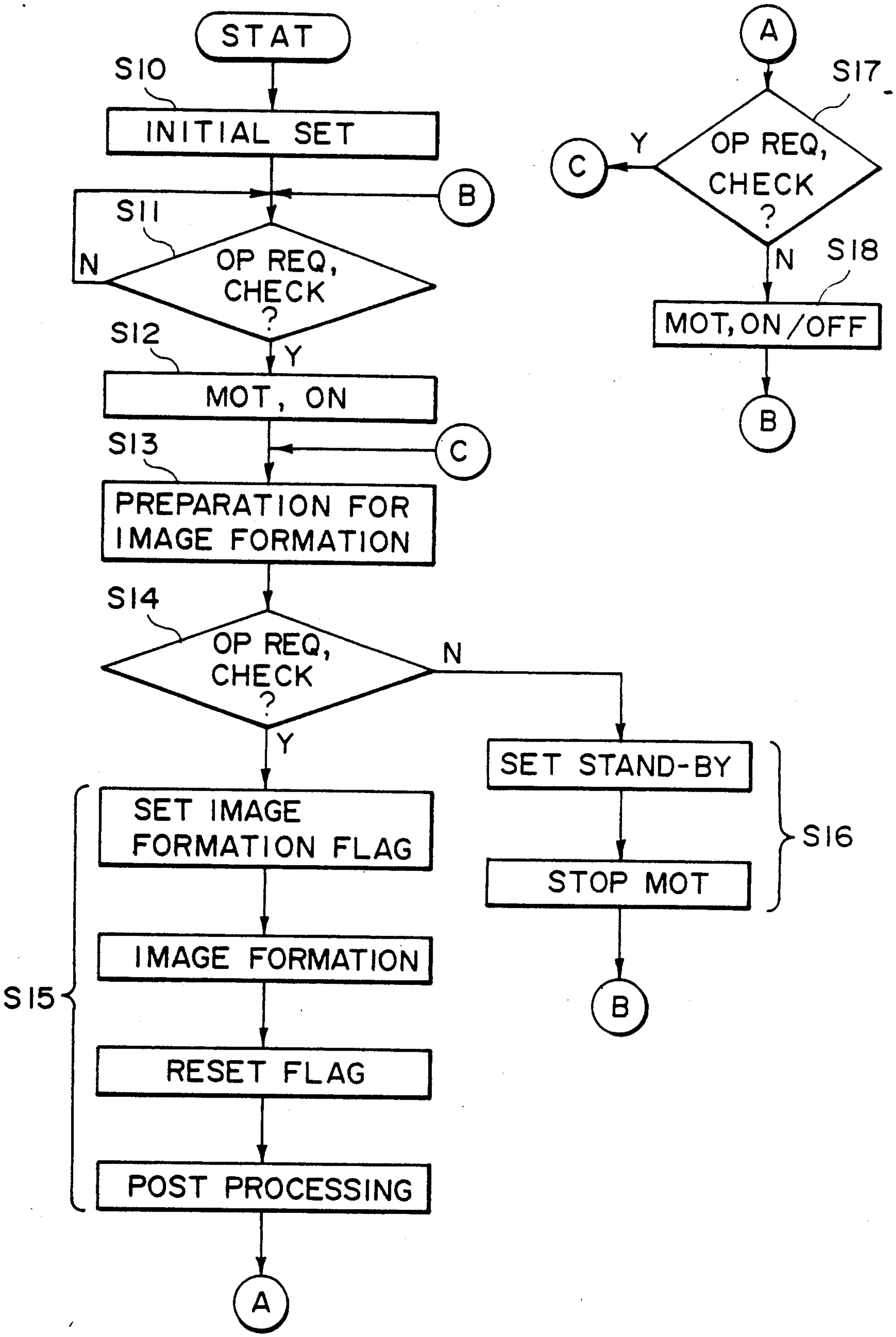
FIGS. 20 and 21 are flow charts showing a control of an apparatus according to a further embodiment of the present invention.

FIG. 19 is a flow chart illustrating the sequential operation of the apparatus according to this embodiment. The program for the sequential operation is contained in the ROM in the microcomputer 40. After the start of the operation, step S1 is executed, wherein the discrimination is made as to whether the sheet feeding sensor 15 is actuated or not. If not, the step S2 is executed, and then, the step S1 is executed. If the sheet feed sensor is actuated at step S1, the step S3 is executed, where the motor 41 is first actuated to start the image forming operation, and then, the temperature control for the heater 34 which will hereinafter be called "fixing temperature control" is started; and the preparation for the image formation is performed. Then, the sequential operation proceeds to step S4. At the step S4, the discrimination is made again as to whether or not the sheet feed sensor 15 is actuated. If not, it is discriminated that the sheet once manually fed has been taken out, and the step S6 is executed. At step S6, the fixing temperature control is stopped, and the motor 41 is stopped, and then the sequential operation goes back to step S2. If the sheet feed sensor 15 is actuated at step S4, the step S5 is executed, where a series of image forming operations is performed. After the completion of the image forming operation, the sequence goes back to the step 1, where the system is in the stand-by state.

Since in the above sequential operation, the fixing temperature control is started after the manually fed sheet is detected in the manual feeding mode, it becomes possible to stop the fixing temperature control except during the image forming operation; for example, it can be stopped during the stand-by state, by which wasteful energy consumption can be removed, thus making it possible to save the energy.

In addition, it is possible that the state of the sheet feed sensor is detected again after completion of the preparation of the image formation, that is, after a predetermined period elapses; and if the manual feed is cancelled, the apparatus is returned to the stand-by state, and the fixing temperature control is stopped. This eliminates wasteful energy consumption, thus achieving energy saving.

Here, the preparation for the image formation means various preparations required for starting the image forming operation and effected prior to the start of the image forming operation. In the image forming apparatus of an electrophotographic type shown in FIG. 16, it increase uniformization of the photosensitivity, removal of charge hysteresis of the photosensitive member prior to the image exposure.

The completion or termination point of the image forming operation means the time at which at least the image fixing of the recording material is completed, and the apparatus is waiting for the next image forming operation. In this embodiment, it is the point of time at which the discharge of the fixed recording material is completed.

Another operational sequence control usable with an image forming apparatus shown in FIG. 16 will be described. The electrical control system used here is as shown in FIG. 18.

Figure 21:
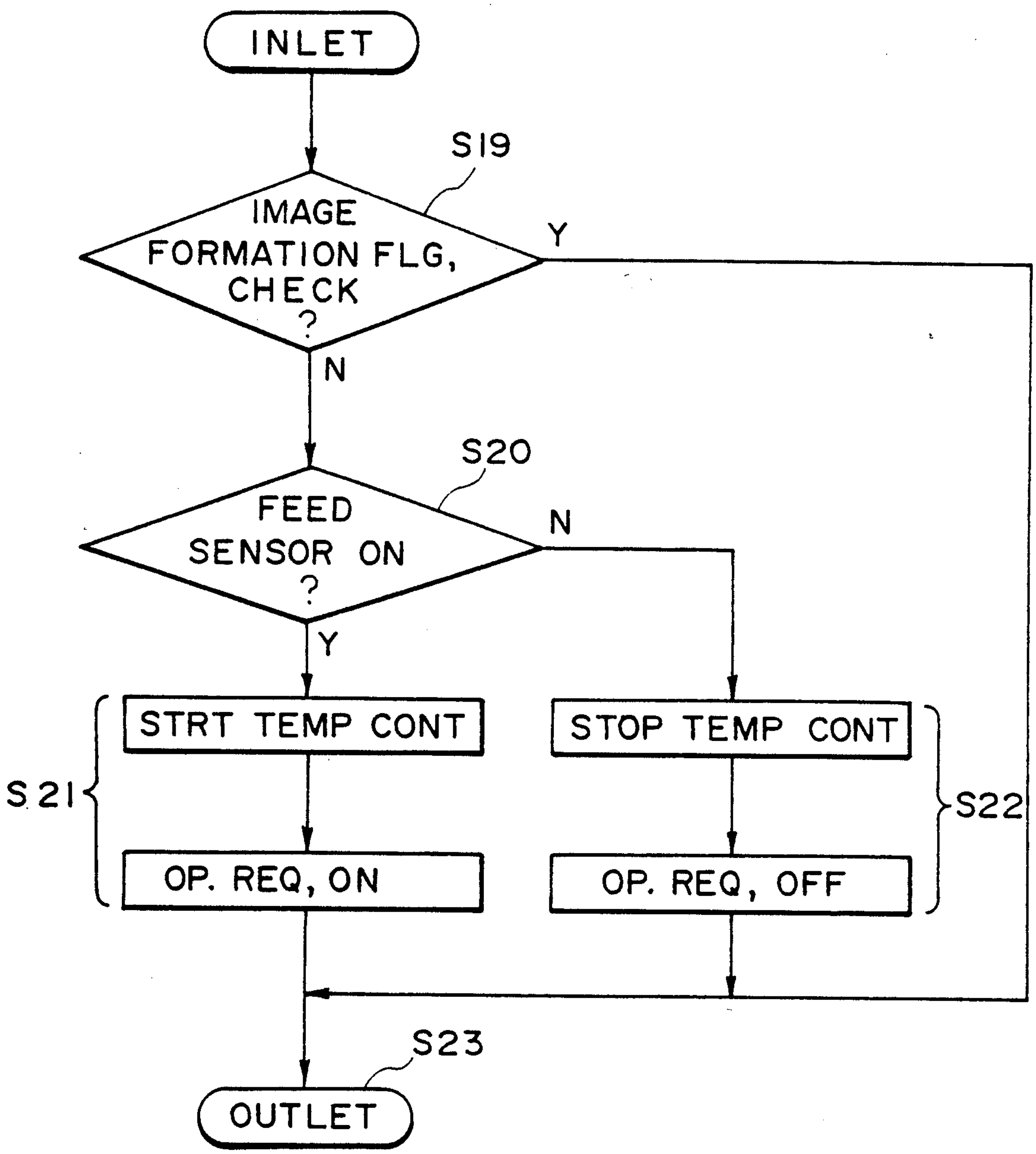

After the operation of this apparatus is started, a step S10 of FIG. 10 is executed. Here, the RAM or the like in the microcomputer 40 is subjected to an initial setting operation, and an interruption timer is set to effect interruptions at regular intervals. Then, a step S11 is executed, where the discrimination is made as to whether or not an operation request flag is set. The operation request flag is set upon detection of the manual feed of the sheet when the image forming operation is not performed, as will be described hereinafter. If the operation request flag is not set, the sequence goes back to the step S11, and if the flag is set, a step S12 is executed. At step S12, the motor 41 is actuated, and then, step S13 is executed, where preparation for the image forming operation is performed. Then, the step S14 is performed, by which the discrimination is made as to whether the operation request flag is set or not. If not, a step S16 is executed to return the apparatus to the stand-by state, and subsequently, the motor 41 is deactivated, and the operation goes back to the step S11. If the operation request flag is set at step S14, a step S15 is executed, where the image formation flag is set, and the image forming operation is performed. After termination of the image forming operation, the image formation flag is reset, and the post processing such as a post-rotation of the photosensitive drum 5 to remove residual potential therefrom is carried out, and a step S17 is executed. In this embodiment, the image forming operation terminates when the sheet discharge is detected by an unshown sensor at a discharge side of the fixing apparatus. At step S17, the discrimination is made as to whether the operation request flag is set or not. If so, the operation goes back to the step S13. If not, the step S18 is executed, where the motor 41 is deactivated, and the step S11 is executed. The above operation is repeated. FIG. 21 shows a flow chart for the timer interruption providing interruptions at regular intervals. The operation starts with an inlet shown in FIG. 21, and the step S18 is executed. Here, the description is first made as to whether the image forming flag is set or not, and if so, the sequential operation skips to an outlet, that is, a step S23, so that it returns to the main program. If, the image formation flag is not set at step S18, a step S20 is executed, where the discrimination is made as to whether the sheet feed sensor 7 is actuated or not. If so, the step S21 is executed, where the fixing temperature control starts, and the operation request flag is set, and then, a step S23 is performed. If the sheet feed sensor 15 is not actuated at step S20, the operation goes to a step S22. At step S22, the fixing temperature control is stopped, and then, the operation request flag is reset, and thereafter, the operation progresses to step S23. Then, similarly to that described above, it returns to the main program. In this embodiment, the recording material is heated by the heat generating element through the heat resistive film. However, the present embodiment is not so limited and is applicable to various fixing apparatus capable of instantaneous fixing operation.

As described in the foregoing, in the manual sheet feed mode, the fixing temperature control is started after the manually fed sheet is detected, and in addition, if the manual feed is cancelled within the predetermined period of time, the fixing temperature control is stopped. Therefore, the wasteful energy consumption is further reduced, and the energy save is further promoted. It is a possible alternative that a timer is started upon detection of manually fed sheet, and the power supply to the heater is started immediately before it reaches the fixing apparatus.

Figure 22:
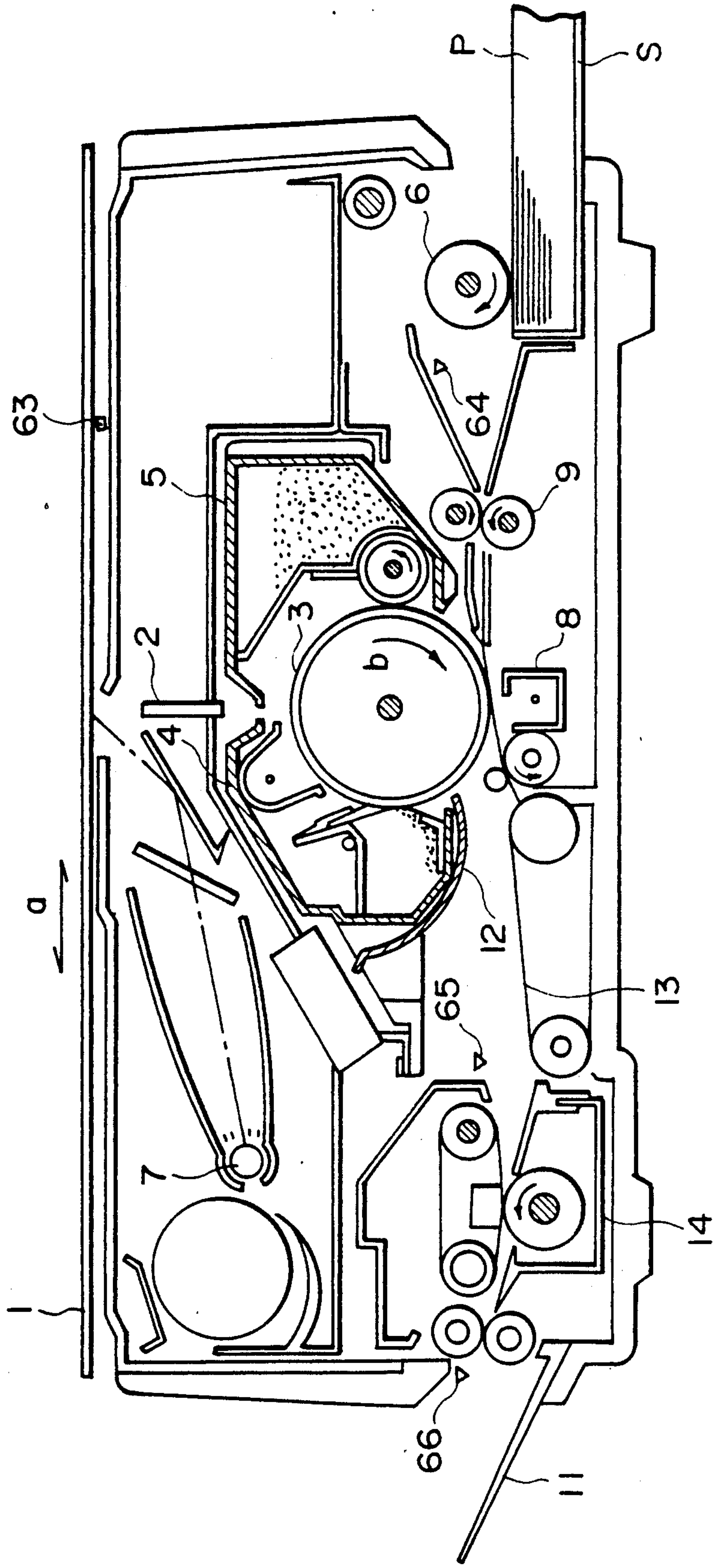
FIG. 22 is a sectional view of an image forming apparatus according to a further embodiment of the present invention.

FIG. 22 shows in cross-section an image forming apparatus according to a further embodiment of the present invention, wherein the apparatus is provided with a cassette type sheet feeder in place of the manually feeding type as described with FIG. 16. The image forming apparatus comprises an image fixing device 14 which is the same as shown in FIG. 17.

Figure 23:
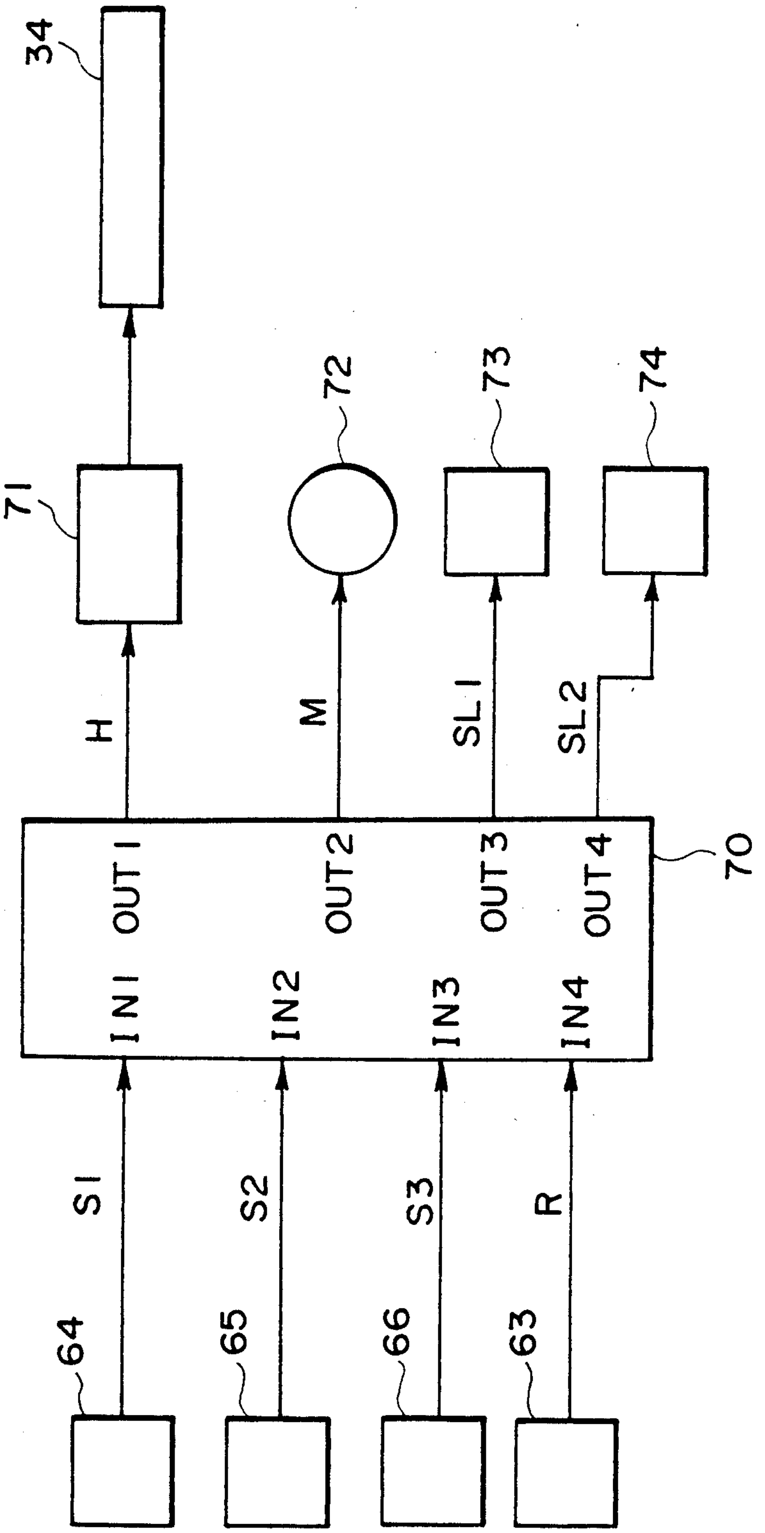
FIG. 23 is a block diagram illustrating a control system of an apparatus of FIG. 22.

FIG. 23 is a block diagram of a control system for the apparatus of this embodiment. It comprises control means 70 which is constituted by a microcomputer and logical elements or the like. The control means 70 is provided with inlet ports IN1, IN2, IN3 and IN4. The input port IN1 receives a sheet detection signal S1 from sheet detecting means 64 for detecting the fed sheet. The input port IN2 receives a sheet detection signal S2 from sheet detecting means 65 disposed at an inlet side of the fixing apparatus with respect to the sheet conveyance direction. The input port S3 receives a sheet detection signal S3 from sheet detecting means 66 disposed at an outlet side of the fixing apparatus with respect to the sheet conveyance direction. The inlet port IN4 receives an image front signal R which is produced by image detecting means 63 detecting an image front timing member (not shown) mounted on the original supporting platen 1. The control means 70 is also provided with output ports OUT1, OUT2, OUT3 and OUT4. The output port OUT1 outputs a temperature control permitting signal H for the fixing heater to temperature control means 71 for controlling the temperature of the heater 34. The output port OUT2 outputs a conveyance drive signal M to the main motor 72 for driving the image forming apparatus. The output port OUT3 outputs a sheet feed driving signal SL1 to a sheet feed driver 73. The output port OUT4 outputs a conveying roller driving signal SL2 to a conveyance roller driver 74. The output from the output ports are "ON" (active) when it is "H" (high) and is "OFF" when it is "L" (low). The conveyance roller driving signal SL2 is produced in response to an input of the image front signal R.

In the image forming apparatus constructed in the manner above, the control and operation will be described, particularly noting the fixing apparatus.

Figure 24:
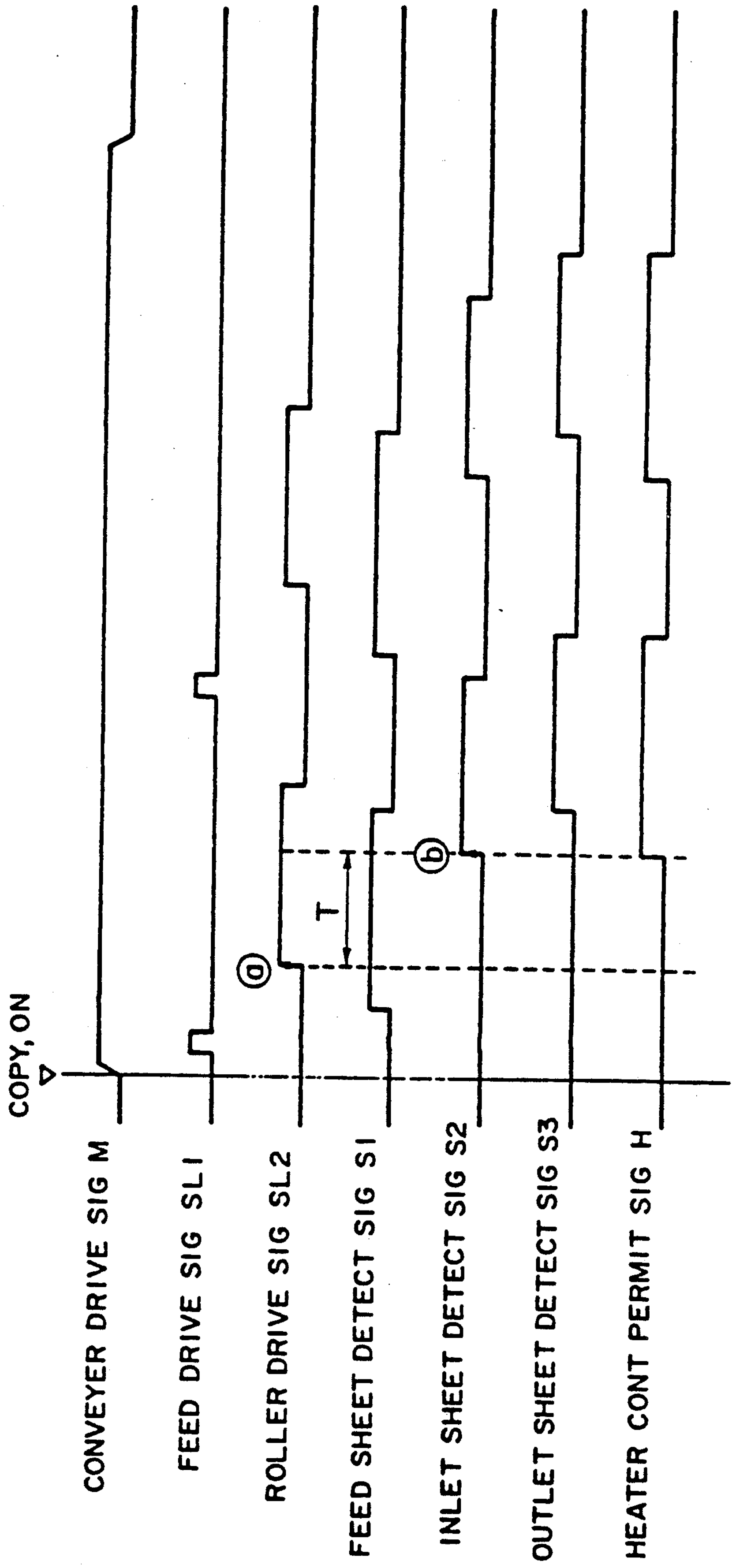
FIG. 24 is a timing chart showing various signals in the embodiment of FIG. 22.

FIG. 24 is a timing chart when continuous image formation for producing two copies is performed. As described hereinbefore, reference character M designates a conveyance drive signal; SL1, a sheet feed driving signal; SL2, a conveyance roller driving signal; S1, a sheet feed detection signal, S2, an inlet side sheet detecting signal; S3, an output sheet detection signal; and H, a fixing heater temperature control permitting signal.

The control means 70 drives the conveyance driving system by actuating the conveyance drive signal M to "H" when the copy start is instructed. Then, the signal SL1 is made "H" to feed the sheet P. After the sheet P fed out is detected by the sheet detecting means 14, and after it is sufficiently abutted to the conveying roller 8, the control means 70 actuates the conveying roller driving signal SL2 ("H") at the timing (a) for the alignment with the image front, and the conveying roller 9 is driven in synchronism of the optical system for the alignment with the image front. The sheet P receives an image from the drum 3 under the high voltage control, and is conveyed to the fixing apparatus 14 by a conveying system. The control means 70 detects the sheet by the sheet detecting means 64, upon which the heater temperature control permitting signal is rendered on (H). That is, the inlet side sheet detecting signal S2 from the sheet detecting means 65 is rendered high at the timing (b) the temperature control for the heater 24 is started after the time (b). Even if the inlet side sheet detecting signal S2 becomes "L", the fixing heater temperature control permitting signal is maintained "H" since the sheet P is not completely discharged from the fixing apparatus 14. When the control means 70 detects that the sheet has completely discharged from the fixing apparatus 14 by the discharge sheet detecting signal S3 from the sheet detecting means 66 becoming "L", the fixing heater temperature control permitting signal is made "L" to stop the temperature control of the heater 34. That is, the fixing heater temperature control permitting signal is controlled on the basis of a logical sum of the signal S2 and the signal S3. As described in the foregoing, by the provisions of the sheet detecting means 15 and 16, the image completely fixed with a necessary and minimum temperature control period. In FIG. 23, the control means 70 does not make the fixing heater temperature control permitting signal "H" during the interval between the first sheet and the second sheet. That is, in the multi-print mode wherein the image forming operation is performed continuously, the heater 34 is intermittently temperature-controlled in accordance with the heat conveyance intervals.

Figure 25:
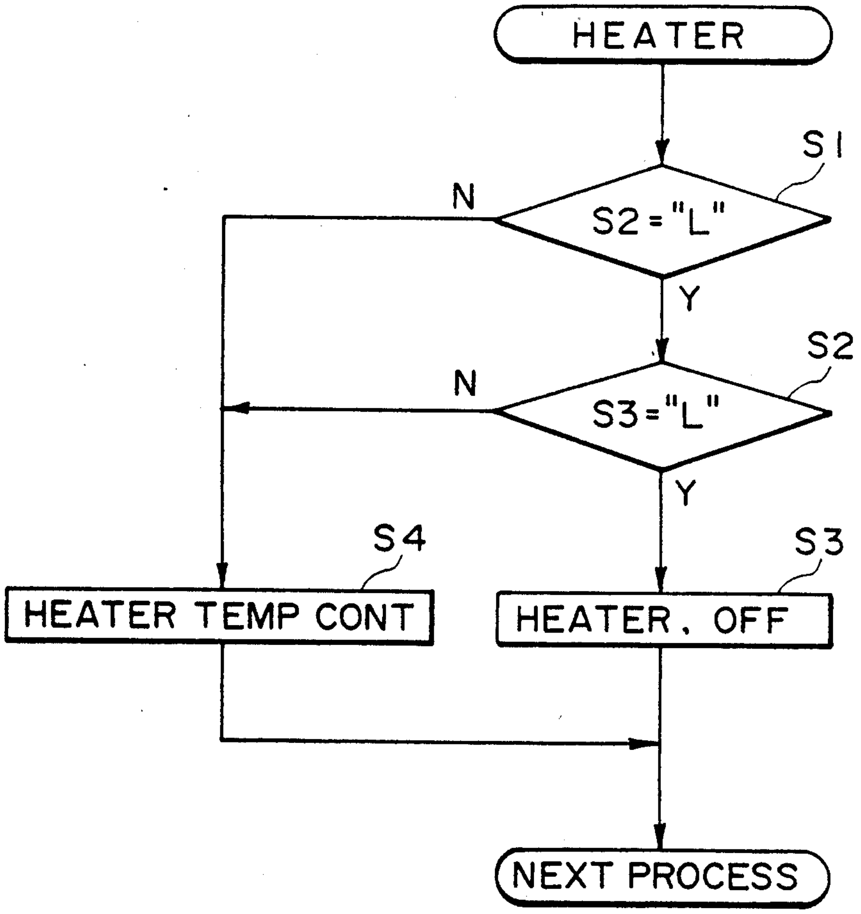
FIG. 25 is a flow chart illustrating an operation of the apparatus according to this embodiment.

FIG. 25 shows a flow chart of a control system for accomplishing the above. If either one of the inlet side sheet detection signal S2 and the outlet side sheet detection signal S3 is "H" (steps S1 and S2), the control means 70 permits the temperature control of the fixing apparatus (step S4). However, if both of the inlet sheet detection signal S2 and the outlet sheet detection signal L3 are "L", the control means prevents the temperature control of the heater 34.

Here, the multi-print mode means a mode of operation wherein the operator sets the number of prints, and the number of prints are automatically and continuously produced.

The control of this embodiment is applicable to the case wherein an image formation instruction signal is produced prior to the termination of the previous image forming operation, the second image forming operation is continuously performed without the stand-by state therebetween.

Figure 26B:
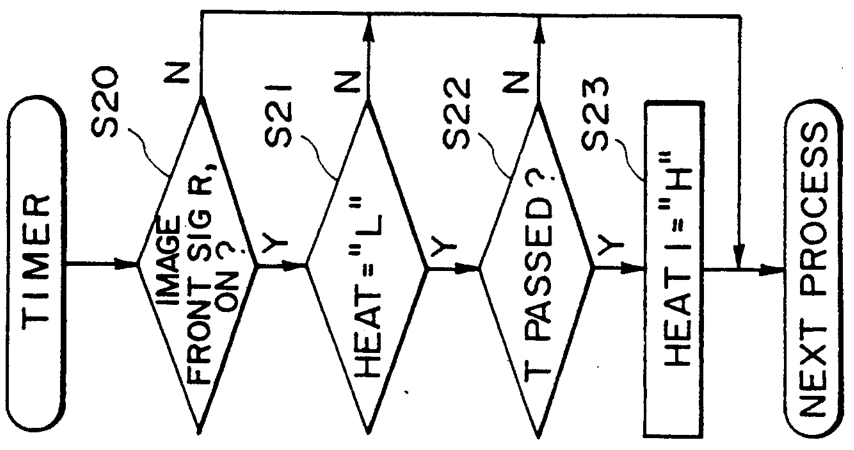
FIGS. 26A and 26B are flow chart for a control system according to another embodiment.
Figure 26A:
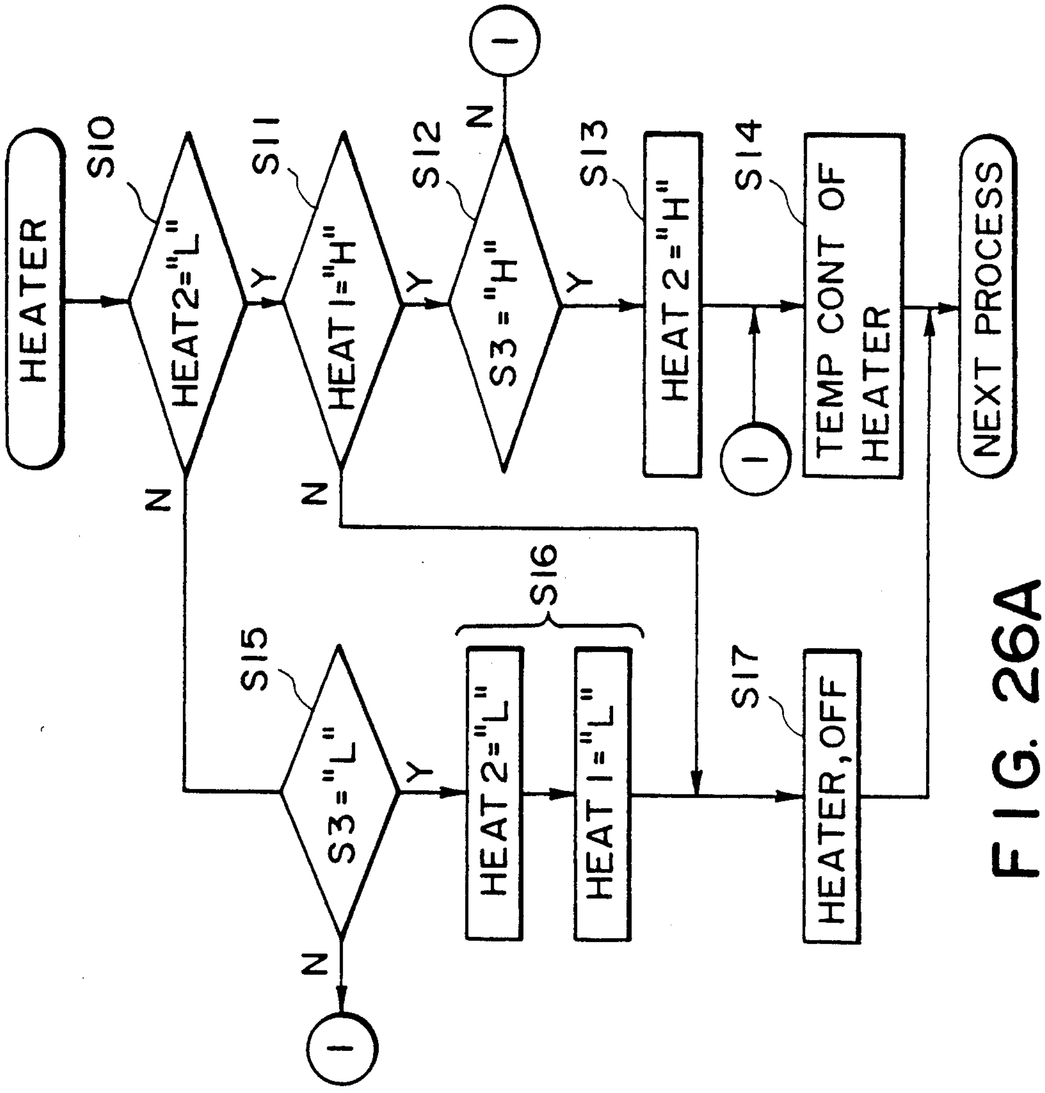

Referring to FIGS. 26A and 26B, the description will be made as to another example of the operation of the apparatus shown in FIG. 22. In this example, the sheet detecting means 66 is used. However, in place of using the sheet detecting means 65, the control means 40 has the time period (T, in FIG. 24) from the time (a) when the image front is aligned to the time at which the sheet reaches the inlet of the fixing apparatus. By doing so, it is possible that the temperature control of the fixing apparatus is started before the sheet P enters the fixing apparatus, and that the fixing heater temperature permitting signal H is rendered low upon the lowering of the outlet sheet detection signal S3.

FIGS. 26A and 26B show flow charts for accomplishing this control. The structure of the control means is similar to that shown in FIG. 23. In FIG. 26A, a flag HEAT2 for intermittent drive is set upon the sheet detected by the outlet side sheet detecting means 66 of the fixing apparatus, and a flag HEAT1 is set when a predetermined period of time T elapses from when the image front signal is actuated, as will be described hereinafter. At step S10, the discrimination is made as to whether the flag HEAT2 is "L" or not. If so, that is, if the sheet has not yet reached the sheet detecting means 66, the program progresses to a step S11. If not, that is, if the sheet has reached the sheet detecting means 66, the program progresses to step S15. At step S11, the discrimination is made as to whether the flag HEAT1 is "H" or not. If so, that is, the time period T sec has passed from the image front detection signal, the steps S12, S13 and S14 are executed to effect the temperature control of the heater 34 (steps S12 and S14 until the sheet detecting means 66 detects the sheet). When the sheet detecting means 66 detects the sheet, so that the signal S3 becomes "H", the flag HEAT2 is rendered "H" (step S13). After the flag HEAT2 becomes "H", the program progressive to the steps S15, S16 and S17. Until the sheet detecting means 66 detects the passage of the sheet so that the signal S3 becomes "L", the program proceeds from step S16 to the step S14 to effect the temperature control of the heater 34. When the signal S3 becomes "L", the steps S16 and S17 are executed, and the flag HEAT2 and the flag HEAT1 are made "L" to stop the temperature control of the heater 34.

FIG. 26B is a flow chart illustrating a timer interruption processing for providing interruptions at predetermined regular intervals. At step S20, the discrimination is made as to whether or not the image front signal R is inputted into the inlet port IN4. If not, the program returns to the main routine. When the image front signal is inputted, the discrimination is made as to whether the flag HEAT is "L" or not at step S21. If so, the further discrimination is made as to whether or not the time period T sec has elapsed. If so, the flag HEAT1 is rendered "H", and the program returns to the main routine.

In the operations of the apparatus of FIG. 22 capable of continuous image forming operation, the power supply to the heater can be shut off between the adjacent two image forming operations, that is, during the interval between a fixing operation for a recording sheet and image fixing for the next recording sheet, whereby the energy can be significantly saved in the continuous image formation mode.

Figure 27:
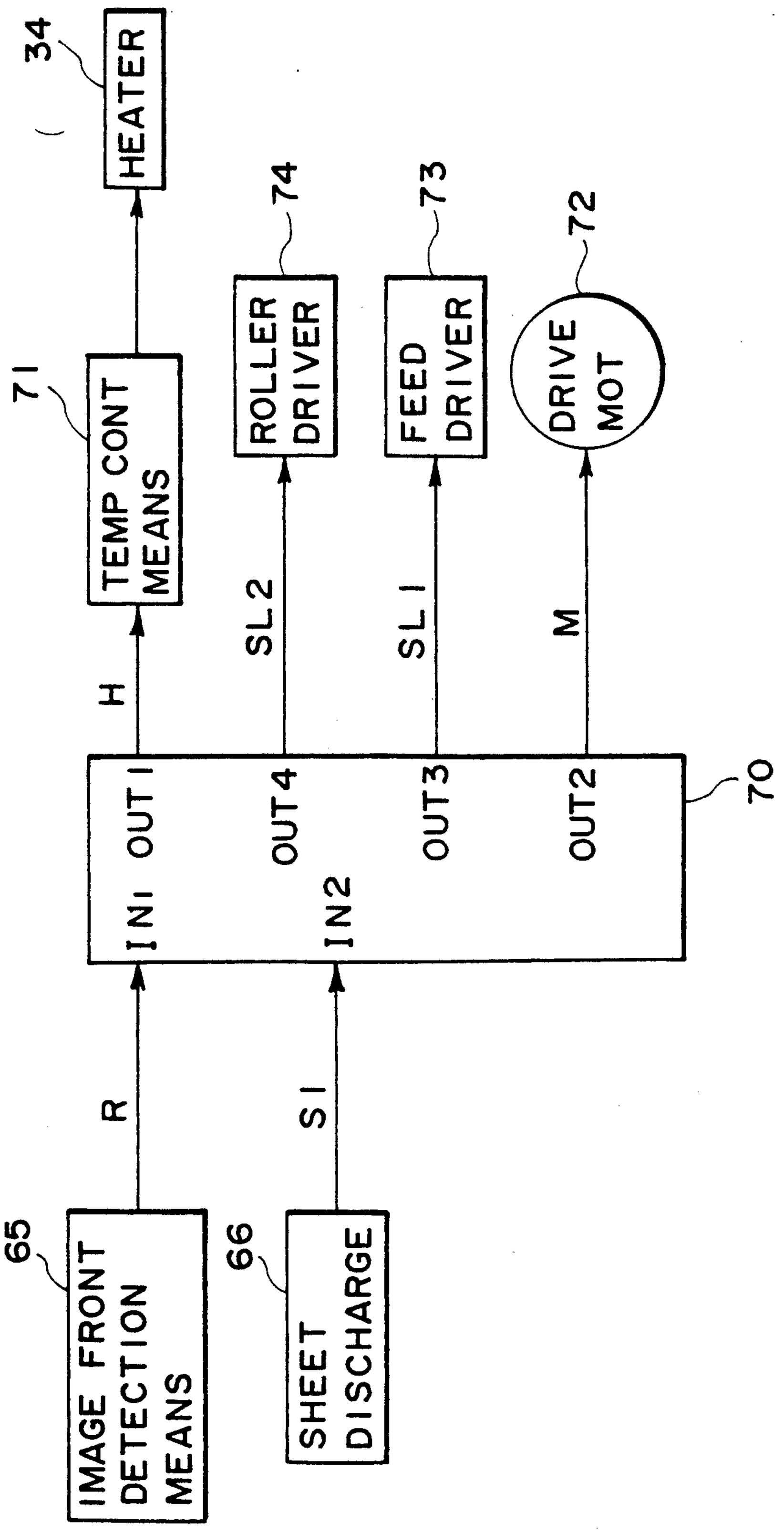
FIG. 27 is a block diagram showing a control system for an apparatus according to a further embodiment of the present invention.

Referring to FIG. 27, a further embodiment will be described. In this embodiment, the image forming apparatus is the same as that shown in FIG. 22, and the image fixing apparatus has the structure which is the same as shown in FIG. 17. The fundamental process for the image formation is the same as that described in FIG. 22. Therefore, the description thereof will be described for simplicity. In this embodiment, the time period T0 between the image formation start on the photosensitive drum 4 and the arrival of the sheet at the fixing apparatus 11 is larger than the time period T1 between the start of sheet conveyance from the conveying roller 8 to the arrival of the sheet at the fixing apparatus, that is, T0>T1.

Here, the time of image formation start of the image forming apparatus means the start of first image formation irrespective of whether it is a developed image or a latent image. In the electrophotographic apparatus of FIG. 22, it is the start of image exposure on the photosensitive member.

FIG. 27 is a block diagram of a control means for controlling the operation of this embodiment. Control means 70 is constituted by a microcomputer and logical elements or the like in this embodiment. The control means 70 is provided with an input port IN1 and an input port IN2. The input port IN1 receives an image front signal R from an image front detecting means 63 for detecting the image front timing by an image front timing member (not shown) mounted on the original supporting platen 1. The inlet port IN1 receives a sheet discharge sensor signal S1 from a discharge heat sensor 66 disposed at an outlet side of the fixing apparatus in the sheet conveyance direction. The control means 70 is also provided with output ports OUT1, OUT2, OUT3 and OUT4. The output port OUT1 outputs a fixing heater temperature control permitting signal H to the temperature control means 71 for controlling the heater 34. The output port OUT2 outputs a conveyance drive signal M to the driving motor for driving the image forming apparatus. The output port OUT3 output a sheet feed drive signal SL1 to the sheet feed driver 73. The output port OUT4 outputs a conveying roller driving signal SL2 to the conveying roller driver 74. Each of the outputs from the output ports is "ON" (active) when it is "H" (high), and is "OFF" when it is "L" (low). The control means is also provided with other input and output port for receiving input signals and producing output signals required for the other operations of the image forming apparatus, although they are not shown. The microcomputer in the control means contains ROM and RAM having an operational sequence program for controlling the image forming apparatus.

Figure 28:
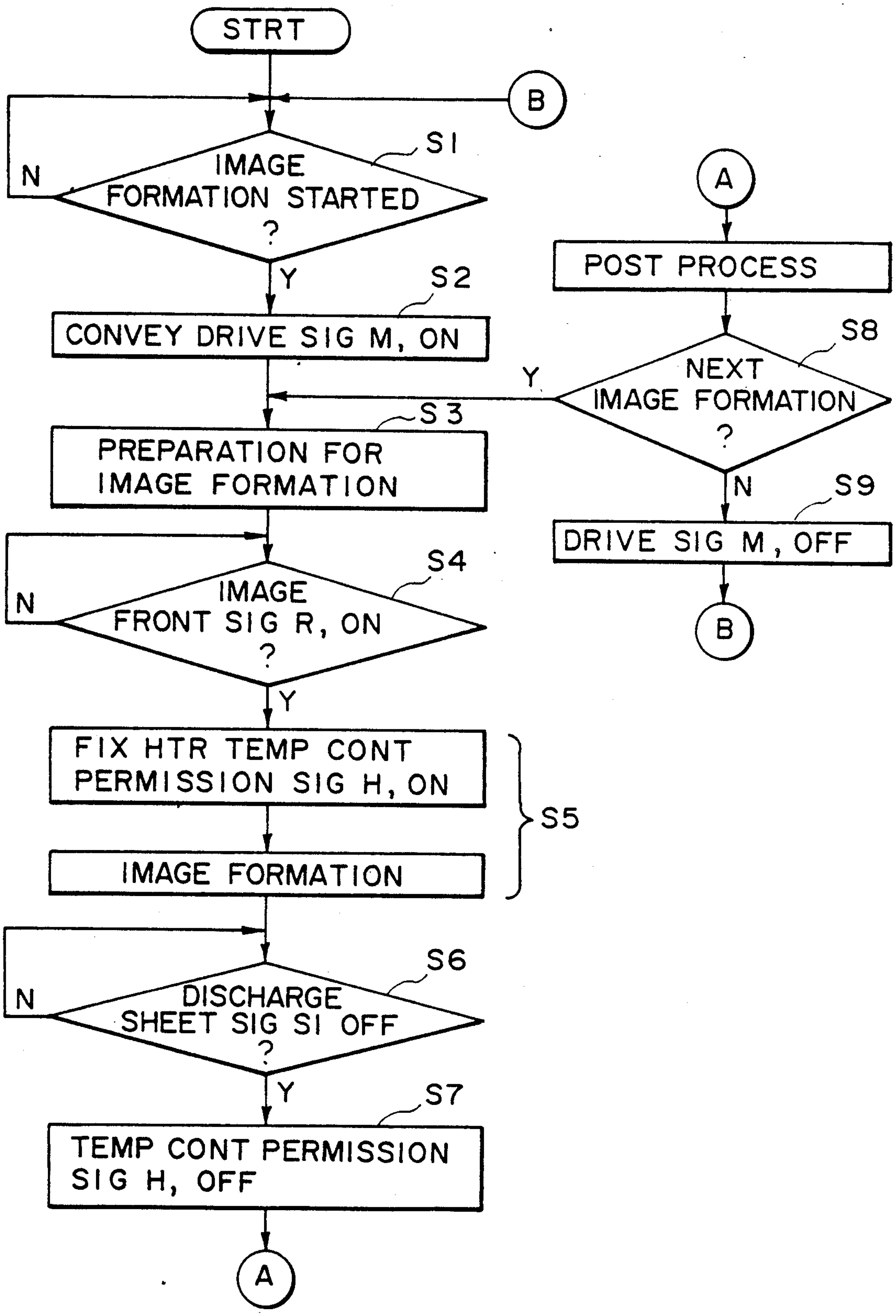
FIG. 28 is a flow chart illustrating a control of the apparatus of FIG. 27.

FIG. 28 is a flow chart illustrating the operational sequence program for the apparatus of this embodiment. The program is stored in built in form ROM in the microcomputer. After the image forming apparatus is actuated, a step S1 is executed, where the discrimination is made as to whether or not the image forming operation is to be started. If not, the program returns to the step S1, where the apparatus is under the stand-by state. When the image forming operation is to be started at step S1, the program progresses to a step S2, where the conveyance drive signal M is rendered "H" to energize the driving motor 72 in order to start the image forming operation. Then, step S3 is carried out, where the preparation for the image forming operation is performed, and the sheet feed drive signal SL1 is made "H" to abut the sheet P to the conveying roller 9 for conveying the sheet to the photosensitive drum in times relation with the image thereon. Simultaneously, the original supporting platen 1 is moved to the image exposure starting position, and thereafter, the image forming exposure operation is started. Then, at step S4, the discrimination is made as to whether the image front signal R from the image front detecting means 65 is "H" or not. If not, the program returns to step S4, and therefore, the operations are repeated until the image front signal R becomes high. If the image front signal R is high, the step S5 is executed, so that the fixing heater temperature control permitting signal H is made high to start the temperature control of the heater 34, and simultaneously, the image forming processing operation is started. In the image forming process, the conveying roller driving signal SL2 is first made high to start the conveyance of the sheet P, and simultaneously, a series of operations required for the image formation are performed at predetermined timing. Then, at step S6, the discrimination is made as to whether the sheet discharge sensor signal S1 is flow or not. If not, the program returns to the step S6, and the apparatus waits until the sheet P passes by the discharge sheet sensor 66. If the sheet discharge sensor signal S1 is low at step S6, the step S7 is executed by which the fixing heater temperature control permitting signal H is rendered low to stop the temperature control of the heater 34. And then, the image forming process is performed. Then, at step S8, the discrimination is made as to whether or not the next image forming operation is to be continued. If so, the program returns to the step S3 and repeats the above described operation. If not, that is, if the image forming operation is completed, the step S9 is executed wherein the motor 72 is deactivated and the program goes back to the step S1.

Figure 29:
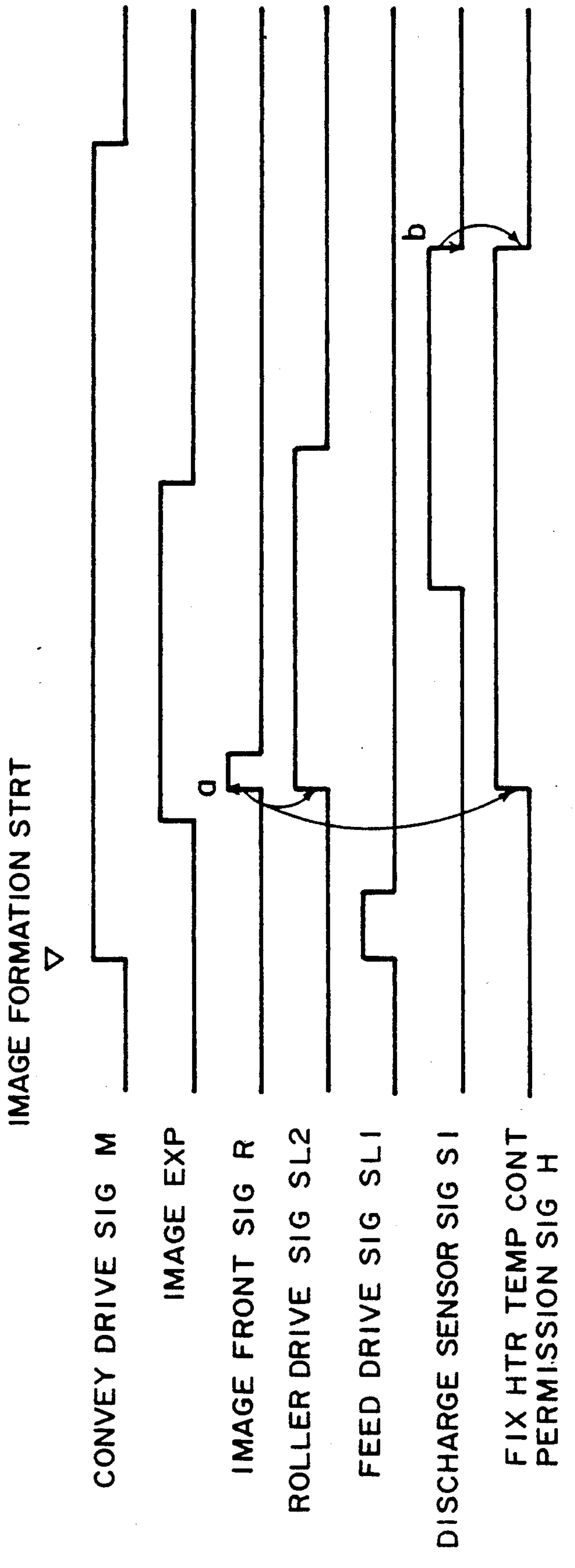
FIG. 29 is a time chart illustrating a control of the apparatus of FIG. 27.

FIG. 29 is a timing chart illustrating the operation of the image forming apparatus incorporating the control system described with the flow chart of FIG. 28. As described, the reference character M designated a conveyance drive signal; SL1, the sheet feed drive signal; SL2, a conveying roller drive signal; R, an image front signal; S1, a sheet discharge sensor signal; and H, a fixing heater temperature control permitting signal. In this Figure, the image exposure (IMAGE EXP) is indicated as being high during the period in which the image of the original placed on the original supporting platen is projected by the illumination lamp 7 through a slit onto the photosensitive drum 3 from the leading edge of the original image (start position) to the trailing edge (reversing position). The control means 70 renders the conveyance drive signal M "H" at the image formation start timing to drive the conveyance drive system, and then it makes the sheet feed drive signal SL1 "H" to feed the sheet P, and the sheet P fed out is sufficiently abutted to the conveying roller 8. Simultaneously, the original supporting platen 1 is moved to the start position, and the image exposure is started. After the image exposure start, the actuation of the image front signal R is detected at a time (a), and in synchronism therewith, the fixing heater temperature control permitting signal H and the conveying roller drive signal SL2 are made "H" to start the fixing temperature control, and simultaneously, the heat P is fed to the photosensitive drum. The timing (a) is determined the position of the image front timing member mounted on the original supporting platen 1 so that the leading edge of the image on the photosensitive drum 3 is aligned with the leading edge of the sheet P. Subsequently, the sheet P receives the image from the drum 3 under a high voltage control, and is conveyed to the fixing apparatus by a conveyance drive system. After the heat fixing, the sheet is discharged to the discharging portion. Then, the control means 70 detects that the sheet discharge sensor signal S1 from the sheet discharge sensor 66 becomes "H". Thereafter, the control means 70 detects the passage of the sheet through the fixing apparatus by the sheet discharge detection signal S1 becoming "L", in response to which it renders the fixing heater temperature control permitting signal H "L". The timing thereof is indicated by a reference (b). Therefore, the image is completely fixed by the temperature control only during the period from the timing (a) to the timing (b).

As described in the foregoing according to this embodiment, the conveyance of the transfer material sheet P is started in timed relation with the detection signal from the image front detecting means after start of the image exposure operation, and the temperature control of the fixing apparatus is started on the basis of the start timing of the heat conveyance by the registration roller. Therefore, the time period T0 from the image formation start to the arrival of the sheet at the fixing apparatus is larger than the time period T1 from the sheet conveyance start to the arrival thereof at the fixing apparatus, that is, T0>T1, in this embodiment. Accordingly, by starting the fixing temperature control on the basis of the start of the transfer material sheet P conveyance, the time period of the fixing temperature control can be reduced, so that the image forming apparatus can be operated with low energy consumption and with lower temperature rise in the inside thereof.

Figure 30:
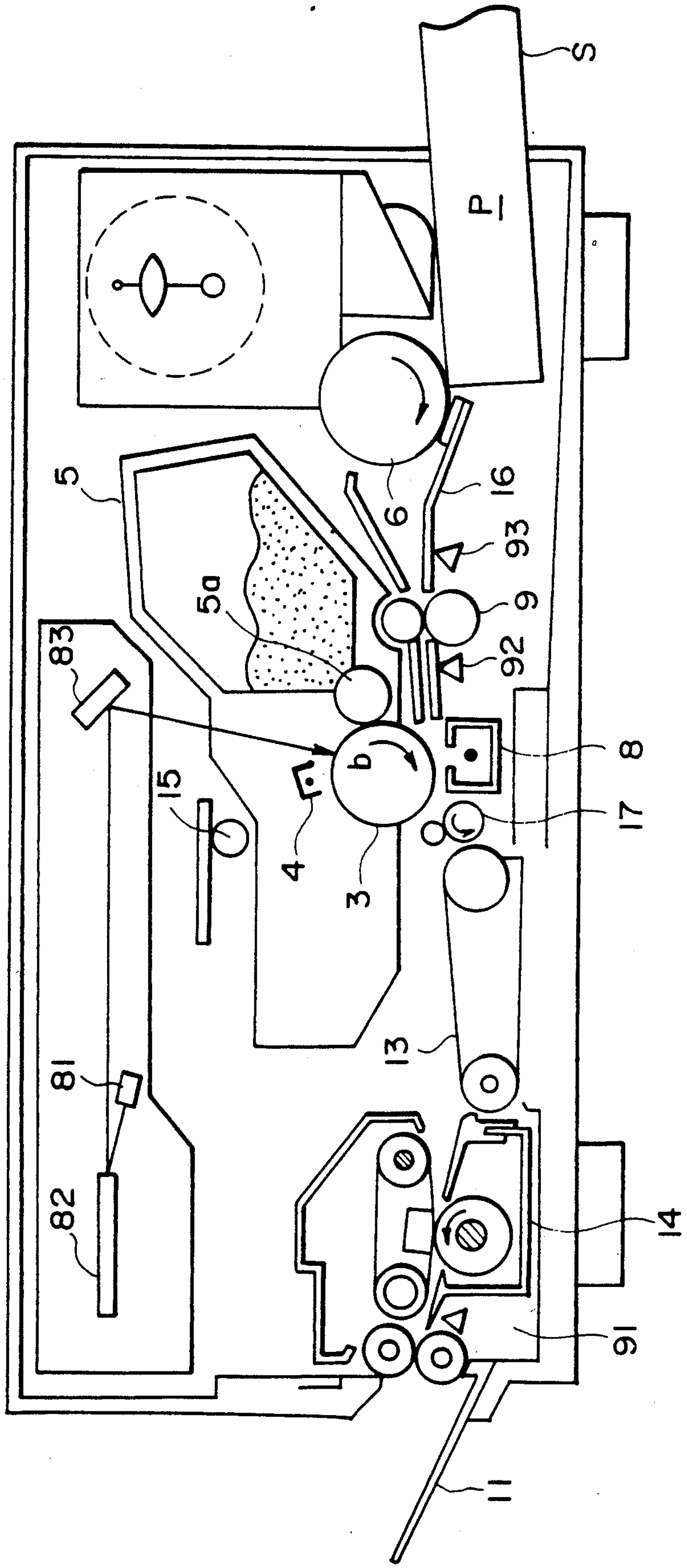
FIG. 30 is a sectional view of an image forming apparatus according to a further embodiment of the present invention.

Referring to FIG. 30, there is shown a light printer of an electrophotographic type as an exemplary image forming apparatus according to another embodiment of the present invention. The apparatus comprises laser illuminating means 81 for image formation, a polygonal mirror 82 and a reflection mirror 83. The laser beam is scanningly projected on the photosensitive drum 3 to expose the photosensitive drum imagewisely. The photosensitive drum 3 is rotating in the direction indicated by an arrow b during the image forming operation. The apparatus further includes a pre-exposure means 15 to remove the electric potential remaining on the photosensitive drum 3 before the start of the image formation.

The other image forming process operations are the same as in the apparatus shown in FIG. 22, and the detailed description thereof is omitted for simplicity.

The fixing apparatus 14 has the structure shown in FIG. 17.

In this embodiment, the time period T0 from the image formation start on the photosensitive drum 3 to the arrival of the sheet at the fixing apparatus 11 is smaller than the time period T1 from the sheet conveyance start from the conveying roller 87 to the arrival of the sheet at the fixing apparatus 11, that is, T0<T1.

Figure 31:
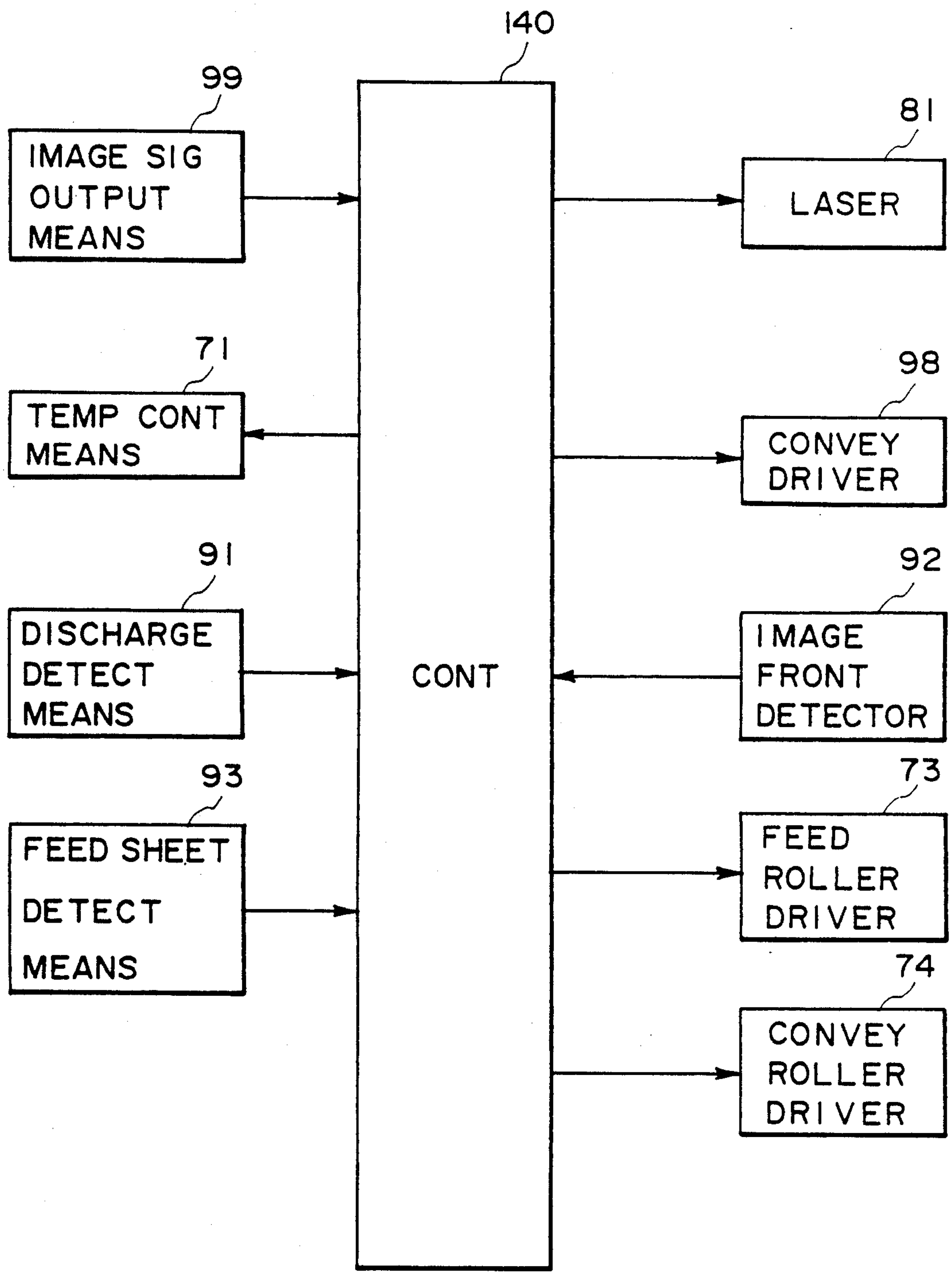
FIG. 31 is a block diagram showing a control of the apparatus of FIG. 30.

FIG. 31 is a block diagram of a control system for this apparatus. Control means 140 receives signals from various means and supplies signals to the various means. To the input port of the control means 140, there are connected discharge sheet detecting means 91, image front detecting means 92, feed sheet detecting means 93 and image signal producing means 99. The output ports thereof are connected to conveying system driving means 98, a laser illuminating means 81, sheet feed drive means 73, registration roller drive means 74 and temperature control means 71 for controlling the temperature of the heater 34. They are controlled by a control means 140. In the timing chart, each of the outputs is "ON" (active) when it is "H" (high), and is "OFF" when it is "L".

In the image forming apparatus having the structure described above, the image fixing operation can be performed in the following manner.

Figure 32:
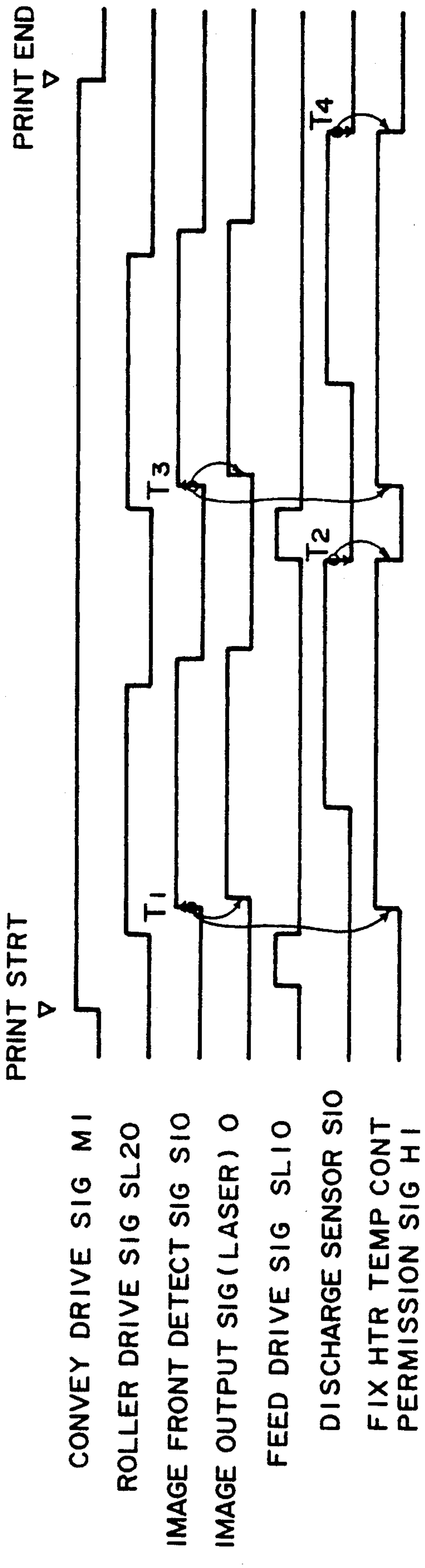
FIG. 32 is a timing chart illustrating a control of the FIG. 31 embodiment.

FIG. 32 is a timing chart during a continuous image forming operation for producing two prints. In this Figure, reference character M designates a conveyance drive signal; SL10 a sheet feed drive signal; SL20 a conveying roller driving signal; S10 an image front detection signal; S20 a discharge sheet sensor signal; H1 a fixing heater temperature control permitting signal; and O image output signal. The control means 140 makes the conveyance drive signal M1 "H" at a copy start signal timing to drive the conveyance drive system, and makes the sheet feed drive signal SL10 "H" to feed the sheet P. After the sheet P fed out is detected by the sheet feed detecting means 93, and after it is sufficiently abutted to the conveying roller 9, the control means renders the roller drive signal SL20 "H" to further convey the sheet P. Then, the image front detecting means 92 detects the sheet P, upon which the image front detection signal S1 from the image front detecting means 92 becomes "H", and the event is supplied to the control means 140 for the alignment of the image front. This is indicated by T1 in FIG. 32, in response to which the control means 140 renders the fixing heater temperature control permission signal H1 "H" to start the fixing temperature control. Simultaneously, the laser illuminating means (image outputting means) 81 is driven in the manner that the image signals from image signal outputting means (not shown) is synchronized with the rotation of the polygonal mirror. In addition, the leading edge of the image through the optical system is synchronized with the leading edge of the sheet P, by which the image leading edge is properly aligned.

The sheet P receives an image from the photosensitive drum 3 under a high voltage control, and thereafter, is transported to the fixing apparatus by a conveyance driving system. Thus, when the image front detection signal S10 is rendered high at the time T1, the temperature control of the fixing apparatus is started after the time T1. The control means 140 detects that the sheet P has passed through the fixing apparatus by the sheet discharge detecting means 91 detects the sheet by which the sheet discharge sensor S20 becomes "L". Then, the control means 140 renders the fixing heater temperature control permitting signal H1 "L".

The timing of this is indicated by a reference T2 in FIG. 32. As described, the image is completely fixed by effecting the temperature control only during the period from the time T1 to the time T2.

Figure 33:
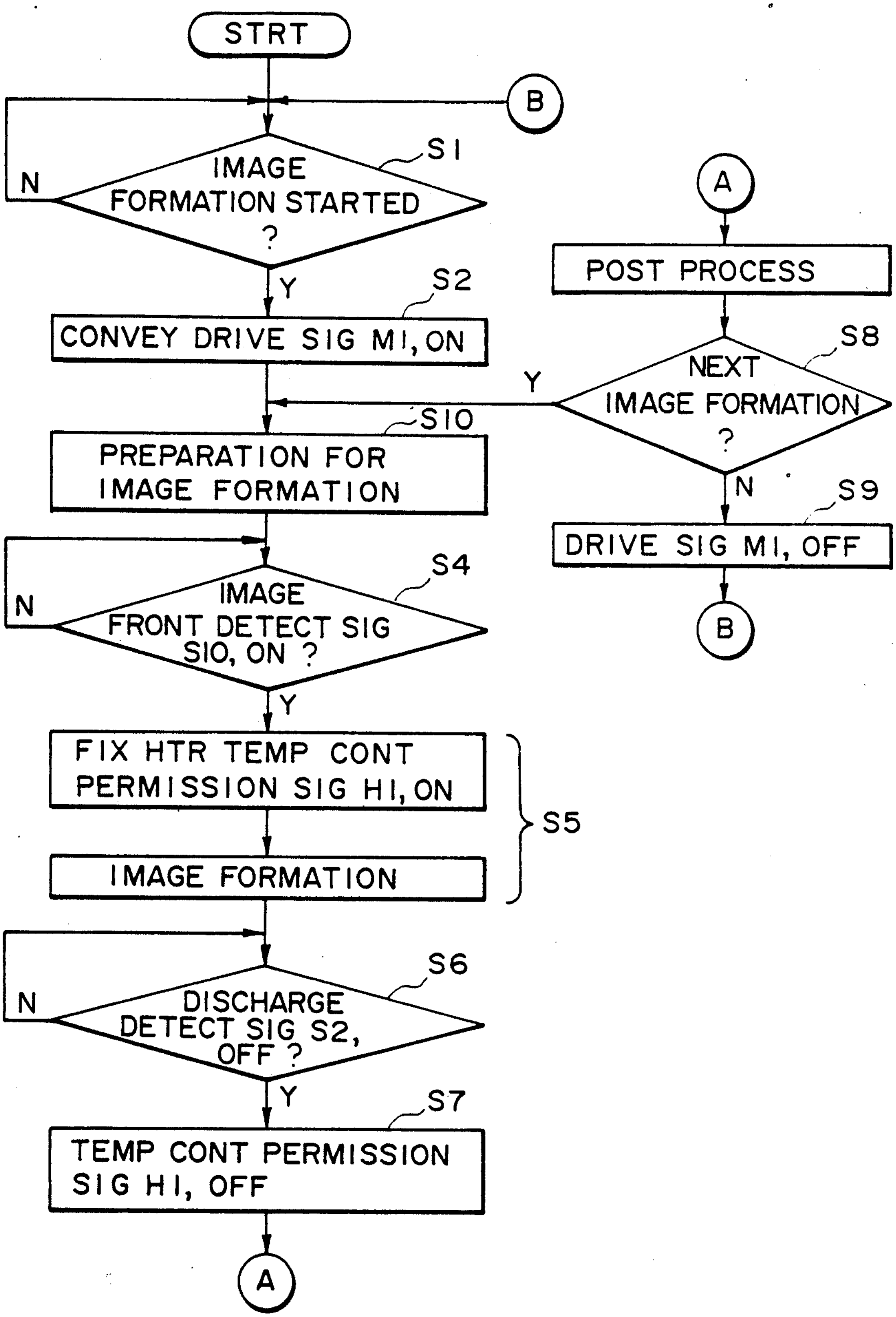
FIG. 33 is a flow chart illustrating a control of the FIG. 30 apparatus.

FIG. 33 is a flow chart illustrating the sequential control for accomplishing the above-described operations. After the apparatus is started, a step S1 is executed. At step S1, the discrimination is made as to whether or not the image forming operation is to be started. If not, the program returns to the step 1, and the apparatus is placed under the stand-by state. If the image forming operation is to be started at step S1, the program progresses to a step S2. At step S2, in order to start the image forming operation, the conveyance drive signal M1 is rendered on, and a step S10 is executed. At step S10, the preparation for the image forming operation is performed. First, the sheet feed drive signal SL10 is rendered on to feed the sheet P until it is abutted to the conveying roller 9, and then, the conveyance drive roller signal SL20 is rendered on. Then, at step S4, the discrimination is made as to whether the image front detection signal S10 from the image front detecting means 92 is on or not. If not, the program returns to the step S4, and it is repeated until the image front detecting signal S10 becomes on. When the image front detection signal S1 becomes on, step S5 is executed wherein the fixing heater temperature control permission signal H1 is rendered on, and simultaneously, the image forming process operation is simultaneously started. In the image forming process, the laser illuminating means (image outputting means) 81 is driven in the manner that the image signal from an image signal outputting means (not shown) and the polygonal mirror rotation are synchronized. By this, the exposure of the photosensitive drum 3 to the image is started (horizontal synchronization). By synchronizing the leading edge of the image through the optical system with the leading edge of the sheet P, the image front is properly aligned. Also, the series of operations required for the image formation are performed at predetermined timing, and a step S6 is executed. At step S6, the discrimination is made as to whether the sheet discharge sensor signal S20 is off or not. If not, the program returns to the step S6, and the apparatus waits for the passage of the sheet P by the discharge sheet detecting means 91. At step S6, if the sheet discharge sensor signal S20 is off, the program progresses to step S7, where the fixing heater temperature control permission signal H1 is rendered off, and the post-processing of the image formation is carried out. Then, at step S8, the discrimination is made as to whether or not the next image forming operation is to be performed continuously. If so, the program returns to the step S10, and the above-described operations are repeated. If the continuous image forming operation is not to be carried out at step S8, that is, if the image forming operation is completed, the step S9 is executed where the conveyance drive signal M1 is switched off, and the program returns to the step S1. As described in the foregoing, in the fixing apparatus according to this embodiment, the image signal drive of the image signal outputting means is started at the timing in synchronization with the image front detection signal from the image front detecting means, and the image fixing temperature control can be started on the basis of the timing. In other words, the time period T0 from the image formation start to the arrival of the sheet at the fixing apparatus is smaller than the time period T1 from the start of the sheet conveyance to the arrival of the sheet at the fixing apparatus, that is, T0<T1. Therefore, by starting the fixing temperature control on the basis of the start of the image signal drive of the image signal outputting means, the time period during which the fixing temperature control is performed becomes shorter, so that energy can be saved, and simultaneously, temperature rise inside the apparatus can be prevented.

In this embodiment, the comparison is made between the time period from the image formation start to the image fixing operation start and the time period from the recording material conveyance start to the photosensitive member to the fixing operation start. Where the time period from the print instruction signal such as actuation of the copy start key or the print instruction signal to the start of the image fixing operation is shorter than the time period from the recording material conveyance start to the fixing operation start, the power supply to the heater may be started on the basis of the print instruction signal.

Figure 34:
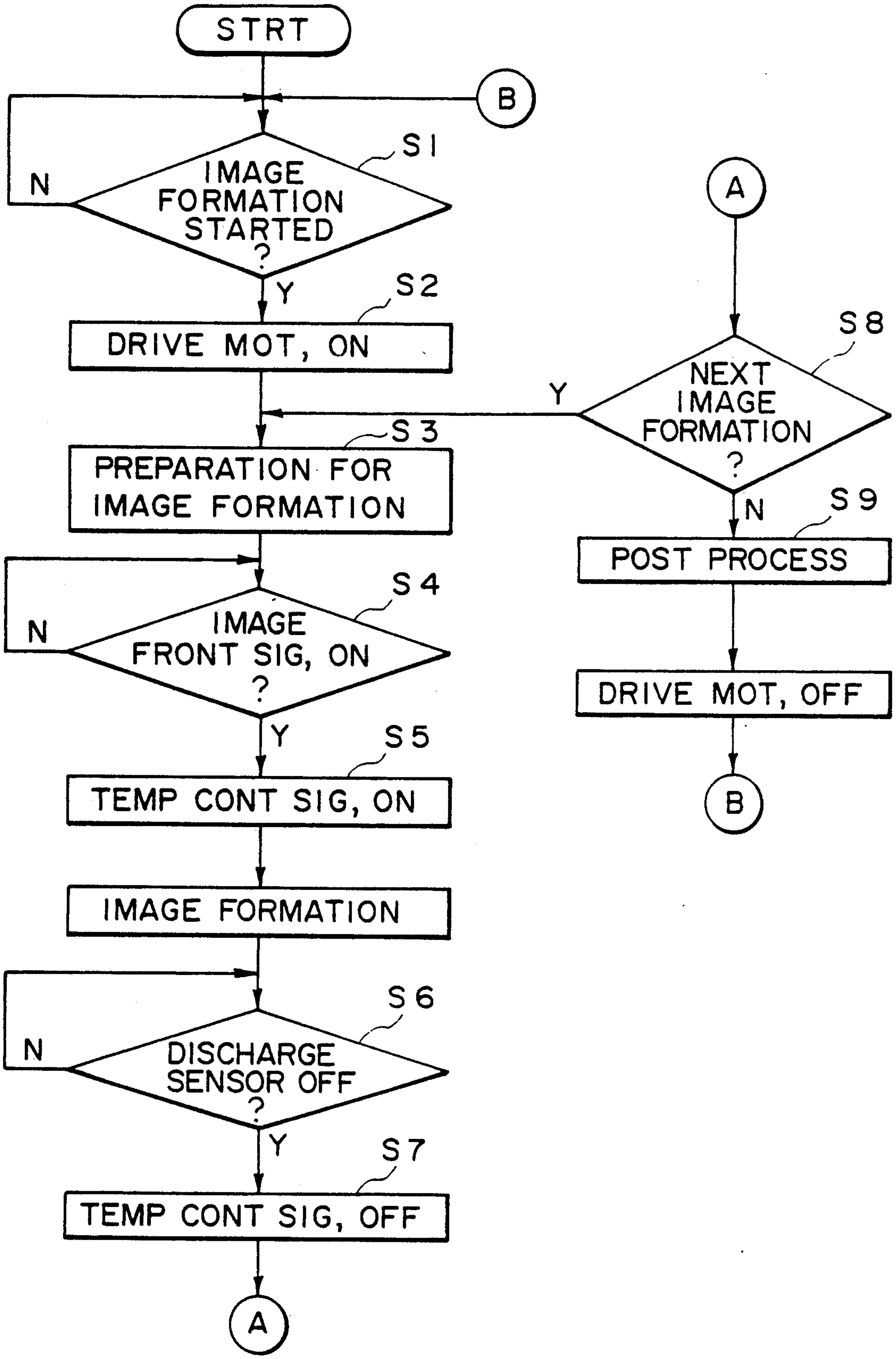
FIG. 34 is a flow chart illustrating a control according to a further embodiment of the present invention.

Referring to FIG. 34, are further preferable embodiment will be described. In this embodiment, the image forming apparatus has the same structure as that shown in FIG. 22, and the image fixing apparatus has the structure shown in FIG. 17. In addition, the control system is the same as shown in FIG. 27.

In FIG. 34, there is shown a flow chart illustrating the program for the sequential operation of the apparatus of this embodiment. The program is stored in the built-in ROM in the microcomputer. Upon start of the apparatus, the step S1 is executed, by which the discrimination is made as to whether or not the copy start button (not shown) is depressed, that is, whether or not the image forming operation is to be started. If not, the program returns to the step 1, and the apparatus is placed under the stand-by state. When the image forming operation is discriminated to be started at step 1, the step 2 is executed at step S2, in order to start the image forming operation, the conveyance drive signal M is rendered high to energize the driving motor 72. Then, at step S3, the preparation operation for the image forming operation is carried out, and the sheet feed drive signal SL1 is rendered on to feed the sheet P until it is abutted to the conveying roller 9. Simultaneously, the original supporting platen is moved to the image exposure start position, and thereafter, the image exposure operation is started. Then, at step S4, the discrimination is made as to whether the image front signal R from the image front detecting means 65 is on or not. If not, the program returns to the step S4, and it is repeated until the image front signal R becomes on. When the image front signal R becomes on, the step S5 is carried out, by which the fixing heater temperature control permission signal H is rendered on to start the temperature control of the heater 34, and simultaneously the image forming process operation is started. In the image forming processing, the conveying roller drive signal SL2 is first rendered on to start the conveyance of the sheet P, and the series of operation required for the image formation is performed at predetermined timing, at step S6 is executed. At step S6, the discrimination is made as to whether or not the sheet discharge sensor signal S1 off. If not, the program returns to the step S6, and the apparatus waits for the sheet P to pass by the sheet discharge sensor 16. If the sheet discharge sensor signal S1 is off at step S6, the program progresses to step S7, where the fixing heater temperature control permission signal H is rendered off to stop the temperature control of the heater 34. Then, at step S8, the discrimination is made as to whether the next image forming operation instruction exists or not, that is, as to whether the next image forming operation is to be continued or not. If so, the processor returns to the step S3 to repeat the above described operation. If not, that is, the image forming operation is completed, the steps S9 and S10 are carried out to perform the post-process operation such as the electrostatic cleaning of the photosensitive drum 3 is carried out, and the driving motor 72 is deactivated, and the program returns to the step S1.

During the image forming operation at step S9, the depression of the copy start button is checked, and if it is depressed, the driving motor 72 is not deactivated, and the program goes back to the step S3 while continuing the drive of the fixing film and the pressing roller of the fixing apparatus.

Figure 35:
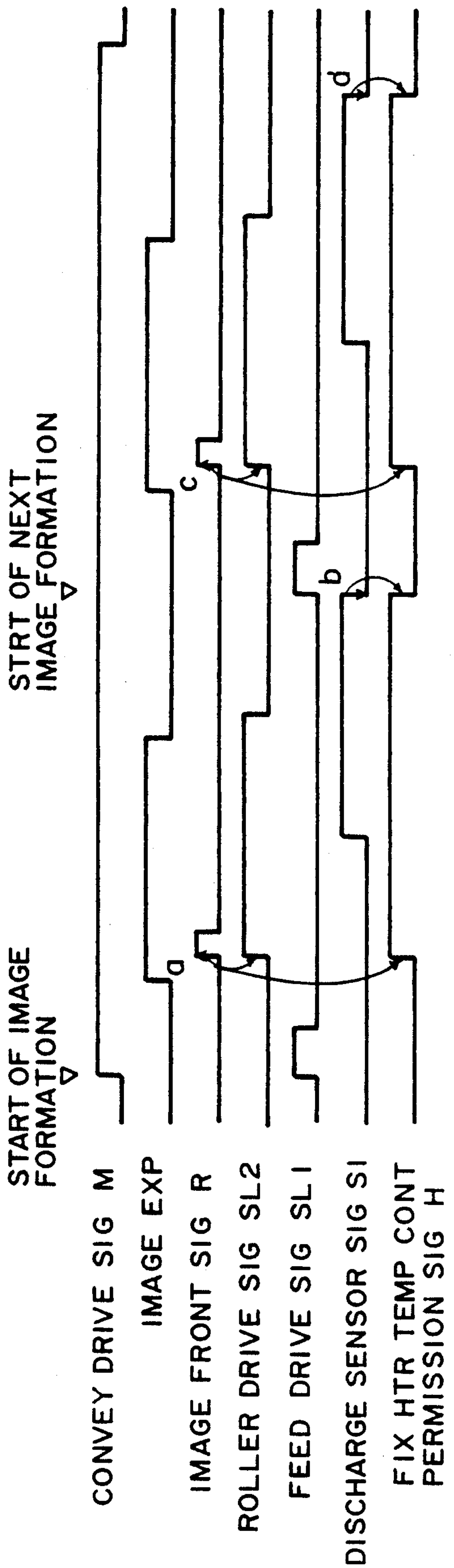
FIG. 35 is a timing chart of a control for the FIG. 34 apparatus.

FIG. 35 is a timing chart for explaining operations of the image forming apparatus incorporating the control system performing the flow chart of FIG. 34. In this Figure, the reference character M designates a conveyance drive signal; SL1 a sheet feed drive signal; SL2 a conveyance roller drive signal; R an image front signal; S1 a sheet discharge sensor signal; H a fixing heater temperature control permission signal.

In the FIG. 35 image exposure (IMAGE EXP) is shown as being on during the period in which an image of the original placed on the original supporting platen 1 is projected by the illumination lamp through a slit onto the photosensitive drum 3 from the leading edge of the original image (start position) to the trailing edge (reverse position). The control means renders the conveyance drive signal M "H" at the image formation start timing to drive the conveyance drive system, and then renders the heat feed drive signal SL1 "H" to feed the sheet P until the fed out sheet P is sufficiently abutted to the conveying roller 9. Simultaneously, the original supporting platen 1 is moved to the start position, and thereafter, the image exposure is started. After the start, the rising of the image front signal R is detected at a time (a), and at the timing in synchronization therewith, the fixing heater temperature control permission signal H and the conveyance roller drive signal SL2 are rendered "H" to start the fixing temperature control and to feed the sheet P to the photosensitive drum 3. The timing (a) is determined by the position of the image front timing member mounted on the original supporting platen 1 so that the leading edge of the image on the photosensitive drum 3 is aligned with the leading edge of the sheet P. The sheet P receives the image from the drum 3 under the control of high voltage, and thereafter, is transported to the fixing apparatus 14 by a conveyance driving system. After it is heat-fixed, it is discharged to the discharging portion. Then, the control means 70 detects "H" of the sheet discharge sensor signal S1 from the sheet discharge sensor 66. Thereafter, the control means 70 detects that the sheet passes through the fixing apparatus by the falling of the discharge sheet detection signal S1 to "L", in response to which the fixing heater temperature control permission signal H is rendered "L". THe timing thereof is indicated by a reference (b). Thus, the image is fixed by the temperature control only during the period from the timing (a) and the timing (b).

In the above operation, if the image formation is instructed, the new image formation is started at the timing (b), and the above-described operations are repeated. The timing (c) indicates the time at which the image front signal R rises; and the timing (d) indicates the time at which the sheet discharge sensor signal S1 falls. If the next image forming operation is discriminated as being not to be performed at the timing (d), the post-processing is performed, and the driving motor 72 is rendered off, so that the operation is completed.

As described in the foregoing, the image fixing temperature control is stopped after the image forming operation is completed, and therefore, power consumption can be saved, and the temperature rise in the inside of the image forming apparatus can be reduced. When the next image forming operation is to be performed, the fixing film and the pressing roller of the fixing apparatus continue to move when the fixing temperature control is not performed. By this, the fixing film and the pressing roller can be cooled, thus easing the problem of the decrease in the durability against heat, and reducing the jam occurrence attributable to the wrapping of the transfer material promoted by the toner deposited on the pressing roller and fused on the surface of the roller.

Figure 36:
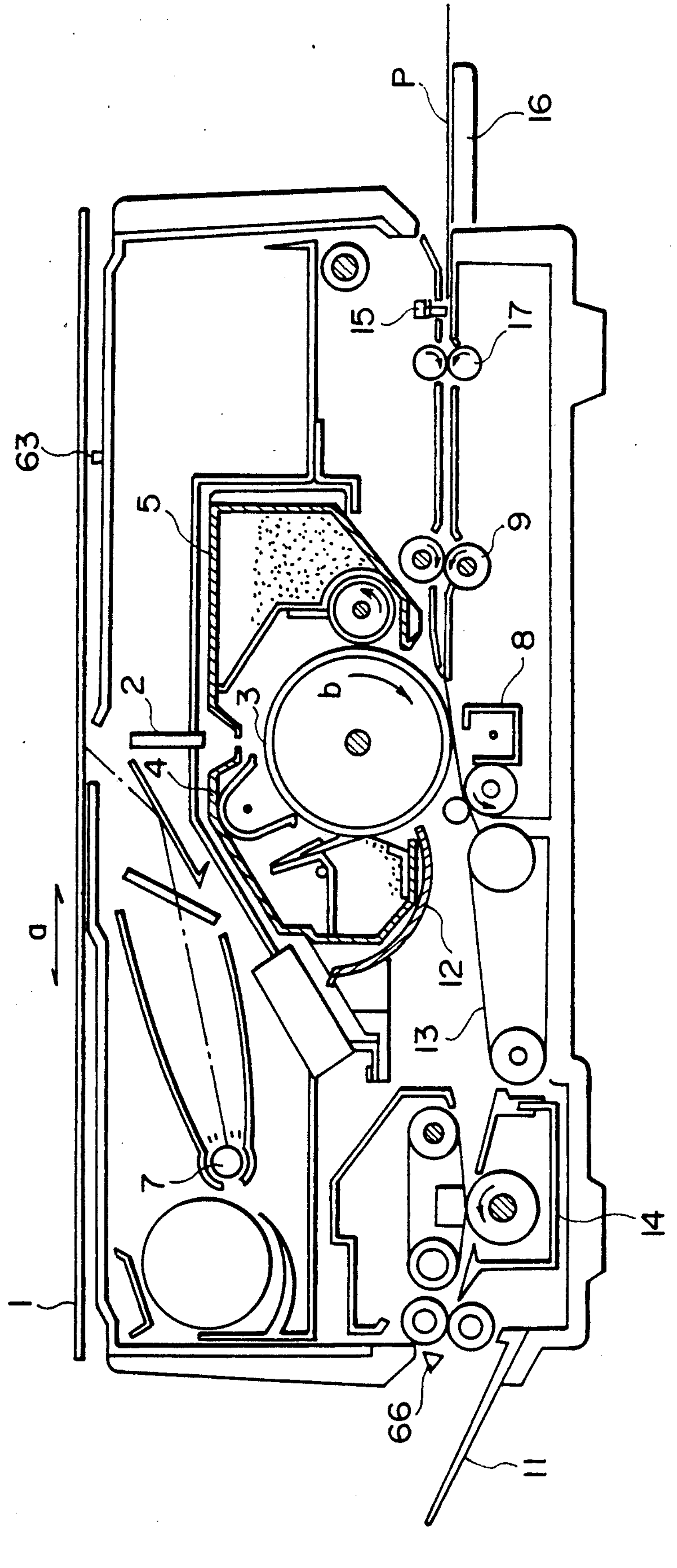
FIG. 36 is a sectional view of an image forming apparatus according to a yet further embodiment of the present invention.

Referring to FIG. 36, a further embodiment of the present invention will be described. The image forming apparatus shown in FIG. 36 is generally similar to the apparatus shown in FIG. 16, but is different therefrom in that the apparatus of this embodiment is provided with an image front detecting means 63 and a sheet discharge sensor 66.

Figure 37:
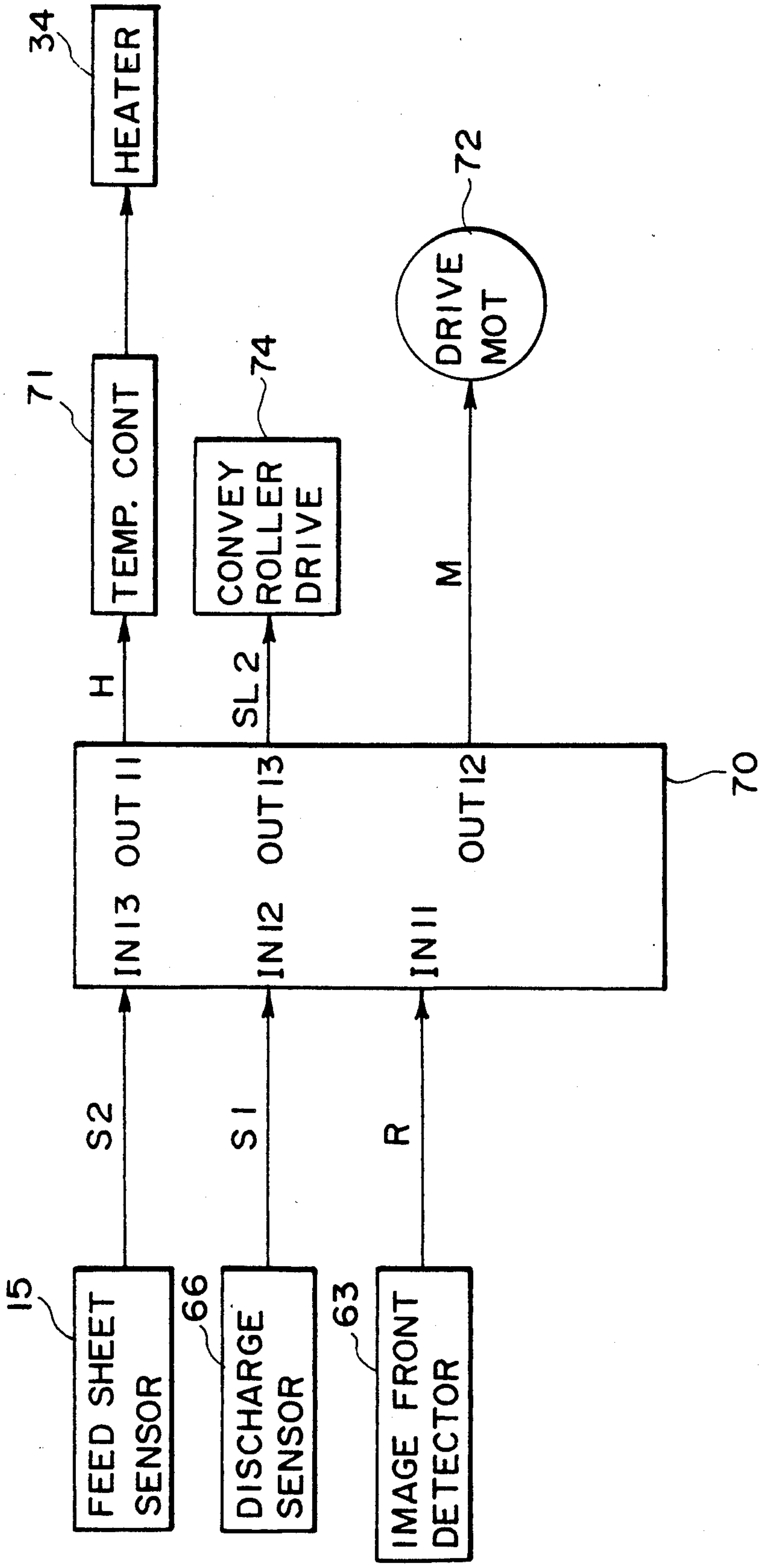
FIG. 37 is a block diagram illustrating an electrical structure in the apparatus of the FIG. 36 embodiment.

FIG. 37 is a block diagram of a control system for controlling the apparatus of this embodiment. Control means 70 is constituted by a microcomputer and logical elements or the like in this embodiment. The control means 70 is provided with input ports IN11, IN12 and IN13. The input port IN11 receives an image front signal R from the image front detecting means 63 for detecting an image front timing signal provided by an image front timing member (not shown) mounted on the original supporting platen 1. The input port IN12 receives a sheet discharge sensor signal S1 from the sheet discharge sensor 66 disposed at an outlet side of the image fixing apparatus with respect to the sheet conveyance direction. The input port IN13 receives a sheet feed sensor S2 from the sheet feed sensor 15. The control means 70 is also provided with output port OUT11, OUT12 and OUT13. The output port OUT11 outputs a fixing heater temperature control permission signal H for permitting the temperature control means 71 to perform the temperature control of the heater 34. The output port OUT12 outputs a conveyance drive signal M to a driving motor 72 for driving the image forming apparatus. The output port OUT13 outputs a conveyance roller drive signal SL2 to a conveyance roller driver 74 to drive the conveying roller 9. Each of the outputs from the output ports is "ON" (active) when it is "H" (high), and is "OFF" when it is "L" (low). The control means 70 is provided with other input and output ports for receiving input signals and producing output signals necessary for performing the image forming operation, although they are not shown. The microcomputer of the control means 70 contains ROM and RAM containing a program for the sequential operation of the image forming apparatus.

FIG. 31 is a flow chart for illustrating the programmed sequential operation. The program is stored in the built-in ROM of the microcomputer in the control means 70. When the apparatus is started, a step S11 is carried out. At step S11, the discrimination is made as to whether the sheet feed sensor 15 is actuated by manual feed of the sheet or not. If not, the program returns to the step S11, and the apparatus is placed under the stand-by state. If the sheet feed sensor 15 is on at step S11, the program progresses to the step S12. At step S12, in order to start the image forming operation, the driving motor 72 is actuated, and step S13 is executed. At step S13, the preparation for the image forming operation including electrostatic uniformization of the surface of the photosensitive drum 3 is carried out; the sheet manually fed is conveyed until it is abutted to the conveying roller 9; the original supporting platen is moved to the image exposure start position; and the image exposure operation is started. Then, at step S14, the discrimination is made as to whether the image front signal R from the image front detecting means 45 is on or not. If not, the program returns to the step S14, and it is repeated until the image front signal R becomes on. When it becomes on, the step S15 is executed, by which the fixing heater temperature control permission signal H is rendered ON to start the power supply to the heater 24, and simultaneously, the image forming operation is started. During the image forming process operation, the conveying roller drive signal SL2 is first rendered on to drive the conveying roller 9 to start the sheet conveyance, and the series of operations necessary for the image formation is performed at predetermined timing. Then, at step S16, the discrimination is made as to whether the sheet discharge sensor signal S1 is off or not. If not, the program returns to the S16, and the apparatus waits for the heat discharge sensor 16 to detect the passage of the sheet P. If the sheet discharge sensor signal S1 is discriminated as being off at step S16, the step S17 is executed. At step S17, the fixing heater temperature control permission signal H is rendered off to stop the power supply to the heater 34. Then, at step S18, the discrimination is made as to whether the sheet feed sensor signal S2 from the sheet feed sensor 15 is on or not. If so, it is deemed that an additional image forming instructions are produced, and the program goes back to step S13 to continue the image forming operation, and the above-described operations are repeated. If the sheet feed sensor signal S2 is off at the step S18, that is, if the image forming operation is controlled, the program goes to the step S19, where the post-processing operation including the electrostatic cleaning of the photosensitive drum 3 is performed, and thereafter, the driving motor 72 is deenergized. Then, the program goes back to the step S11. During the post processing operation at step S19, the sheet feed sensor signal S2 from the sheet feed sensor 15 is checked, and if it is actuated, the program goes back to the step S13 without deenergizing the driving motor 72, and continuing movement of the fixing film and the pressing roller.

Figure 38:
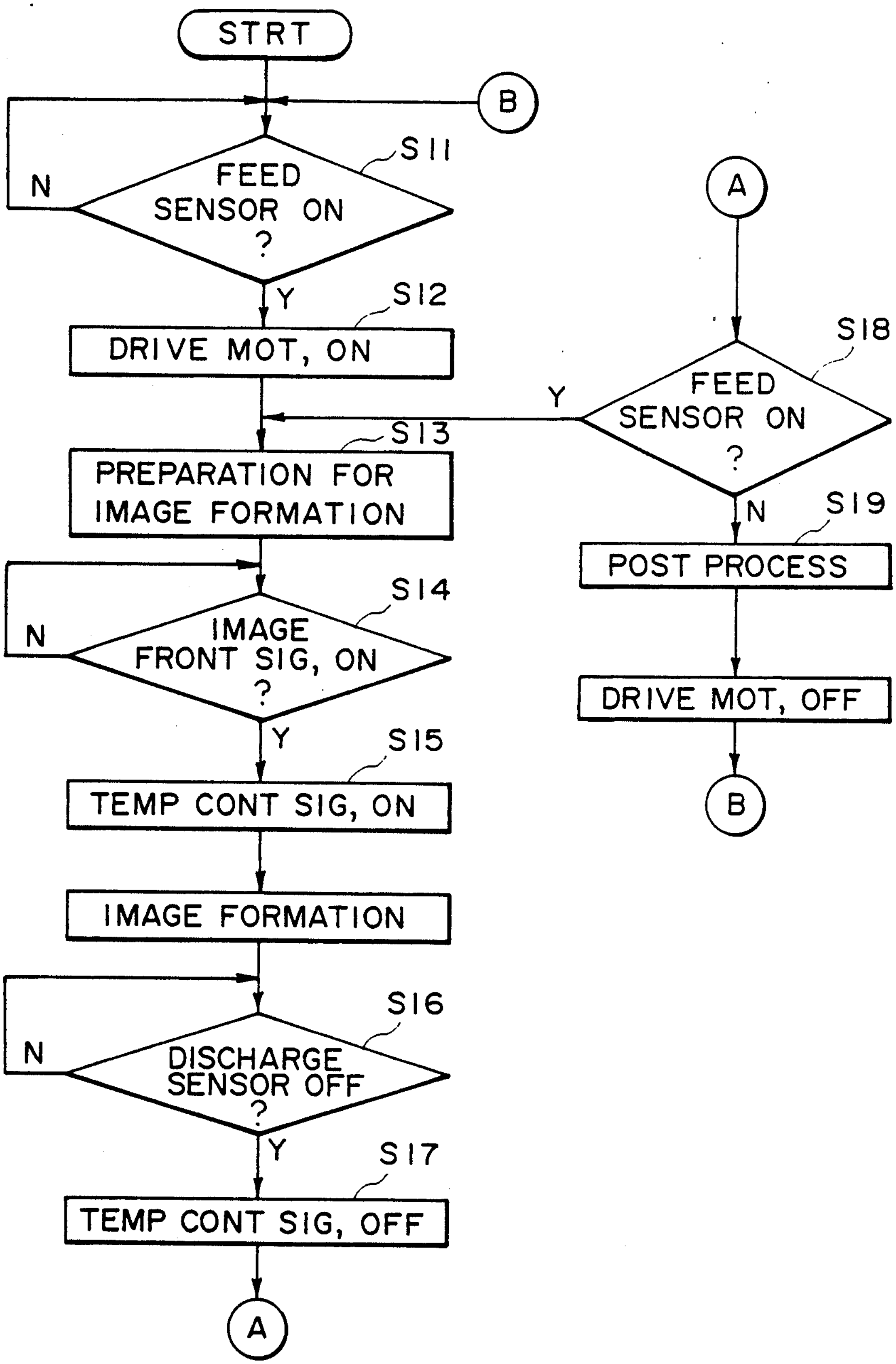
FIG. 38 is a flow chart illustrating a control of the FIG. 37 apparatus.
Figure 39:
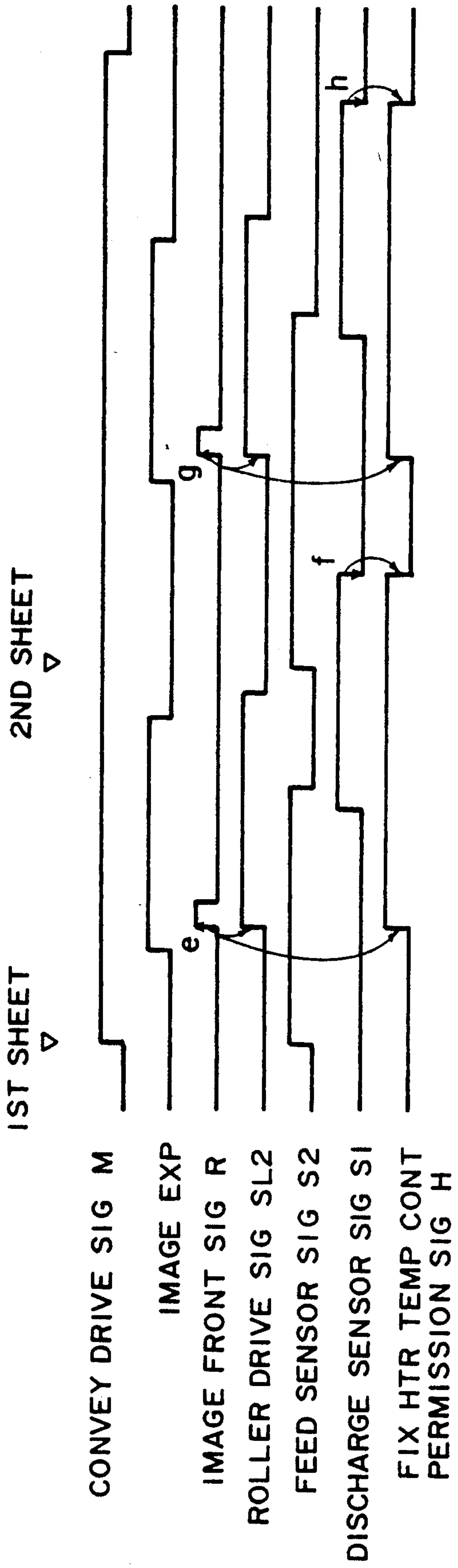
FIG. 39 is a timing chart illustrating a control of the FIG. 37 embodiment.

FIG. 39 is a timing chart showing the operation of the image forming apparatus incorporating the control system described with the flow chart of FIG. 38. In this Figure, reference numeral M designates a conveyance drive signal; SL2 a conveyance roller driving signal; R an image front signal; S1 a sheet discharge sensor signal; S2 a sheet feed sensor signal; and H a fixing heater temperature control permission signal, as described hereinbefore. In this Figure, the image exposure (IMAGE EXP) is shown as being on during a period in which an image of an original placed on the original supporting platen 1 is projected by an illumination lamp 7 through a slit on the photosensitive drum 3 from the leading edge of the original (start position) to the trailing edge thereof (reverse position). The control means 70 responds to the rising of the sheet feed sensor signal S2 to "H" to render the conveying drive signal M "H" to drive the conveying drive system, by which the sheet P is fed by a sheet feeding roller until it is abutted to the conveying roller 9. Simultaneously, the original supporting platen is moved to its start position, and thereafter, the image exposure operation is started. After the start, the rising of the image front signal R is detected at timing (e). In synchronism with this timing, the fixing heater temperature permitting signal H and the conveying roller driving signal SL2 are rendered "H" to start the fixing temperature control and to drive the conveying roller 9 so as to feed the sheet P to an image transfer station. The timing (e) is determined by the position of the image front timing member mounted on the original supporting platen 1 so that the leading edge of the image on the photosensitive drum 3 is aligned with the leading edge of the sheet P. Next, the sheet P receives the image on the drum 3 under the controlled high voltage, and is conveyed into the fixing apparatus by the conveyance drive system. After the heat-fixing, it is transported to the discharging portion, then, the control means 70, detects rising of the sheet discharge sensor signal S1 from the discharge sheet sensor 66 to "H". Thereafter, the control means 70 detects that the sheet has passed through the fixing apparatus by the falling of the discharge sheet detection signal S1 to "L", in response to which the control means 70 renders the fixing heater temperature control permission signal H "L". The timing thereof is indicated by a reference f. Simultaneously, if the sheet feed sensor S2 is "H", the next image forming operation is started, and the above-described operations are repeated. A reference character g designates the rising timing of the image front signal R, and a reference h designates falling timing of the sheet discharge sensor signal S1. If the sheet feed sensor signal S2 is "L" at the time h, the post processing is performed, and then the driving motor 42 is deactivated so that the operation is completed.

As described in the foregoing, by stopping the fixing temperature control after completion of the image forming operation, the image forming operation is possible with a smaller energy consumption and with a reduced temperature rise in the inside of the apparatus. If the next image forming operation is to be performed, the fixing film and the pressing roller of the fixing apparatus continue to operate when the fixing temperature control is not performed. By this, the fixing film and the pressing roller can be cooled, thus easing the problem of decrease in the durability against sheet, and also thus reducing jam occurrence attributable to wrapping of the transfer material promoted by the toner deposited on the pressing roller and fused on the surface of the roller.

Figure 40:
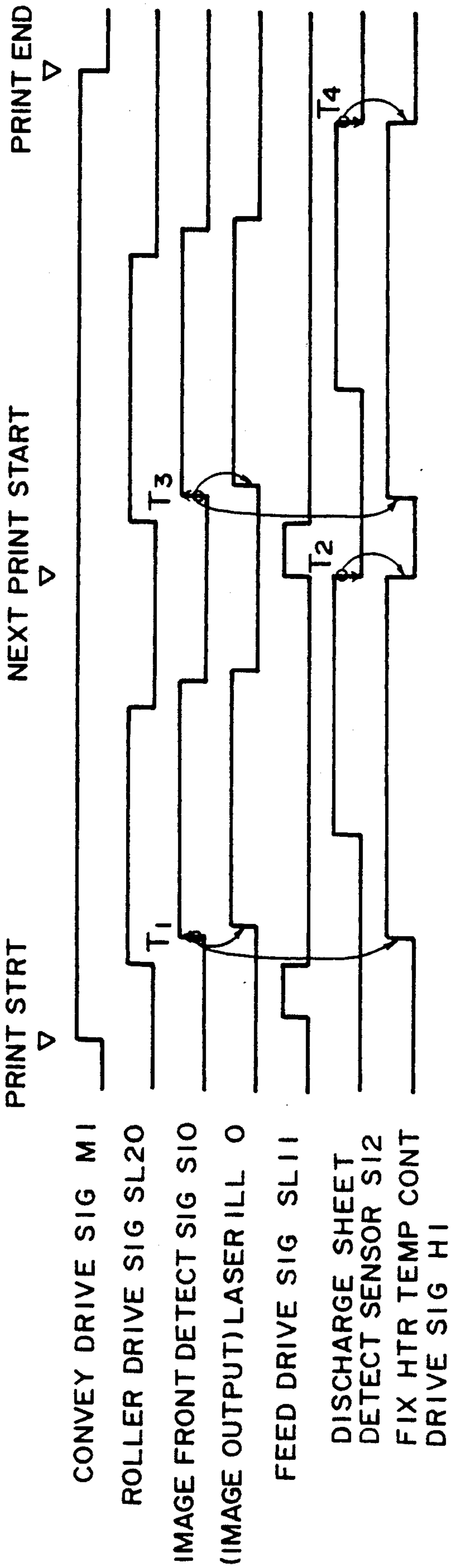
FIG. 40 is a timing chart illustrating a control according to a further embodiment.

Referring to FIG. 40, a further embodiment of the present invention will be described. The image forming apparatus of this embodiment is same as that shown in FIG. 30, and the fixing apparatus is the same as shown in FIG. 17. The block diagram for the control of the operation is the same as shown in FIG. 31.

FIG. 40 is a timing chart when two prints are produced. In this Figure, a reference character M1 is a conveyance drive signal; SL11 is a sheet feed drive signal; SL12 is a conveying roller drive signal; S11 is an image front detection signal; S12 is a sheet discharge detecting signal; H1 a fixing temperature control drive signal; and O is an image output signal.

Control means 140 renders the conveyance drive signal M1 "H" at the time of the print instruction produced, so as to operate the conveyance drive system, and then renders the sheet feed drive signal SL11 "H" to drive the feeding roller 6 to feed the sheet P out of the cassette S. After the sheet P fed out is detected by the sheet detecting means 93 and after it is abutted to the conveying roller 9, the conveying roller driving signal SL12 is rendered "H" to drive the conveying roller 6 to feed the sheet P. Then, the image front detecting means 92 detects the sheet P, upon which the image detection signal S1 from the image front means 92 becomes "H", and the event is supplied to the control means 140 for the image front alignment.

The timing of this is indicated by a reference T1 in FIG. 40, and in response to which the control means 140 renders the fixing heater temperature control permission signal H1 "H" to start the energy supply to the heat generating element 34, thus starting the fixing temperature control. Simultaneously, the laser illuminating means (image outputting means) 81 is driven so that the image signal of the image signal producing means (not shown) and the polygonal mirror rotation are synchronized (horizontal synchronization). By synchronizing the leading edge of the image through the optical system and the leading edge of the sheet P, the leading edge of the original is aligned. Then, the sheet P receives the image from the photosensitive drum 3 under the controlled high voltage, and is conveyed into the fixing apparatus 11 by the conveyance drive system. If the image front detection signal S11 rises at the time T1, the temperature control of the fixing apparatus is started after the time T1. Subsequently, the discharge sheet detecting means 91 detects departure of the sheet P from the fixing portion, and the control means 140 detects this event by the falling of the sheet discharge detection signal S12 to "L". Then, the control means 140 renders the fixing heater temperature control drive signal H1 "L". The timing thereof is shown by reference T2 in FIG. 40. If the next printing is to be performed, it is started at this time T2, and the above-described operations are repeated. Reference numeral T3 designates the time at which the image front detection signal S11 rises, and the reference T4 designates the time at which the sheet discharge detection signal S12 falls. When the next image forming operation is not instructed at the time T4, the post-processing operation including the electrostatic cleaning of the photosensitive drum 3 is carried out, and thereafter, the conveyance drive signal M1 is rendered "L", b which the operation is completed.

Figure 41:
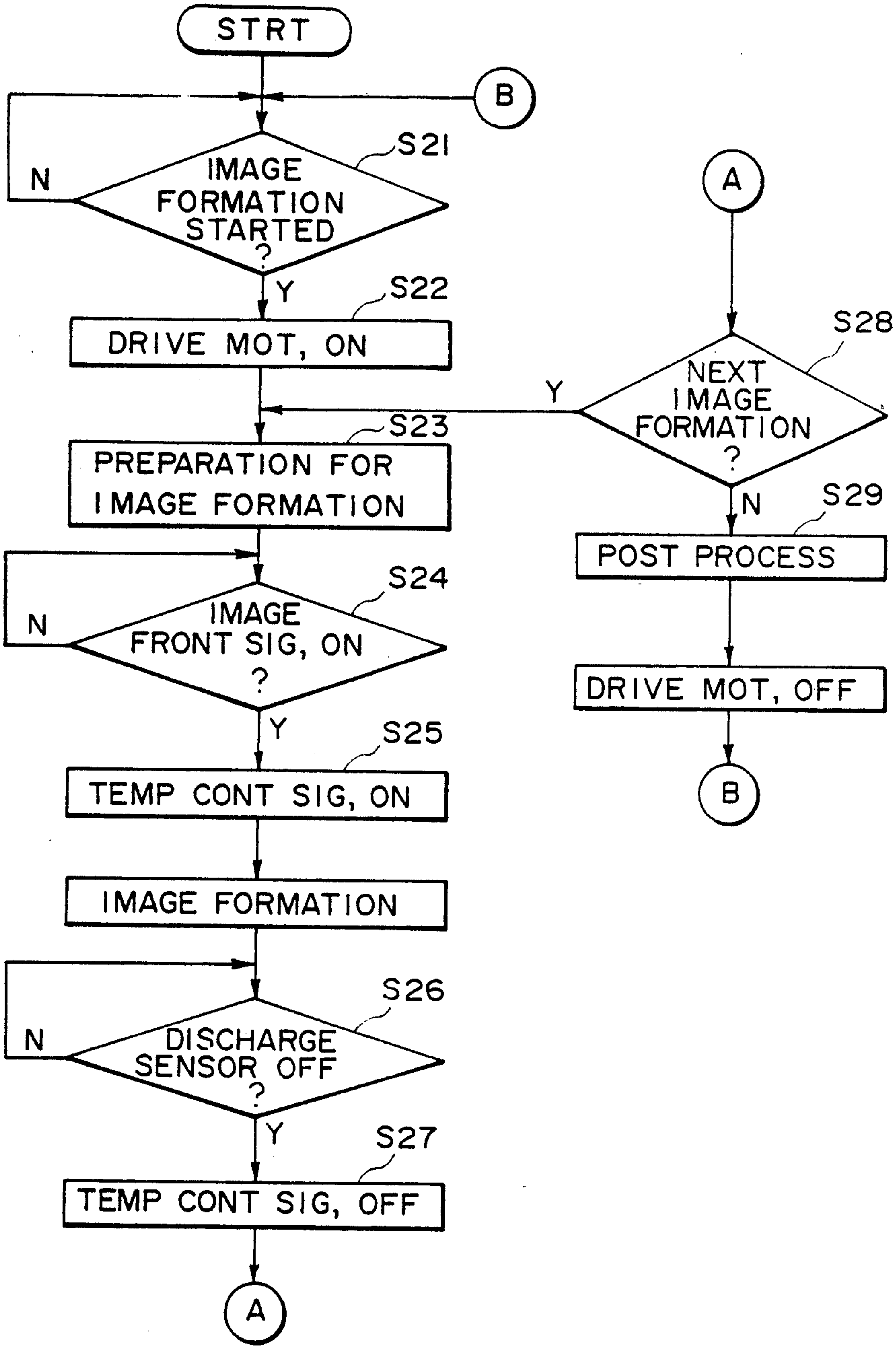
FIG. 41 is a flow chart illustrating a control of the FIG. 40 apparatus.

FIG. 41 shows a flow chart for accomplishing the sequential programmed operation described above. Upon start of the apparatus, a step S21 is executed. At the step S21, the print signal from the image signal outputting means 99 is checked, and the discrimination is made as to whether the image forming operation is to be started or not. If not, the program returns to the step S21, and the apparatus is placed in the stand-by state. If the image forming operation is to be started at the step S21, the step 22 is executed, by which in order to start the image forming operation, the conveyance system drive signal M1 is rendered on. Then, at step S23, the preparatory operation for the image formation including the electrostatic uniformization of the photosensitive drum 3 surface is performed. The sheet feed drive signal FL11 is rendered on to feed the sheet P until it abuts the conveying roller 9. Subsequently, the conveying roller drive signal SL12 is rendered on to drive the conveying roller 9. Thereafter, step 24 is executed, by which the discrimination is made as to whether the image front detection signal S11 from the image front detecting means 92 is on or not. If not, the program returns to the step 24, and it is repeated until the image front detection signal S11 becomes on. Next, when the image front detection signal S11 becomes on, the step 25 is executed. By this, the fixing heater temperature control permission signal H1 is rendered on, and simultaneously, the image forming operation is started. In the image forming operation, the laser illuminating means (image outputting means) 81 is driven so that the image signal from the image signal outputting means (not shown) is synchronized with the polygonal mirror rotation (horizontal synchronization). Further, by synchronizing the leading edge of the image through the optical system with the leading edge of the sheet P, the image front is properly aligned. The series of operations necessary for the image operation is performed at predetermined timing, and a step 26 is executed. At step 26, the discrimination is made as to whether the outlet side sheet detection signal S12 is off or not. If not, the program returns to step S26, and the apparatus waits for the sheet P passes by the discharge sheet detection means 91. If the discharge sheet detection signal S12 is off at step S26, the step S27 is executed. By this, the fixing heater temperature control permission signal H1 is rendered off to shut off the power supply to the feed generating element 38, and thereafter, the program progresses to the step 28. At the step S28, the discrimination is made as to the presence or absence of the continued printing instruction to make discrimination as to whether or not the image forming operation is to be continued. If so, the program returns to the step 23, and the above-described operations are repeated. If not, that is, if the image forming operation is completed, the program proceeds to a step 29, where the post-processing including electrostatic cleaning or the like of the photosensitive drum 3 is carried out, and the conveying system drive signal M1 is rendered off, and thereafter, the program goes back to the step S21. During the post processing operation at step 29, the next image formation start instructions are checked, and if it is produced, the program goes back to the step 23 without deenergizing the driving motor 42 and with the operations of the fixing film and the pressing roller continued.

As described in the foregoing, the fixing temperature control is stopped after termination of the image formation, the image forming operation is possible with a smaller energy consumption and with a reduced temperature rise in the inside of the apparatus.

By driving the fixing film and the pressing roller of the fixing apparatus when the fixing temperature operation is not performed if the next image forming operation is to be continued, the fixing film and the pressing roller can be cooled, thus easing the problem of the deterioration of the durability against heat, and also reducing the possibility of jam occurrence attributable to lapping of the transfer material promoted by the toner deposited on the pressing roller and fused on the surface thereof.

The above-described embodiments may be combined as desired.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

image forming means for forming a toner image on an image supporting material;

image fixing means for fixing the toner image on the image supporting material, said fixing means including a heating element for heating the toner image;

detecting means for detecting passage of the supporting material;

control means for controlling an electric power supply to said heating element to maintain a predetermined temperature of the heating element during a fixing operation;

wherein said control means controls a starting and stopping of the electric power supply to the heating element in accordance with an output of said detecting means.

2. An apparatus according to claim 1, wherein said detecting means detects that the supporting material is fed to said image forming apparatus and detects discharge of the supporting material from said fixing means.

3. An apparatus according to claim 1, wherein said heating source is fixed during an image fixing operation of said fixing means, and includes a heater having a linear heat generating layer and applies heat to the toner image through a moving film.

4. An apparatus according to claim 1, wherein said heating element is fixed during an image fixing operation of said fixing means, and includes a heater having a linear heat generating layer.

5. An apparatus according to claim 4, further comprising power supply means for energizing pulsewisely the heat generating layer, and a second control means for controlling width of the pulse in accordance with a temperature of said fixing means.

6. An image forming apparatus, comprising:

image forming means for forming a toner image on an image supporting material;

image fixing means for fixing the toner image on the image supporting material, said fixing means including a heating element for heating the toner image;

detecting means for detecting discharge of the supporting material from said fixing means; and control means for controlling electric power supply to said heating element to maintain a predetermined temperature of the heating element during a fixing operation;

said control means stopping power supplied to said heating element upon detection of the discharge of the supporting material by said detecting means.

7. An apparatus according to claim 6, wherein said detecting means includes a supporting material detecting sensor disposed upstream of a heating portion of said detecting means with respect to a movement direction of the supporting material and delaying means for delaying supply of an output signal thereof to said control means by a predetermined time period.

8. An apparatus according to claim 6, wherein said heating source is fixed during an image fixing operation of said fixing means, and includes a heater having a linear heat generating layer and applies heat to the toner image through a moving film.

9. An apparatus according to claim 8, further comprising power supply means for energizing pulsewisely the heat generating layer, and a second control means for controlling width of the pulse in accordance with a temperature of said fixing means.

10. An image forming apparatus, comprising:

image forming means for forming a toner image on an image supporting material;

image fixing means for fixing the toner image on the image supporting material, said fixing means including a heating element for heating the toner image;

feeding means for manual feed of the supporting material into said image forming apparatus;

detecting means for detecting that the supporting material is manually fed into said apparatus; and control means for controlling electric power supply to said heating element to maintain a predetermined temperature of the heating element during a fixing operation;

said control means controlling power supply to said heating element upon detection of the manually fed supporting material by said detecting means.

11. An apparatus according to claim 10, wherein said control means stops the power supply to fed heating source upon cancellation of the manually fed supporting material after start of the power supply to said heating source.

12. An apparatus according to claim 11, wherein whether or not the manually fed sheet is canceled is discriminated on the basis of an output of said detecting means.

13. An apparatus according to claim 10, wherein said heating source is fixed during an image fixing operation of said fixing means, and includes a heater having a linear heat generating layer and applies heat to the toner image through a moving film.

14. An apparatus according to claim 13, further comprising power supply means for energizing pulsewisely the heat generating layer, and a second control means for controlling width of the pulse in accordance with a temperature of said fixing means.

15. An image forming apparatus capable of continuously forming toner images on plural recording materials, comprising:

image fixing means for fixing a toner image on the recording material, said fixing means including a heating element for heating the toner image; and control means for controlling electric power supply to the heating element to maintain a predetermined temperature of the heating element during a fixing operation;

wherein during continuous image forming operation, said control means shut the power supply between the recording material and a next recording material.

16. An apparatus according to claim 15, further comprising detecting means for detecting termination of image fixing of the recording material, and said power supply means stops power supply to said heating source upon detection of the termination by said detecting means.

17. An apparatus according to claim 15, further comprising detecting means for detecting the recording material disposed upstream of said detecting means with respect to a movement direction of the recording material, and said power supply means start to supply power to said heating source in response to detection of the recording material by said detecting means.

18. An apparatus according to claim 15, wherein said heating source is fixed during an image fixing operation of said fixing-means, and includes a heater having a linear heat generating layer and applies heat to the toner image through a moving film.

19. An apparatus according to claim 18, further comprising power supply means for energizing pulsewisely the heat generating layer, and a second control means for controlling width of the pulse in accordance with a temperature of said fixing means.

20. An image forming apparatus, comprising:

image fixing means for fixing a toner image on a recording material, said fixing means including a heating element for heating the toner image;

wherein a time period from the start of said image forming operation to start of image fixing operation on the recording material is shorter than a time period from start of conveying the recording material to the start of the image fixing operation;

wherein power supply to said heating source is started on the basis of start of image forming operation of said image forming apparatus.

21. An apparatus according to claim 20, wherein said heating source is fixed during an image fixing operation of said fixing means, and includes a heater having a linear heat generating layer and applies heat to the toner image through a moving film.

22. An apparatus according to claim 21, further comprising power supply means for energizing pulsewisely the heat generating layer, and a second control means for controlling width of the pulse.in accordance with a temperature of said fixing means.

23. An apparatus according to claim 20, wherein said image forming apparatus is an electrophotographic apparatus comprising a photosensitive member, and wherein start of said image formation is the start of image exposure of said photosensitive member.

24. An image forming apparatus, comprising:

image fixing means for fixing a toner image on a recording material, said fixing means including a heating element for heating the toner image;

wherein a time period from the start of conveyance of the recording material to start of fixing operation on the recording material is shorter than the time period from start of image formation to the start of the fixing operation on the recording material;

wherein power supply to said heating element is started on the basis of start of sheet conveyance of the recording material.

25. An apparatus according to claim 24, wherein said heating source is fixed during an image fixing operation of said fixing means, and includes a heater having a linear heat generating layer and applies heat to the toner image through a moving film.

26. An apparatus according to claim 25, further comprising power supply means for energizing pulsewisely the heat generating layer, and a second control means for controlling width of the pulse in accordance with a temperature of said fixing means.

27. An apparatus according to claim 24, wherein said image forming apparatus is an electrophotographic apparatus comprising a photosensitive member, and wherein start of said image formation is start of image exposure of said photosensitive member.

28. An apparatus according to claim 20 or 24, further comprising a rotatable image bearing member for supporting an image to be transferred on the recording material, recording material feeding means for feeding the recording material to said image bearing member in a timed relation, and wherein the start of the conveyance of the recording material is the start of the feeding by said feeding means.

29. An image forming apparatus capable of continuously forming toner images on plural recording materials, comprising:

image fixing means for fixing the toner image on a recording material, said fixing means includes a heating source and a film movable in contact with said heating source, wherein the toner image is heated by heat from said heating source through the film;

power supply means for supply power through said heating source intermittently in accordance with an interval between recording materials during continuous image forming operation of said image forming apparatus, wherein the film moves when the heating source does not receive the power supply during the time corresponding to the interval between the recording materials.

30. An image forming apparatus comprising:

image fixing means for fixing a toner image on the recording material, said fixing means includes a film movable in contact with said heating element, wherein the toner image is heated by heat from said heating source through the film;

wherein the film continues to be moved even after power supply to said heating element is shut-off, and wherein additional image forming instructions are produced during a post-processing operation after an image forming operation of said image forming apparatus, an image fixing operation for the additional image formation is started without stoppage of the film after the previous image fixing operation.

31. An apparatus according to claim 29 or 30, wherein said heating element is fixed during image fixing operation, and includes a linear heat generating layer.

32. An apparatus according to claim 29 or 30, wherein said film is an endless film.

* * * * *

UNITED STATES PATENT AND TRADEMARK OFFICE
CERTIFICATE OF CORRECTION

PATENT NO. : 4,998,121 Page 1 of 3

DATED : March 5, 1991

INVENTOR(S) : SHOKYO KOH ET AL.

It is certified that error appears in the above-identified patent and that said Letters Patent is hereby corrected as shown below:

COLUMN 2

Line 67, "chart" should read --charts--.

COLUMN 4

Line 31, "contacted" should read --contact-- and "to" should be deleted.
Line 50, "rotate" should read --rotated--.

COLUMN 7

Line 22 "is" should read --are--.

COLUMN 8

Line 23, "$\tau B=(1/B)ln[1-t_{HO}-T_B)/A)]$ ...(4)" should read --$\tau_B=(1/B)ln[1-t_{HO}-T_B)/A)]$ ...(4)--.
Line 30, "is" should be deleted.
Line 57, "$\tau$" should read --$\tau_o$--.

COLUMN 9

Line 10, "tends" should read --tens--.
Line 43, "to" should read --goes to--.
Line 60, "temperatures" should read --temperature--.

COLUMN 10

Line 12, "broken" should read --a broken--.

UNITED STATES PATENT AND TRADEMARK OFFICE
CERTIFICATE OF CORRECTION

PATENT NO. : 4,998,121 Page 2 of 3

DATED : March 5, 1991

INVENTOR(S) : SHOKYO KOH ET AL.

It is certified that error appears in the above-identified patent and that said Letters Patent is hereby corrected as shown below:

COLUMN 18

Line 28, "progressive" should read --progresses--.

COLUMN 20

Line 53, "the" should read --by the--.

COLUMN 23

Line 59, "are" should read --a--.

COLUMN 24

Line 30, "at" should read --and--.
Line 48, "is" should read --being--.

UNITED STATES PATENT AND TRADEMARK OFFICE

CERTIFICATE OF CORRECTION

PATENT NO. : 4,998,121

DATED : March 5, 1991

INVENTOR(S) : SHOKYO KOH ET AL.

It is certified that error appears in the above-identified patent and that said Letters Patent is hereby corrected as shown below:

COLUMN 26

Line 13, "port" should read --ports--.

COLUMN 27

Line 7, "an" should be deleted.

COLUMN 29

Line 18, "b" should read --by--.
Line 61, "passes" should read --to pass--.

Signed and Sealed this

Twenty-fourth Day of November, 1992

Attest:

DOUGLAS B. COMER

*Attesting Officer*

*Acting Commissioner of Patents and Trademarks*